US010677184B2

(12) United States Patent
Kusakabe et al.

(10) Patent No.: US 10,677,184 B2
(45) Date of Patent: Jun. 9, 2020

(54) DRIVE DEVICE FOR FUEL INJECTION DEVICE

(71) Applicant: Hitachi Automotive Systems, Ltd., Hitachinaka-shi, Ibaraki (JP)

(72) Inventors: Ryo Kusakabe, Tokyo (JP); Toshihiro Aono, Tokyo (JP); Motoyuki Abe, Tokyo (JP); Takuya Mayuzumi, Hitachinaka (JP); Masahiro Toyohara, Hitachinaka (JP); Takashi Okamoto, Hitachinaka (JP); Osamu Mukaihara, Hitachinaka (JP); Shinji Nakagawa, Tokyo (JP); Yusuke Kihara, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/024,667

(22) PCT Filed: Jun. 16, 2014

(86) PCT No.: PCT/JP2014/065839
§ 371 (c)(1),
(2) Date: Mar. 24, 2016

(87) PCT Pub. No.: WO2015/045508
PCT Pub. Date: Apr. 2, 2015

(65) Prior Publication Data
US 2016/0237937 A1    Aug. 18, 2016

(30) Foreign Application Priority Data

Sep. 25, 2013 (JP) ................................. 2013-197792

(51) Int. Cl.
*F02D 41/24* (2006.01)
*F02D 41/20* (2006.01)
(Continued)

(52) U.S. Cl.
CPC .......... *F02D 41/247* (2013.01); *F02D 41/20* (2013.01); *F02D 41/402* (2013.01);
(Continued)

(58) Field of Classification Search
CPC ...... F02D 41/247; F02D 41/402; F02D 41/20; F02D 2041/2003; F02D 2041/2058;
(Continued)

(56) References Cited

U.S. PATENT DOCUMENTS 9,593,657 B2 * 3/2017 Kusakabe ............... F02D 41/20
2008/0105767 A1   5/2008 Fujii et al.
(Continued)

FOREIGN PATENT DOCUMENTS

DE    10 2009 002 483 A1   10/2010
DE       102009002483 A1 * 10/2010 ............. F02D 41/20
(Continued)

OTHER PUBLICATIONS

European Search Report issued in counterpart European Application No. 14848205.2 dated Mar. 16, 2017 (10 pages).
(Continued)

*Primary Examiner* — Joseph J Dallo
*Assistant Examiner* — Kurt Philip Liethen
(74) *Attorney, Agent, or Firm* — Crowell & Moring LLP

(57) ABSTRACT

An object of the invention is to provide a drive device of a fuel injection device which can increase the accuracy in an injected fuel injection amount by combining the fuel injections from a plurality of injection pulse widths. In the drive device of the fuel injection device which has a function of driving the fuel injection device such that the fuel injection is performed plural times in one combustion cycle, the fuel injection device is driven such that a fuel injection at a target opening level in which a valve element or a movable element of the fuel injection device reaches a regulation (Continued)

member and a fuel injection at an intermediate opening level in which the valve element does not reach the regulation member are included in the plural times of division injections performed in one combustion cycle.

16 Claims, 37 Drawing Sheets

(51) Int. Cl.
  *F02M 51/06* (2006.01)
  *F02M 61/18* (2006.01)
  *F02D 41/40* (2006.01)
(52) U.S. Cl.
  CPC .... *F02M 51/0678* (2013.01); *F02M 51/0685* (2013.01); *F02M 61/1833* (2013.01); *F02D 2041/2003* (2013.01); *F02D 2041/2055* (2013.01); *F02D 2041/2058* (2013.01); *F02D 2200/0618* (2013.01); *F02M 51/0671* (2013.01); *F02M 61/1893* (2013.01); *Y02T 10/44* (2013.01)
(58) Field of Classification Search
  CPC .... F02D 2200/0618; F02D 2041/2055; F02M 51/0678; F02M 61/1833; F02M 51/0685; F02M 51/0671; F02M 61/1893; Y02T 10/44
  See application file for complete search history.

(56) References Cited

U.S. PATENT DOCUMENTS

| | | | |
|---|---|---|---|
| 2008/0296414 A1* | 12/2008 | Kubota | F02M 51/0675 239/533.11 |
| 2009/0063021 A1 | 3/2009 | Natsui et al. | |
| 2009/0070007 A1 | 3/2009 | Natsui et al. | |
| 2009/0188236 A1 | 7/2009 | Yokota | |
| 2011/0226214 A1 | 9/2011 | Ogata et al. | |
| 2012/0101707 A1 | 4/2012 | Kemmer et al. | |
| 2012/0116702 A1 | 5/2012 | Beer et al. | |
| 2012/0234299 A1* | 9/2012 | Abe | F02D 41/20 123/490 |
| 2012/0318883 A1 | 12/2012 | Kusakabe et al. | |
| 2013/0087639 A1* | 4/2013 | Nakai | F02M 51/0671 239/585.1 |
| 2013/0139791 A1 | 6/2013 | Kusakabe et al. | |
| 2013/0192562 A1 | 8/2013 | Matsumura | |
| 2014/0092516 A1 | 4/2014 | Koch et al. | |
| 2014/0311459 A1 | 10/2014 | Katsurahara | |
| 2014/0366848 A1 | 12/2014 | Fujii et al. | |

FOREIGN PATENT DOCUMENTS

| | | | | |
|---|---|---|---|---|
| DE | 10 2009 032 521 A1 | | 1/2011 | |
| DE | 10 2011 005 672 A1 | | 9/2012 | |
| DE | 102011005672 A1 | * | 9/2012 | ............ F02D 41/20 |
| EP | 1 164 283 A2 | | 12/2001 | |
| EP | 1 186 773 A2 | | 3/2002 | |
| EP | 1186773 A2 | * | 3/2002 | ............ F02M 45/12 |
| EP | 1 798 406 A2 | | 6/2007 | |
| EP | 2 455 601 A1 | | 5/2012 | |
| EP | 2455601 A1 | * | 5/2012 | ............ F02D 41/20 |
| EP | 2 469 064 A1 | | 6/2012 | |
| EP | 2 538 061 A2 | | 12/2012 | |
| EP | 2538061 A2 | * | 12/2012 | ............ F02D 41/20 |
| JP | 10-274086 A | | 10/1998 | |
| JP | 2001-355533 A | | 12/2001 | |
| JP | 2002-81358 A | | 3/2002 | |
| JP | 2002-201992 A | | 7/2002 | |
| JP | 2003-21024 A | | 1/2003 | |
| JP | 2005-163567 A | | 6/2005 | |
| JP | 2006-104989 A | | 4/2006 | |
| JP | 2006-266137 A | | 10/2006 | |
| JP | 2008-64038 A | | 3/2008 | |
| JP | 2008-297965 A | | 12/2008 | |
| JP | 2009-62946 A | | 3/2009 | |
| JP | 2011-190784 A | | 9/2011 | |
| JP | 2012-52419 A | | 3/2012 | |
| JP | 2013-2400 A | | 1/2013 | |
| JP | 2013-104402 A | | 5/2013 | |
| JP | 2013-108422 A | | 6/2013 | |
| JP | 2013-144971 A | | 7/2013 | |
| JP | 2013-160049 A | | 8/2013 | |
| JP | 2013-18149 A | | 9/2013 | |

OTHER PUBLICATIONS

International Search Report (PCT/ISA/210) issued in PCT Application No. PCT/JP2014/065839 dated Aug. 5, 2014, with English Translation (four (4) pages).
Japanese-language Office Action issued in counterpart Japanese Application No. 2017-079325 dated Sep. 18, 2018 with English translation (eight (8) pages).
European Office Action issued in counterpart European Application No. 14848205.2 dated Aug. 23, 2018 (five (5) pages).
Communication pursuant to Article 94(3) EPC issued in counterpart European Application No. 14848205.2 dated Sep. 12, 2019 (six (6) pages).
Japanese-language Office Action issued in counterpart Japanese Application No. 2017-079325 dated Mar. 13, 2018 with English translation (Ten (10) pages).

\* cited by examiner

FIG. 12

| DISPLACEMENT $\leftrightarrow$ | FIRST-ORDER APPROXIMATION $\rightarrow$ MAGNETIC FLUX | VOLTAGE |
|---|---|---|
| $x$ | $\phi$ | — |
| $\dfrac{dx}{dt}$ | $\dfrac{d\phi}{dt}$ | $V$ |
| $\dfrac{d^2x}{dt^2}$ | $\dfrac{d^2\phi}{dt^2}$ | $\boxed{\dfrac{dV}{dt}}$ |

DRIVE DEVICE FOR FUEL INJECTION DEVICE

TECHNICAL FIELD

The present invention relates to a drive device which drives a fuel injection device of an internal combustion engine.

BACKGROUND ART

As a background technique in the related art, there is Japanese Patent Application Laid-Open No. 2013-144971 (PTL 1). The publication is disclosed to provide a control device of an internal combustion engine which can control the fuel injection with high accuracy at the time of a half lift (a state of closing the valve while not being completely opened) of a fuel injection value (a fuel injection device), and the following configurations are disclosed. The control device of the internal combustion engine disclosed in PTL 1 includes a fuel injection valve which supplies fuel to the internal combustion engine, a unit which calculates an energizing time of the fuel injection valve, a sensor which detects whether the fuel injection valve is opened, and a unit that calculates and stores a valve opening delay time as a difference between an energizing start time to the fuel injection valve and a valve open detection time. In a case where an energizing time detection unit determines that the energizing time for the fuel injection valve is equal to or more than the predetermined value, the valve opening delay time is calculated and stored. In a case where the energizing time for the fuel injection valve is less than a predetermined value, the energizing time of the fuel injection valve is controlled based on the valve opening delay time stored in a storage unit, and the energizing time of the fuel injection valve is controlled to be increased (see Abstract). Further, in PTL 1, there is considered a configuration that a fuel amount required per one cycle is injected by being divided plural times (see Paragraph 0023).

CITATION LIST

Patent Literature

PTL 1: Japanese Patent Application Laid-Open No. 2013-144971

SUMMARY OF INVENTION

Technical Problem

There is known a method of performing the fuel injection with high accuracy by using a region (linear region) in which the energizing time (an injection pulse width) of a drive signal and a fuel injection amount are linearly changed by the fuel injection valve. On the other hand, the fuel injection in a half lift state is in a region (non-linear region) in which the fuel amount to be injected is not changed according to a change in one injection pulse width.

In PTL 1, there is disclosed a technique in which the fuel amount to be injected is controlled with high accuracy by correcting the energizing time at the time of the half lift in a case where the fuel amount required per one cycle is dividedly injected in consideration of a situation that the fuel is injected in the half lift state of the valve of a fuel injection tank. However, PTL 1 fails to take it into consideration that the accuracy of the fuel injection amount is increased by combining the fuel injections according to a plurality of injection pulse widths in a case where the fuel amount is injected by being divided plural times.

An object of the invention is to provide a drive device of a fuel injection device which can increase the accuracy of the fuel injection amount to be injected by combining the fuel injections according to a plurality of injection pulse widths.

Solution to Problem

In order to solve the above problem, there is provided a drive device of a fuel injection device according to the invention. The drive device performs the fuel injection such that the fuel injection by a full lift and the fuel injection by a half lift are included in plural times of division injections in a case where the fuel injection is performed to be divided plural times in one combustion cycle. Herein, the full lift means a valve opened state in which a valve element is displaced (the valve is opened) until a displacement amount of the valve element is regulated by a regulation member and the valve element reaches the regulation member. In addition, the half lift means a valve opened state at an intermediate opening level at which the valve element does not reach the regulation member.

Advantageous Effects of Invention

According to the invention, a total amount of fuel injected in a plurality of division injections can be approximated to a target injection amount by including the fuel injection by the half lift having a low control accuracy of the injection amount and the fuel injection by the full lift capable of controlling the injection amount with high accuracy in plural times of division injections performed in one combustion cycle. Therefore, it is possible to provide a drive device of a fuel injection device which can increase the accuracy of the fuel injection amount to be injected.

BRIEF DESCRIPTION OF DRAWINGS

FIG. 12 is a table showing a correspondence relation between a displacement (referred to as gap x) between the movable element and a fixed core, a magnetic flux φ passing through an attraction plane between the movable element and the fixed core, and the inter-terminal voltage Vinj of the solenoid in the first embodiment.

DESCRIPTION OF EMBODIMENTS

Hereinafter, embodiments of the invention will be described using the drawings.

First Embodiment

Hereinafter, the operations of a fuel injection system which includes a fuel injection device and a drive device according to the invention will be described using FIGS. 1 to 7.

Figure 1:
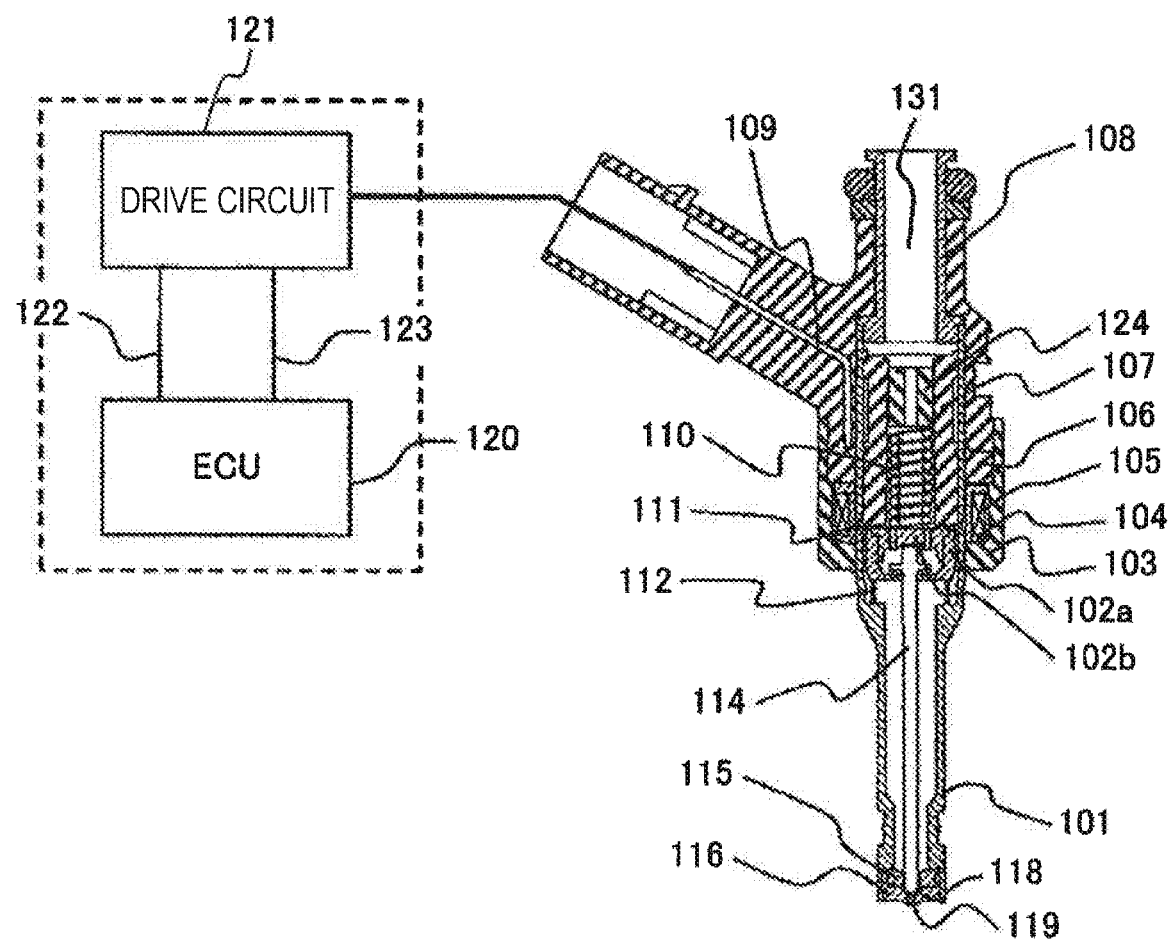
FIG. 1 is a diagram illustrating a vertical cross-sectional view of a fuel injection device in a first embodiment according to the invention, and a configuration of a drive circuit and an engine control unit (ECU) which are connected to the fuel injection device.

First, the configurations and the basis operations of the fuel injection device and the drive device will be described using FIG. 1. FIG. 1 is a diagram illustrating a vertical cross-sectional view of the fuel injection device and an exemplary configuration of a drive circuit 121 and an ECU (engine control unit) 120 to drive the fuel injection device.

In this embodiment, the ECU 120 and the drive circuit 121 are provided by separate devices, but the ECU 120 and the drive circuit 121 may be provided by an integrated device. Further, the device configured by the ECU 120 and the drive circuit 121 will be described as a drive device hereinafter.

The ECU 120 acquires signals indicating the states of the engine from various types of sensors, and calculates a width of an injection pulse and an injection timing for the control of an injection amount of the fuel injection device according to an operation condition of an internal combustion engine. The injection pulse output by the ECU 120 is input to the drive circuit 121 of the fuel injection device through a signal line 123. The drive circuit 121 controls a voltage to be applied to a solenoid 105, and supplies a current. The ECU 120 communicates with the drive circuit 121 through a communication line 122, and can change a drive current generated by the drive circuit 121 according to a pressure of the fuel supplied to the fuel injection device and an operation condition, and can change setting values such as a current and a time. The drive circuit 121 can change a control parameter through the communication with the ECU 120, and can change a setting value of a current waveform according to the control parameter.

Figure 2:
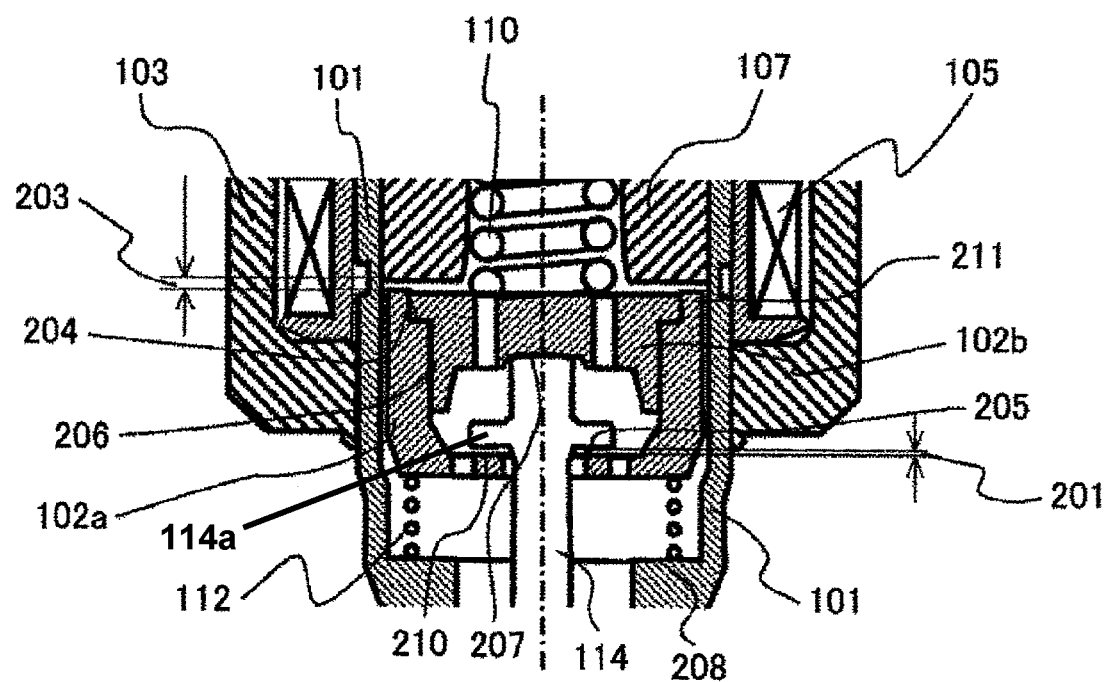
FIG. 2 is a diagram illustrating an enlarged cross-sectional view of a structure of a drive portion of the fuel injection device in the first embodiment.
Figure 3:
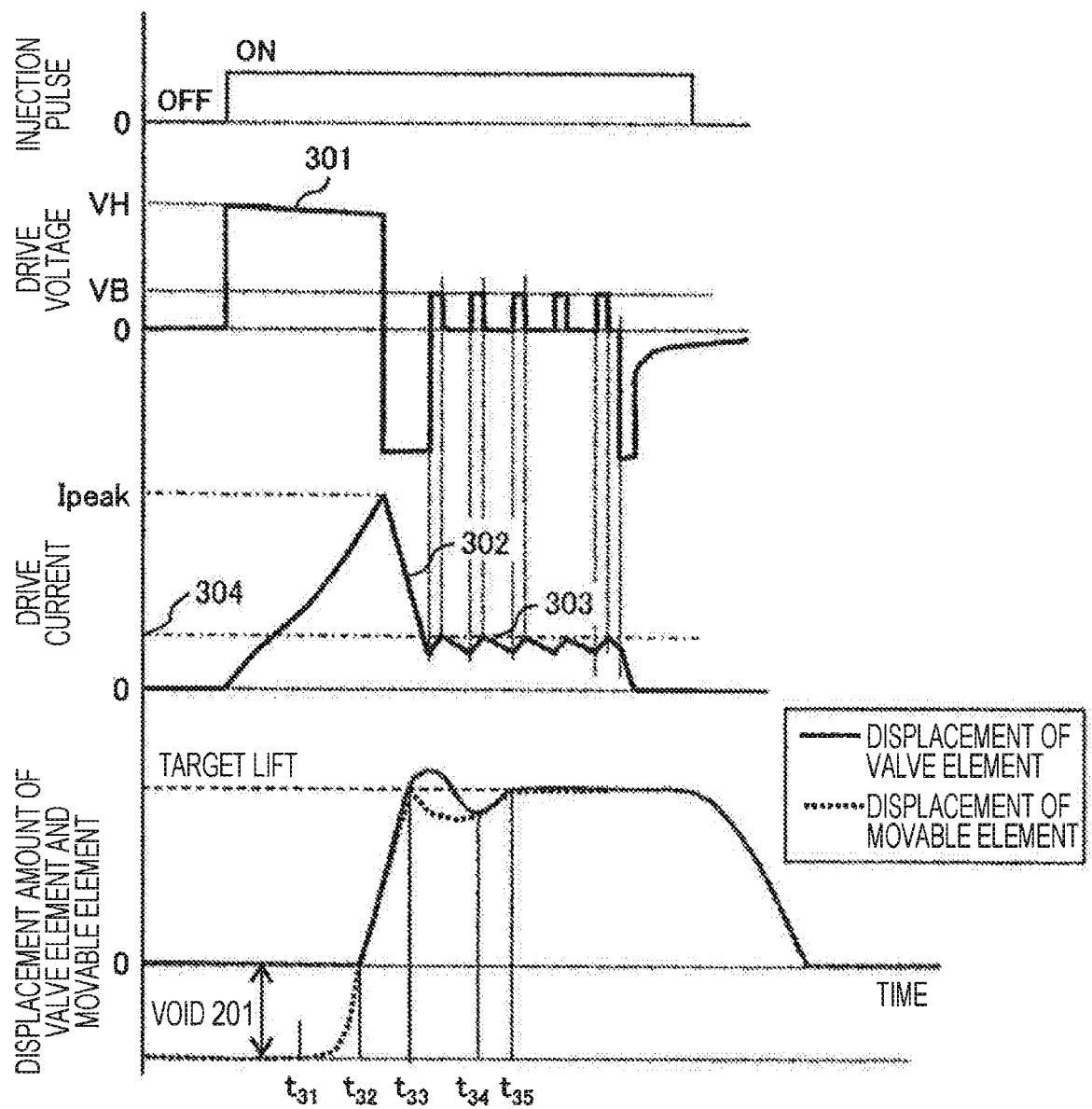
FIG. 3 is a diagram illustrating a relation between an injection pulse by which the fuel injection device in the first embodiment is driven, an inter-terminal voltage applied to a solenoid of the fuel injection device, a drive current, displacement amounts of a valve element and a movable element, and time.

Next, the configuration and the operation of the fuel injection device will be described using the vertical cross-sectional view of the fuel injection device of FIG. 1 and the enlarged cross-sectional view of the vicinity of movable elements 102a and 102b and the movable member 114 of FIG. 2. Further, the movable elements 102a and 102b may be configured as an integrated component. The component configured by the movable elements 102a and 102b is referred to as a movable element 102. The fuel injection device illustrated in FIGS. 1 and 2 is a normally closed electromagnetic valve (a magnetic fuel injection device), the movable element 102b is biased in a valve closing direction by a spring (a first spring) 110 in a state where the solenoid (a coil) 105 is not energized, and an end surface 207 of the movable element 102b on a side near a valve element 114 and an end surface above the valve element 114 come in contact with each other. At this time, since a load by the set spring 110 is applied on the valve element 114 through the movable element 102b, the valve element 114 is biased toward a valve seat 118 to tightly abut on the valve seat 118 so as to be in a valve closed state. In the valve closed state, a force of the spring 110 applied in the valve closing direction and a force of a return spring (a second spring) 112 in a valve opening direction are applied on the movable element 102. At this time, since the force of the spring 110 is large compared to that of the return spring 112, the end surface 207 of the movable element 102b comes in contact with the valve element 114, and the movable element 102 is stopped. In addition, in the valve closed state, a void 201 is formed between the movable element 102a and a contact surface 205 of the valve element 114 with respect to the movable element 102a. In addition, in this state, a gap is formed between the movable element 102 and a fixed core 107. In addition, the valve element 114 and the movable element 102 are configured to be relatively displaced, and contained in a nozzle holder 101. In addition, the nozzle holder 101 includes an end surface 208 serving as a spring seat of the return spring 112. The force of the spring 110 is adjusted at the time of assembly by a pushing amount of a spring retainer 124 which is fixed into the internal diameter of the fixed core 107. Further, a biasing force of a zero-position spring 112 is set to be smaller than that of the spring 110.

In addition, the fuel injection device includes a magnetic circuit using the fixed core 107, the movable element 102, the nozzle holder 101, and a housing 103, and has a void between the movable element 102 and the fixed core 107. A magnetic throttling member 111 is formed in a portion corresponding to the void between the movable element 102 of the nozzle holder 101 and the fixed core 107. The solenoid 105 is provided on the outer peripheral side of the nozzle holder 101 in a state of being wound on a bobbin 104. A rod guide 115 is provided to be fixed to the nozzle holder 101 in the vicinity of a tip of the valve element 114 on a side near the valve seat 118. The rod guide 115 may be configured as an integrated component with an orifice cup 116. The valve element 114 is guided to move in a valve axis direction by two rod guides of a first rod guide 113 and a second rod guide 115. The valve seat 118 and a fuel injection hole 119 are formed in the orifice cup 116 which is fixed to a tip of the nozzle holder 101, and the inner space (fuel passage) where the movable element 102 and the valve element 114 are provided is sealed from the outside.

The fuel supplied to the fuel injection device is supplied through a rail pipe which is provided on the upstream side of the fuel injection device, and flows up to the tip of the valve element 114 through a first fuel passage hole 131. The fuel is sealed by the valve seat 118 and a seat portion formed at the tip of the valve element 114 on a side near the valve seat 118. At the time when the valve is closed, a pressure difference occurs between the upper and lower portions of the valve element 114 by the fuel pressure, and the valve element 114 is pressed in the valve closing direction by the fuel pressure and a force applying on a pressure-receiving surface of a seat internal diameter at a valve seat position. In the valve closed state, the void 201 is provided between the movable element 102a and the contact surface 205 of the valve element 114 with respect to the movable element 102a. When a current is supplied to the solenoid 105, the magnetic circuit generates a magnetic field which causes a magnetic flux to pass through between the fixed core 107 and the movable element 102, and a magnetic attraction force is operated on the movable element 102. At a timing when the magnetic attraction force operated on the movable element 102 exceeds the load by the set spring 110, the movable element 102 starts to be displaced in a direction of the fixed core 107. At this time, since the valve element 114 and the valve seat 118 come in contact with each other, the movement of the movable element 102 is an idle movement in which the movement is performed separately from the valve element 114 receiving a differential force due to the fuel pressure. Therefore, the movement can be made at high speed without receiving an influence such as the fuel pressure.

When a displacement amount of the movable element 102 is different from the size of the void 201, the movable element 102 transfers a force to the valve element 114 through the contact surface 205, and pulls up the valve element 114 in the valve opening direction. At this time, since the movable element 102 in the idle movement comes into conflict with the valve element 114 while having kinetic energy, the valve element 114 receives the kinetic energy of the movable element 102 and starts to be displaced in the valve opening direction at high speed. The valve element 114 is under the differential force generated by the fuel pressure. The differential force operated on the valve element 114 is generated because the flow rate of the fuel of the seat portion is increased in a range in which a flow passage cross-sectional area in the vicinity of the seat portion of the valve element 114 is small, and the pressure at the tip of the valve element 114 falls down by a pressure drop due to a decrease in hydrostatic pressure according to Bernoulli effect. Since the differential force is greatly influenced by the flow passage cross-sectional area of the seat portion, the differential force becomes large on a condition that the displacement amount of the valve element 114 is small, and the differential force becomes small on a condition that the displacement amount is large. Therefore, the valve opening of the valve element 114 is percussively performed by the idle movement of the movable element 102 at a timing when the valve element 114 starts to be opened from the valve closed state and the displacement is small, and a valve opening operation having a large differential force is hardly performed, so that the valve opening operation can be performed even in a state where a higher fuel pressure is operated. Alternatively, the spring 110 can be set to have a stronger force with respect to the necessary range of the fuel pressure to enable the operation. When the spring 110 is set to have a stronger force, a time required for a valve closing operation (described below) can be shortened, and it is effective for the control of a minute injection amount.

After the valve element 114 starts the valve opening operation, the movable element 102 comes into conflict with the fixed core 107. When the movable element 102 comes into conflict with the fixed core 107, the movable element 102 is rebounded, but the movable element 102 is attracted to a magnetic core and stops rebounding by the magnetic attraction force operated on the movable element 102. At this time, since a force in a direction of the fixed core 107 is operated on the movable element 102 by the return spring 112, the displacement amount by rebounding becomes small, and a time taken for convergence of the rebounding movement can be shortened. With the small rebounding movement, a time when the gap between the movable element 102 and the fixed core 107 becomes large is shortened, and the operation becomes stable even with respect to a smaller injection pulse width.

In this way, the movable element 102 and the valve element 114 ended in the valve opening operation are stopped in a valve opened state. In the valve opened state, a gap is generated between the valve element 114 and the valve seat 118, and the fuel is injected. The fuel passes through a center hole provided in the fixed core 107, an upper fuel passage hole provided in the movable element 102, and a lower fuel passage hole provided in the movable element 102 so as to flow in a downstream direction.

When the energizing to the solenoid 105 is ended, the magnetic flux generated in the magnetic circuit disappears, and the magnetic attraction force also disappears. Since the magnetic attraction force operated on the movable element 102 disappears, the valve element 114 is forced back to a close position and comes in contact with the valve seat 118 by the load of the spring 110 and the force of the fuel pressure.

In addition, in a case where the movable element 102 is divided into the movable element 102a and the movable element 102b, the valve element 114 comes in contact with the valve seat 118 so as to enter the valve closed state. Therefore, the movable element 102b comes in contact with the movable element 102a in a flange portion 211 provided its outer periphery, and the movable element 102b comes in contact with the upper end surface of the valve element 114 in a contact surface 210. When the movable element 102a performs the valve opening operation from an initial position, the movable element 102b also performs the valve opening operation in cooperation.

In addition, the movable element 102a and the movable element 102b are configured to be slidable in a sliding surface 206. When the valve element 114 is closed from the valve opened state, the valve element 114 comes in contact with the valve seat 118, and then the movable element 102a is separated from the valve element 114 and the movable element 102b and moves in the valve closing direction. After a certain period of time, the movable element 102a is returned by the return spring 112 up to the initial position of the valve closed state.

Since the movable element 102a is separated from the movable element 102b and the valve element 114 at the moment when the valve element 114 is completely opened, the movable element 102 can be decreased in mass. Therefore, the collision energy generated when coming into conflict with the valve seat 118 can be decreased, and the bounding of the valve element 114 generated when the valve element 114 comes into conflict with the valve seat 118 can be suppressed.

In a state where the valve element 114 is stopped at a target lift position (that is, the valve opened state), a projection of a collision portion is provided in any one or both of the movable element 102 and the fixed core 107 in the annular end surface between the movable element 102 and the fixed core 107. In addition, in the valve opened state, a void is formed by the projection with respect to the movable element 102 or the movable element 102 except the projection of the fixed core 107, or with respect to the surface on a side near the fixed core 207. There is provided one or more fuel passages through which a fluid can move in the outer diameter direction and the inner diameter direction of the projection in the valve opened state. With the effects of the projection and the fuel passage, it is possible to decrease a squeeze force generated in a direction hindering the movement of the movable element 102 caused by a change in pressure in a minute gap between the movable element 102 and the fixed core 107. Therefore, it is possible to decrease a valve close delay time until the valve element 114 is closed after the injection pulse is stopped. In general, martensitic stainless steel or ferritic stainless steel having an excellent magnetic property has low hardness and strength of the material. When the martensitic stainless steel is subjected to thermal processing in order to increase the hardness, the magnetic property may be degraded. The end surface of the projection may be subjected to a plating process such as a hard chrome plating in order to prevent that the projection is worn out by the collision between the movable element 102 and the fixed core 107. In the operation of forcing the valve element 114 back to the close position, the movable element 102 moves together with a regulation member 114a of the valve element 114 in an engaged state.

In the fuel injection device of this embodiment, the valve element 114 and the movable element 102 are relatively displaced in a very short time at the moment when the movable element 102 comes into conflict with the fixed core 107 in the opening of the valve, and at the moment when the valve element 114 comes in conflict with the valve seat 118 in the closing of the valve, so that the bounding with respect to the fixed core 107 of the movable element 102 and the bounding with respect to the valve seat 118 of the valve element 114 are effectively suppressed.

Further, with the above configuration, the spring 110 biases the valve element 114 in a direction opposed to the drive force by the magnetic attraction force, and the return spring 112 biases the movable element 102 in a direction opposed to the biasing force of the spring 110.

Figure 4:
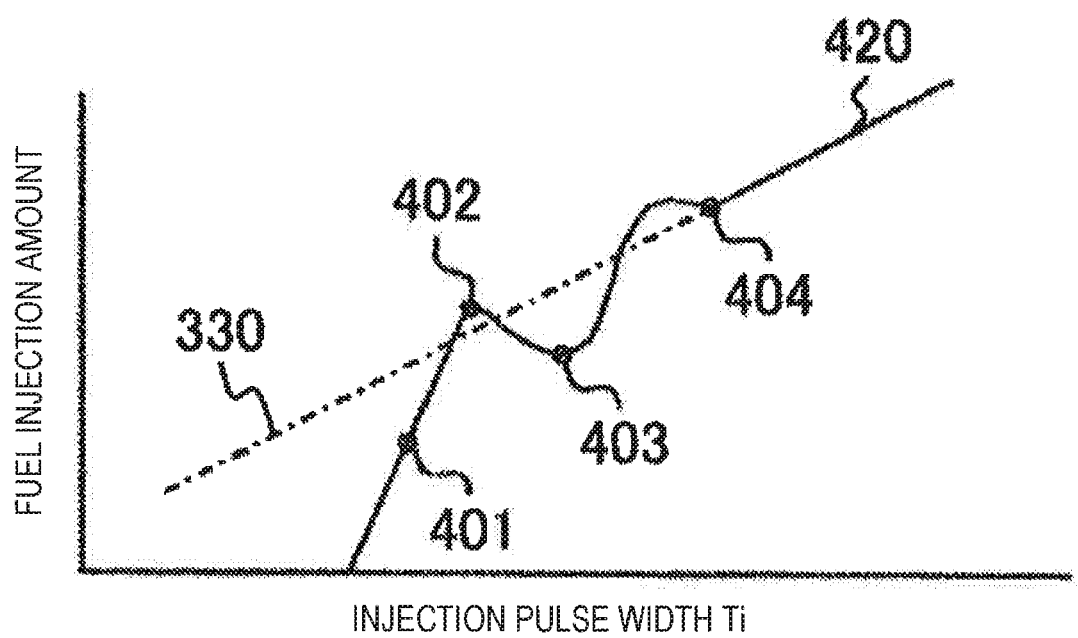
FIG. 4 is a graph illustrating a relation between an injection pulse width Ti output from an ECU in FIG. 3 and a fuel injection amount injected from the fuel injection device.

Next, the description will be made about a relation between the injection pulse output from the drive device 121 driving the fuel injection device in the invention, the drive voltage applied on both terminals of the solenoid 105 of the fuel injection device, the drive current (excitation current), the displacement amount of the valve element 114 of the fuel injection device (a behavior of the valve element) (FIG. 3), and a relation between the injection pulse and the fuel injection amount (FIG. 4).

When the injection pulse is input to the drive circuit 121, the drive circuit 121 applies a high voltage 301 boosted by a high voltage source to the solenoid 105, and starts to supply the current to the solenoid 105. When the current value reaches a peak current value Ipeak set in advance by the ECU 120, the application of the high voltage 301 is stopped. Thereafter, the applying voltage value is set to 0 V or less, and the current value falls down as depicted by a current 202. When the current value becomes smaller than a predetermined current value 304, the drive circuit 121 controls the current to be a predetermined current 303 by switching the application of a battery voltage VB.

The fuel injection device is driven as the profile of the supplied current as described above. The movable element 102 starts to be displaced at a timing t31 until the current reaches the peak current value Ipeak after the high voltage 301 is applied. The movable element 102 comes into conflict with the valve element 114 at a timing t32 when the void 201 moves by the displacement, and the displacement of the valve element 114 is significantly increased using the collision. Thereafter, the valve element 114 reaches the target lift position before shifting to a holding current 303. After reaching the target lift position, the movable element 102 is bounded by the collision between the movable element 102 and the fixed core 107. Since the valve element 114 is configured to be relatively displaced with respect to the movable element 102, the valve element 114 is separated from an anchor 102, the valve element 114 is displaced exceeding the target lift position. Thereafter, the movable element 102 is stopped at a predetermined target lift position by the magnetic attraction force generated by the holding current 303 and the force of the return spring 112 in the valve opening direction. In addition, the valve element 114 is also stopped at the target lift position, so that the valve element enters a stable opened state.

In a case where the fuel injection device has a movable valve configured by integrating the valve element 114 and the movable element 102, the displacement amount of the valve element 114 does not become larger than the target lift position, but becomes equal to the displacement amount of the movable element 102 and the valve element 114 after reaching the target lift. In a case where the movable element 102 and the valve element 114 are integrated in the fuel injection device, the integrated component (hereinafter, referred to as a movable valve) becomes a component of the magnetic circuit to generate the magnetic attraction force, and has two functions of opening/closing the valve seat 118. Further, in a case where the movable element 102 is divided into the movable element 102a and the movable element 102b, the movable element 102b comes in contact with the upper end surface of the valve element 114 and stopped after the valve element 114 reaches a valve closing position, the movable element 102a is separated from the valve element 114 and moves in the valve closing direction. After moving in a predetermined period of time, the movable element 102a is returned up to the initial position of the valve closed state by the return spring 112. Since the movable element 102a is separated from the movable element 102b and the valve element 114 at the moment when the valve element 114 is completely opened, the mass of the movable element 102 can be decreased. Therefore, the collision energy necessary when coming into conflict with the valve seat 118 can be made small, and the bounding of the valve element 114 generated when the valve element 114 comes into conflict with the valve seat 118 can be suppressed. In addition, the mass of the movable element 102b may be made smaller than that of the movable element 102a. With the effect, an impulse force necessary when the valve element 114 comes into conflict with the valve seat 118 can be made small, so that the bounding of the valve element 114 generated when the valve element 114 comes into conflict with the valve seat 118 can be suppressed. Therefore, it is possible to suppress an unexpected injection after the valve element 114 and the valve seat 118 come in contact with each other. Next, a relation between an injection pulse width T and the fuel injection amount will be described using FIG. 4. Since the magnetic attraction force operated on the movable element 102 is not larger than the force of the set spring 110 operated on the movable element 102 on a condition that an injection pulse width Ti does not reach a predetermined period, the valve element 114 is not opened and the fuel is not injected. In addition, even in a case where the magnetic attraction force operated on the movable element 102 is larger than the load of the set spring, the injection pulse is stopped before the movable element 102 runs out the void 201 which is an approaching section of. Even in a case where the magnetic attraction force operated on the movable element 102 and an inertial force of the movable element 102 in the valve opening direction are smaller than the force of the set spring 110, the fuel is not injected. On a condition that the injection pulse width Ti is short as indicated by 401 for example, the valve element 114 is separated from the valve seat 118 and the lift starts, but the valve element starts to be closed before the valve element 114 reaches the target lift position, so that the injection amount becomes small with respect to a chain line 330 extrapolated from a straight line region 420. In addition, in the pulse width at Point 402, the valve element starts to be closed immediately after reaching the target lift position, the locus of the valve element 114 draws a parabola. In this condition, since the kinetic energy of the valve element 114 in the valve opening direction is large, and the magnetic attraction force operated on the movable element 102 is large, a ratio of the time required for closing the valve element becomes large, and the injection amount becomes large with respect to a chain line 430. In the injection pulse width at Point 403, the valve element starts to be closed at a timing t343 when the bounding amount of the movable element 102 after reaching the target lift is maximized. At this time, a repulsive force when the movable element 102 and the fixed core 107 come into conflict with each other affects the movable element 102 to decrease the valve close delay time until the valve element 114 is closed after the injection pulse is turned off. As a result, the injection amount becomes small with respect to the chain line 330. Point 404 indicates a state where the valve element starts to be closed at a timing t35 immediately after the bounding of the movable element 102 and the bounding of the valve element 114 converge. On a condition that the injection pulse Ti becomes larger than that at Point 404, the valve close delay time is increased along the substantial straight line as the injection pulse width Ti is increased, and the injection amount of the fuel is linearly increased. In a region up to the pulse width Ti indicated by Point 404 after the fuel starts to be injected, the bounding of the valve element 114 is not stabilized when the valve element 114 does not reaches the target lift or even when the valve element 114 reaches the target lift, so that the injection amount varies.

In order to decrease a minimum injection amount which can be controlled by the ECU 120, there is a need to increase the region where the injection amount of the fuel is linearly increased as the injection pulse width Ti is increased, or to correct the injection amount of a non-linear region where the relation between the injection pulse width Ti smaller than that at Point 404 and the injection amount. In a typical drive current waveform described in FIG. 3, the bounding of the valve element 114 generated by the collision between the movable element 102 and the fixed core 107 is large, and the valve element starts to be closed in the middle of the bounding of the valve element 114. Therefore, the non-linearity occurs in a short region of the injection pulse width Ti up to Point 404, and the non-linearity deteriorates the minimum injection amount. Therefore, there is a need to decrease the bounding of the valve element 114 generated after reaching the target lift position in order to improve the non-linearity of the injection amount characteristic on a condition that the valve element 114 reaches the target lift. In addition, since the valve element 114 shows different behaviors depending on a dimensional tolerance, the timing when the movable element 102 and the fixed core 107 come in contact with each other is different in each fuel injection device, and a variation occurs in the collision speed between the movable element 102 and the fixed core 107. Therefore, the bounding of the valve element 114 varies in individual device of the fuel injection device, and an individual variation in the injection amount becomes large.

Figure 5:
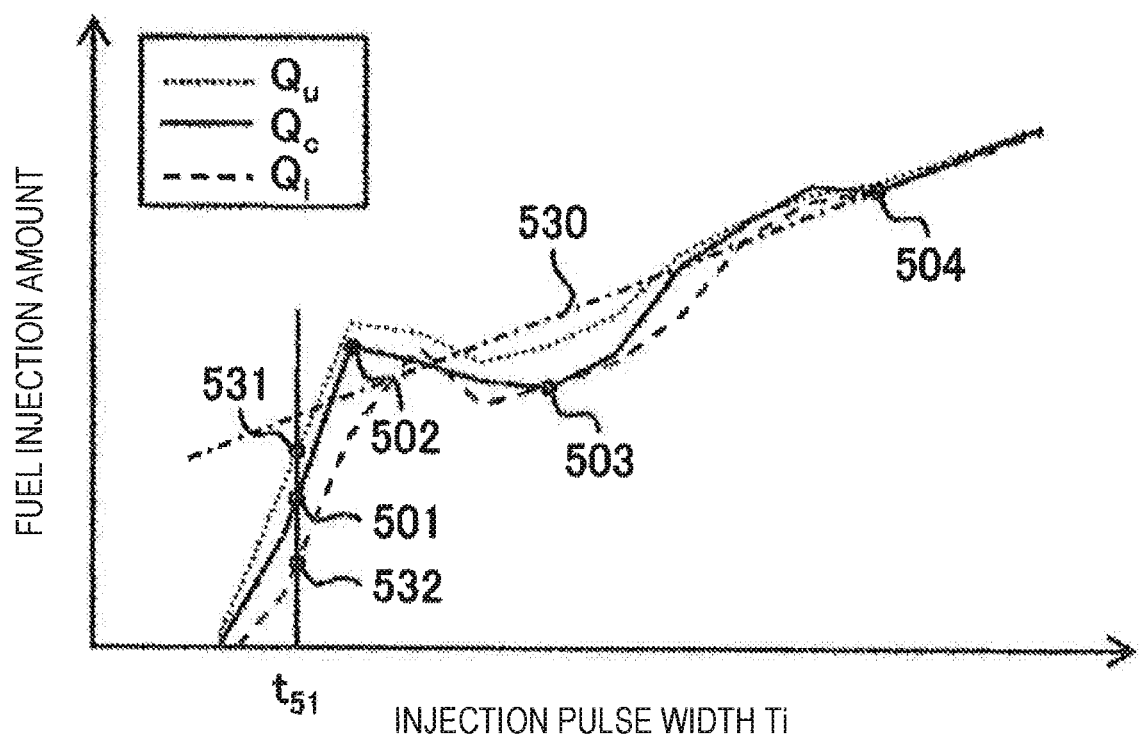
FIG. 5 is a graph illustrating a relation between the injection pulse width Ti and the fuel injection amount of the fuel injection device which has an individual variation in an injection amount characteristic.
Figure 6:
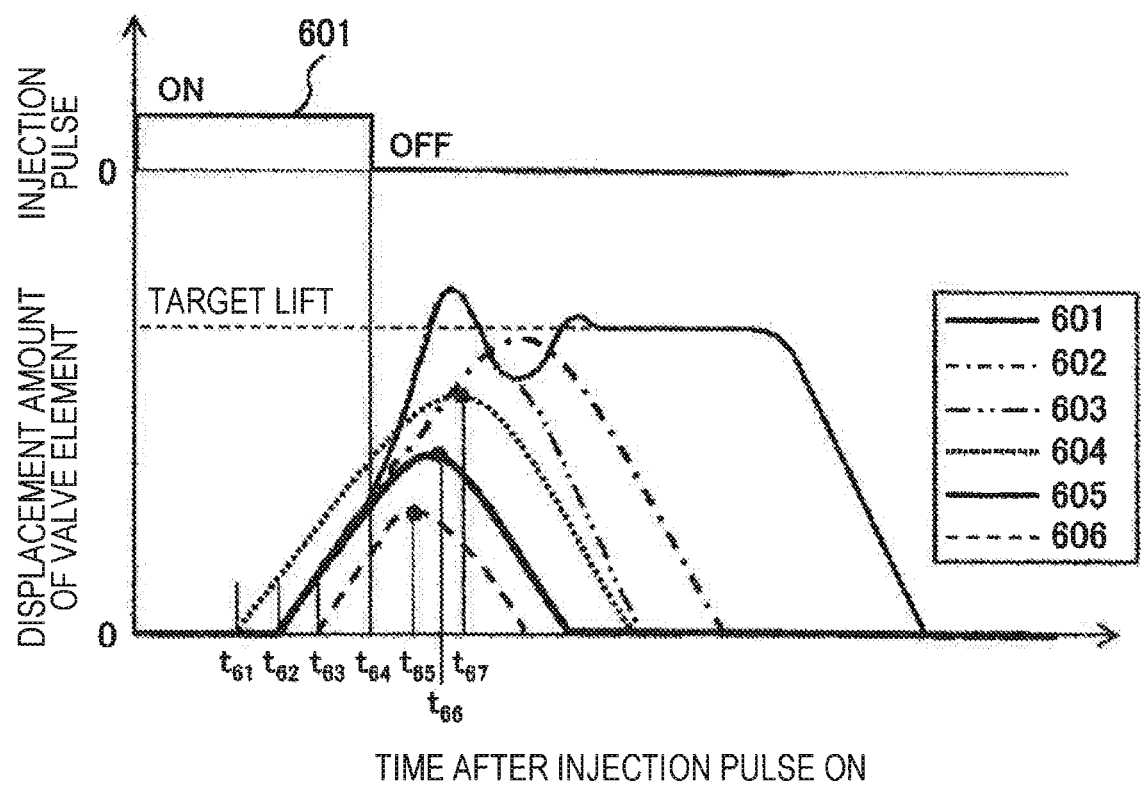
FIG. 6 is a graph illustrating valve behaviors at points 501, 502, 503, 531, and 532 in FIG. 5.
Figure 7:
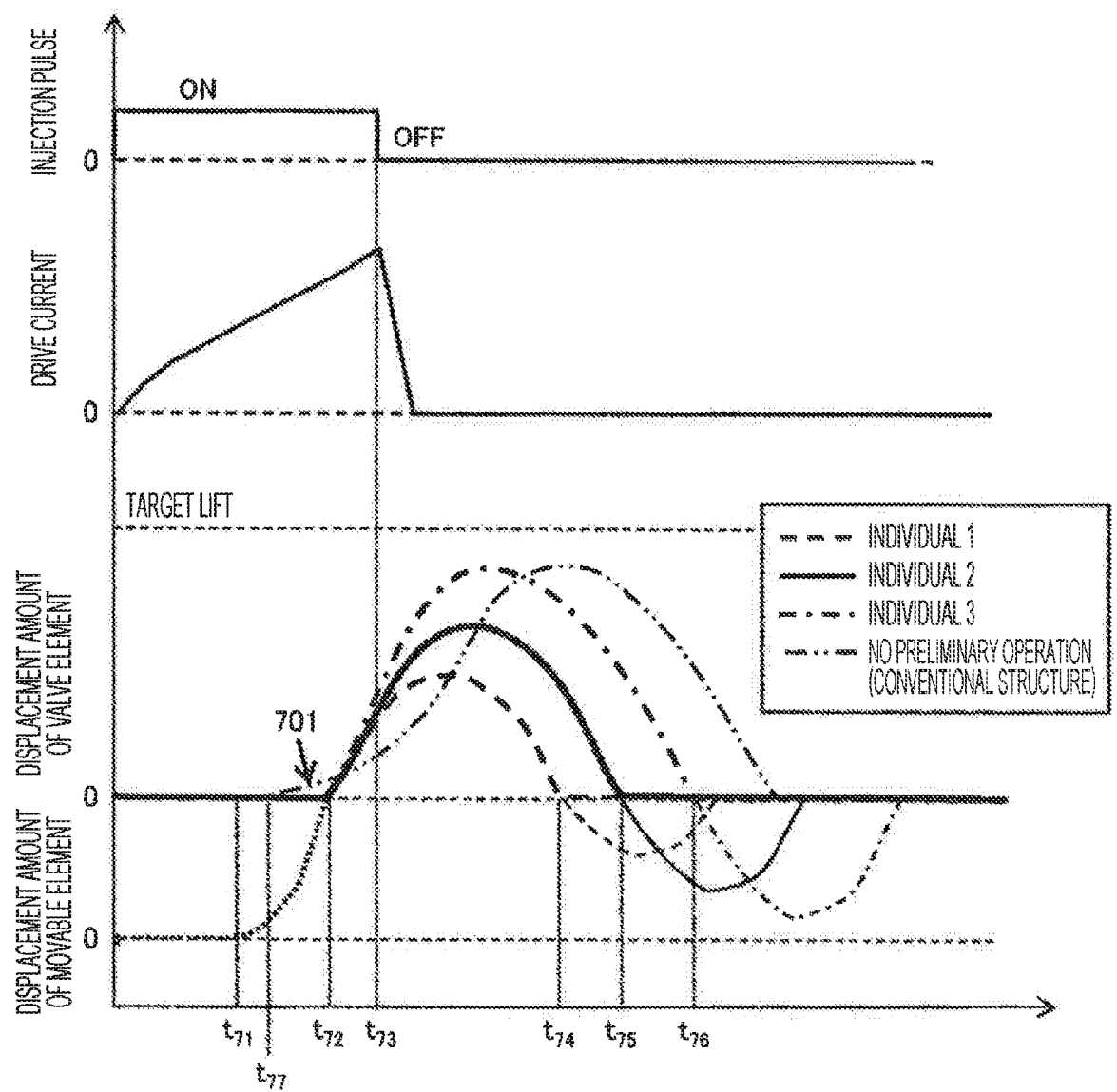
FIG. 7 is a graph illustrating a relation between the injection pulse width Ti output from the drive device, the drive current, a displacement amount of the valve element, a displacement amount of the movable element, and time.
Figure 8:
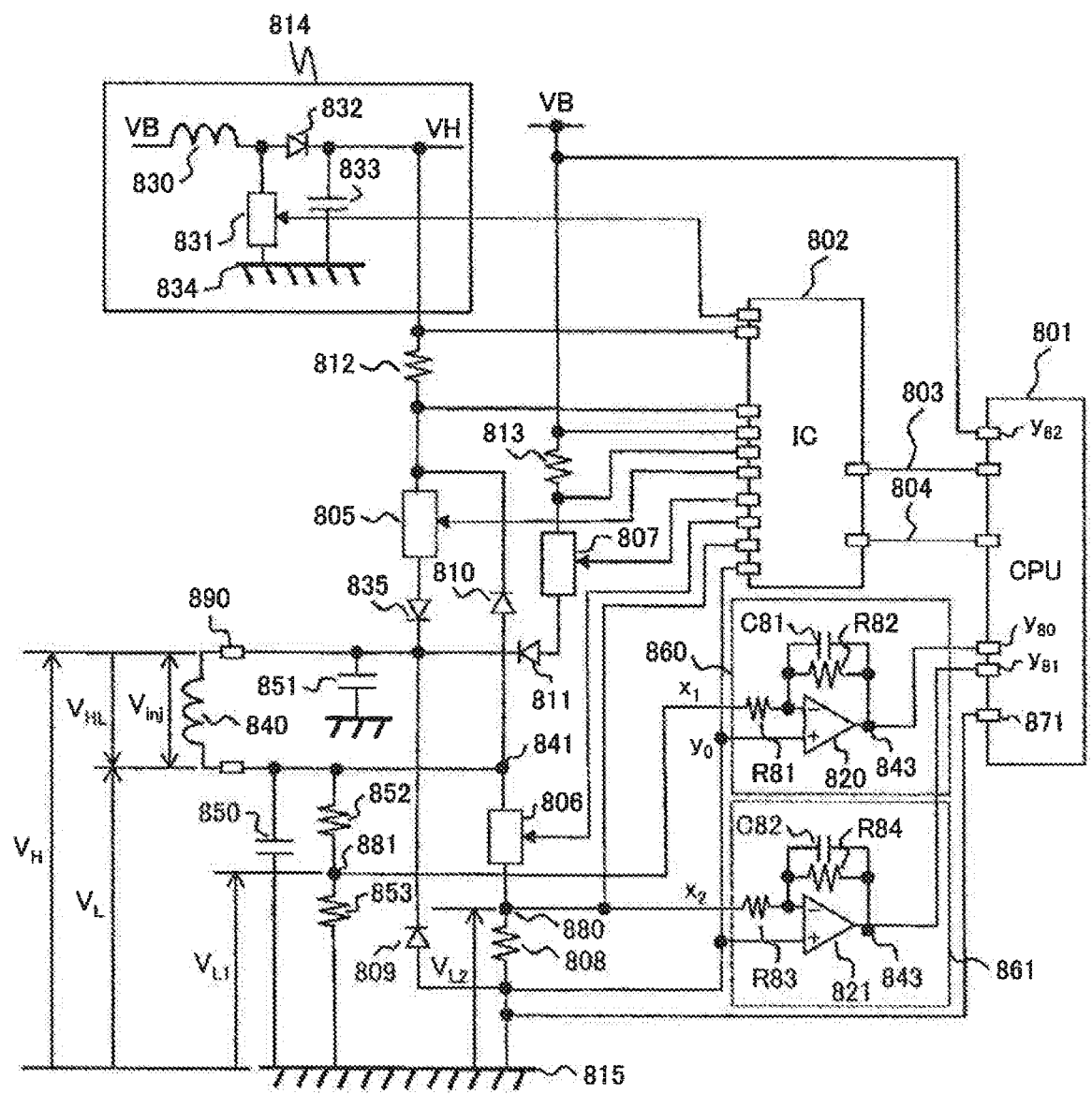
FIG. 8 is a diagram illustrating details of the drive device and the ECU (engine control unit) of the fuel injection device.
Figure 9:
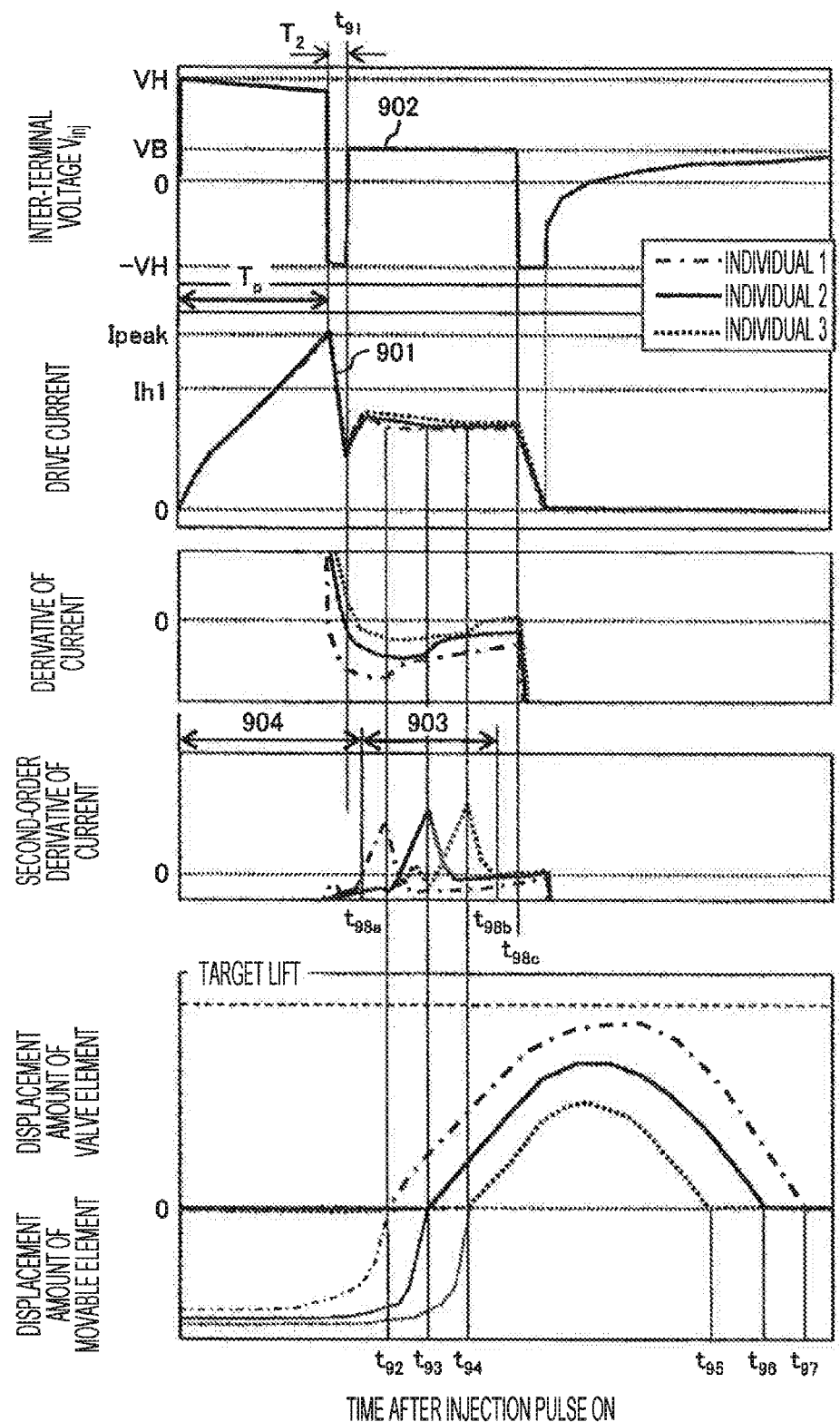
FIG. 9 is a graph illustrating a relation between the injection pulse width Ti, the drive current, a current derivative, a second-order derivative of a current, a displacement amount of the valve element, the displacement amount of the movable element, and time of three fuel injection devices having different operation timings of the valve element under an influence of a change in dimensional tolerance in the first embodiment.
Figure 10:
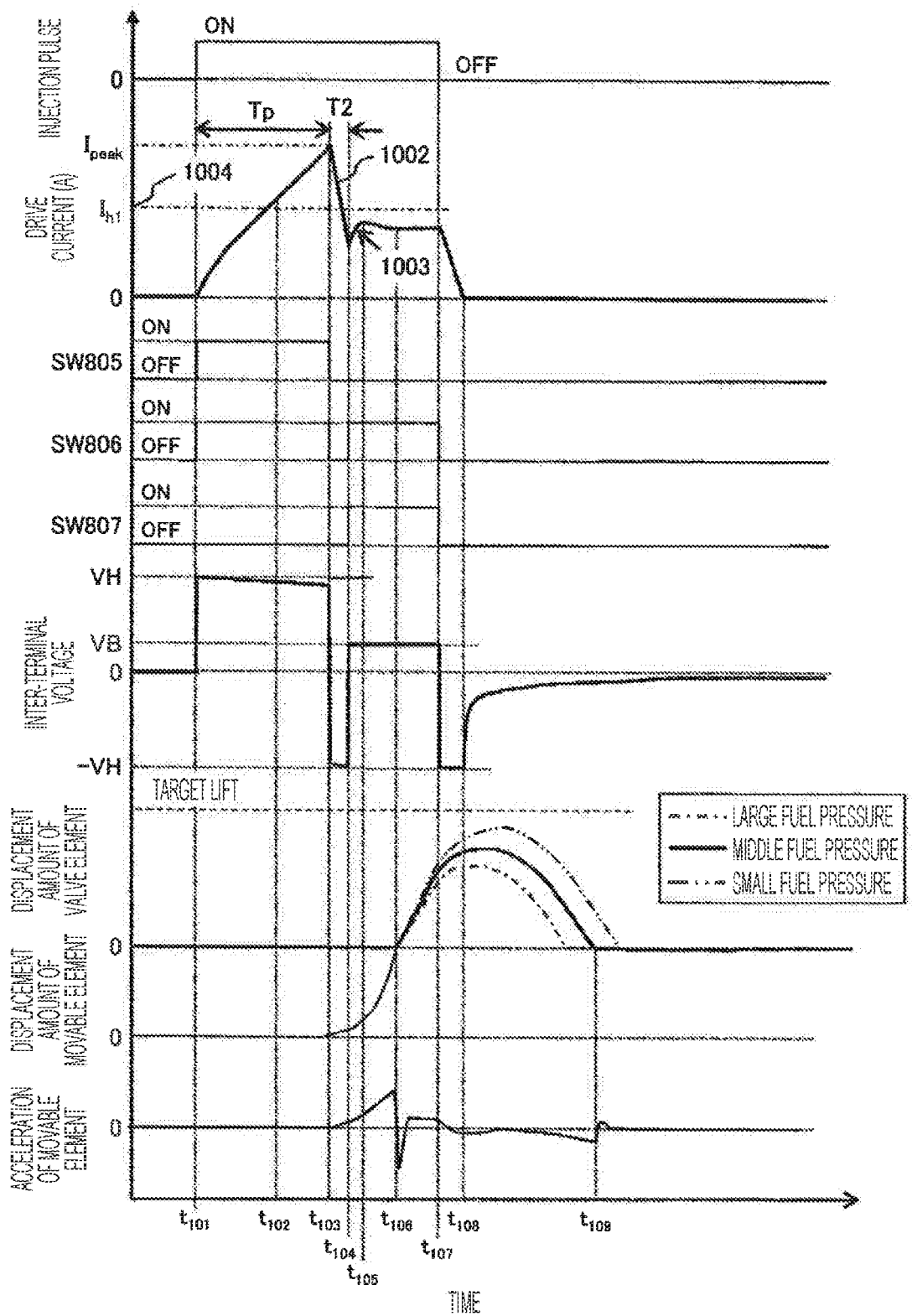
FIG. 10 is a graph illustrating a relation between the injection pulse Ti, the drive current supplied to the fuel injection device, the operation timings of switching elements of the drive device, the inter-terminal voltage Vinj of the solenoid, the displacement amounts of the valve element and the movable element, an acceleration of the movable element, and time in the first embodiment.
Figure 11:
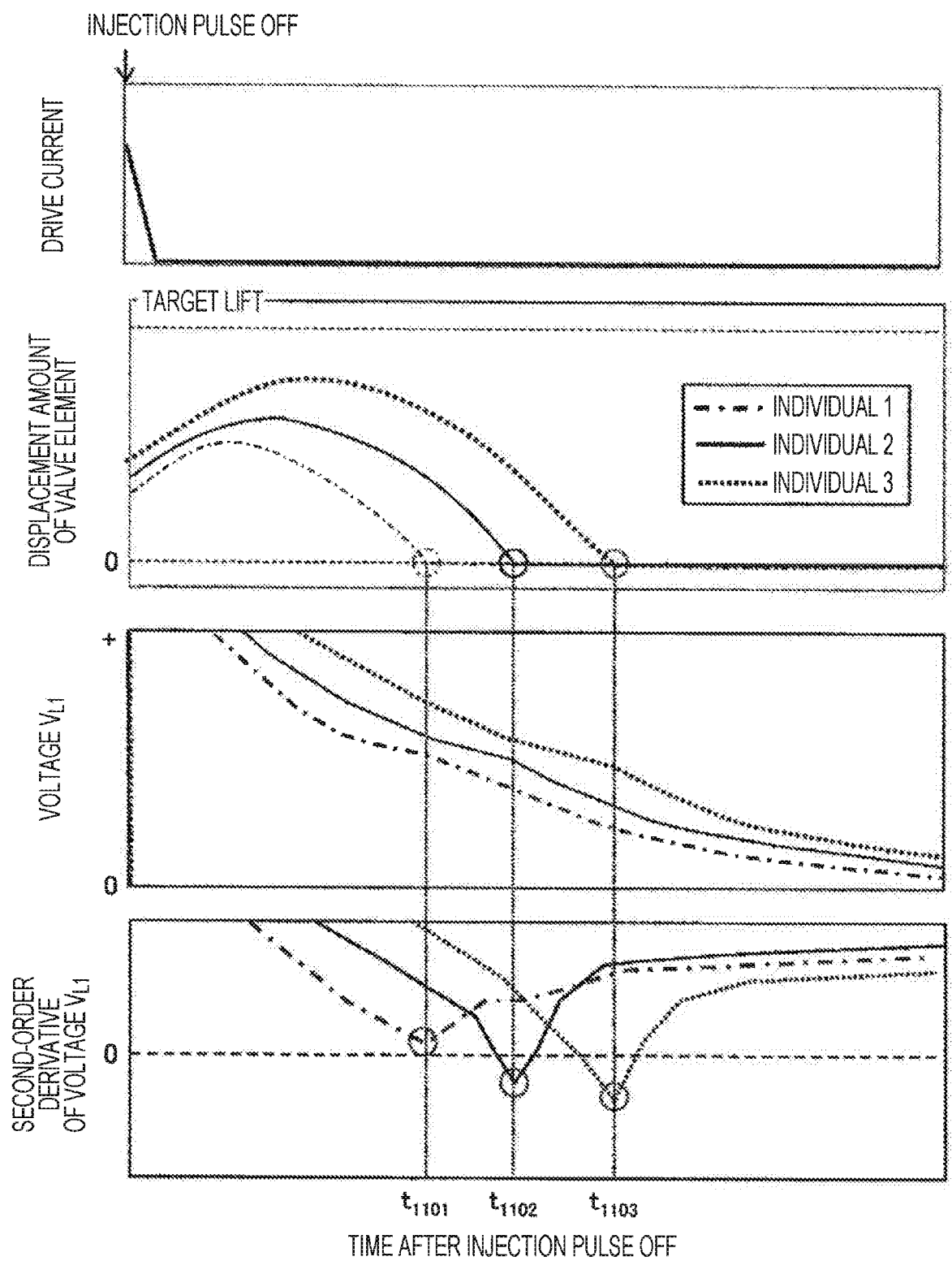
FIG. 11 is a graph illustrating an enlarged view of the drive current supplied to the solenoid 105, displacement amounts of valve elements of three individual devices having different valve close behaviors due to a variation in the dimensional tolerance of the fuel injection device, and a voltage VL1 in the first embodiment, illustrating a relation with respect to a second-order derivative of the voltage VL1.
Figure 13:
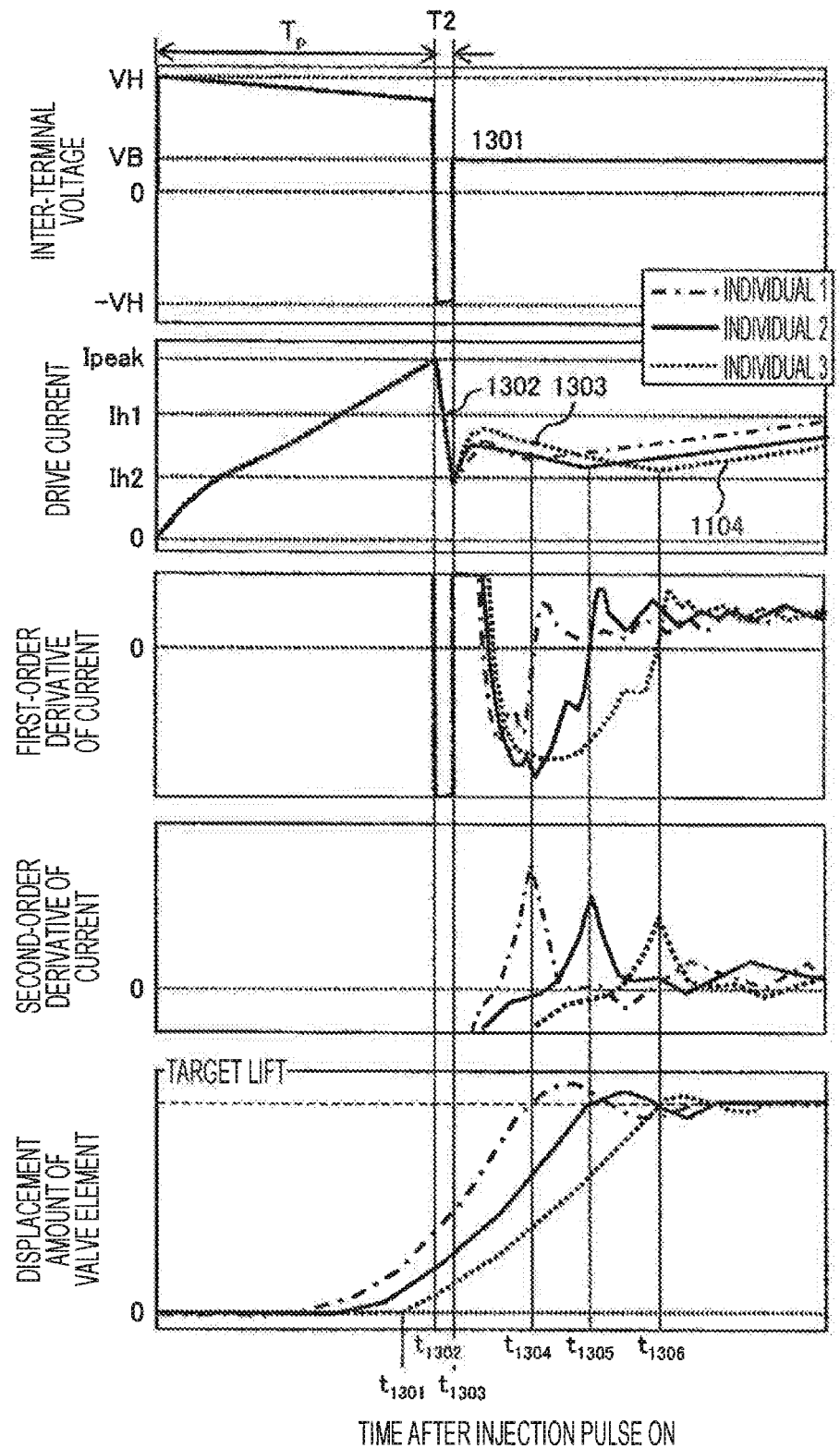
FIG. 13 is a graph illustrating a relation between the inter-terminal voltage Vinj, the drive current, a first-order derivative of the current, the second-order derivative of the current, the displacement amount of the valve element, and time in three fuel injection devices having different valve opening/opened timings on a condition that the valve element reaches a target lift in the first embodiment.
Figure 14:
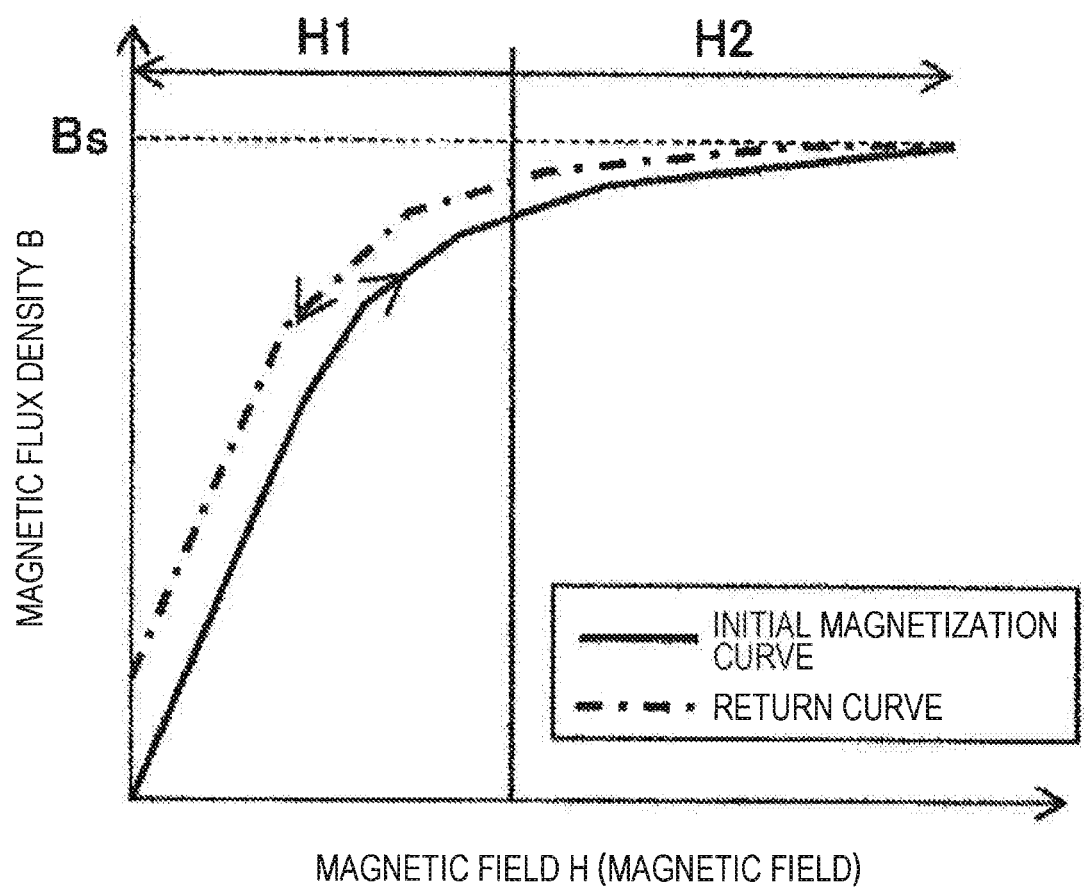
FIG. 14 is a graph illustrating an initial magnetization curve and a return curve of a magnetization curve (BH curve) of a magnetic material which is used in a magnetic circuit in the first embodiment.
Figure 15:
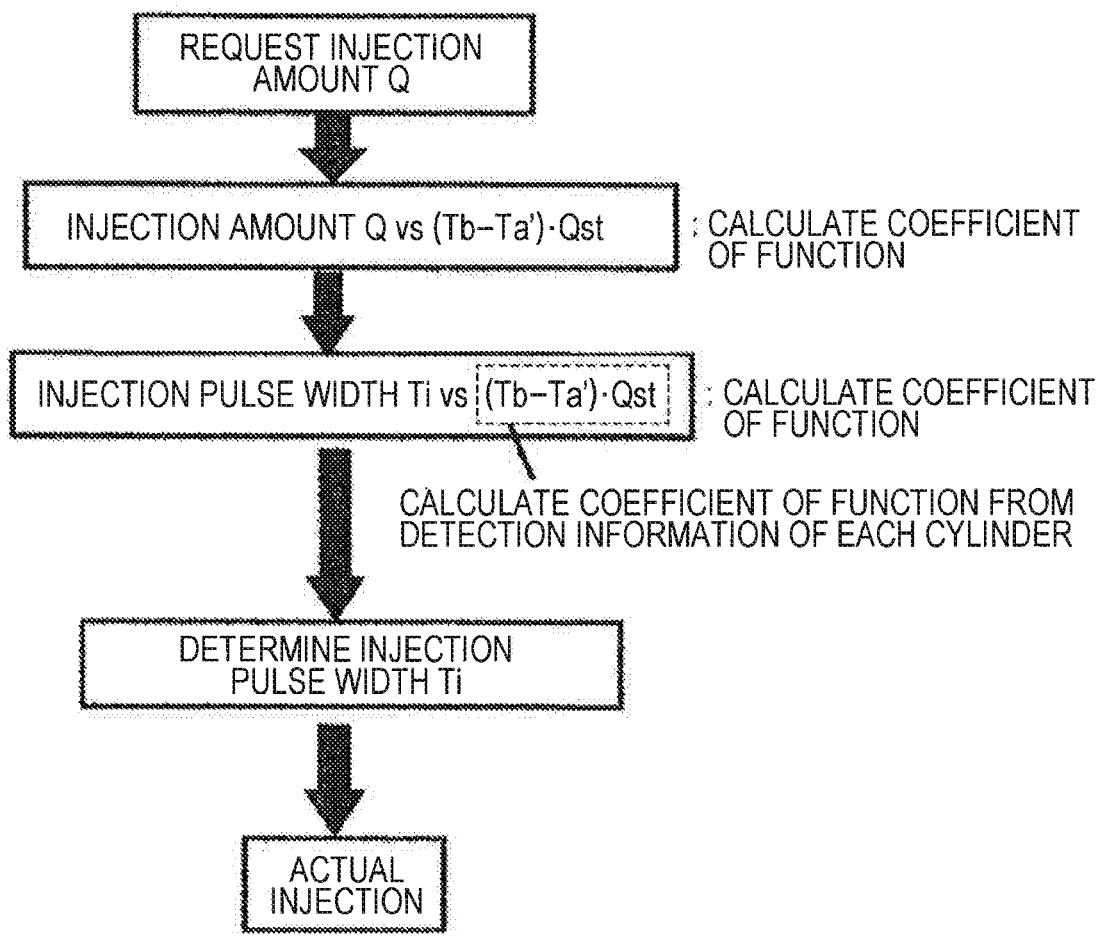
FIG. 15 is a flowchart illustrating a method of correcting an injection amount of each cylinder in a region which is an intermediate left region having a small injection pulse width Ti and in which the valve element does not reach the target lift in the first embodiment.
Figure 16:
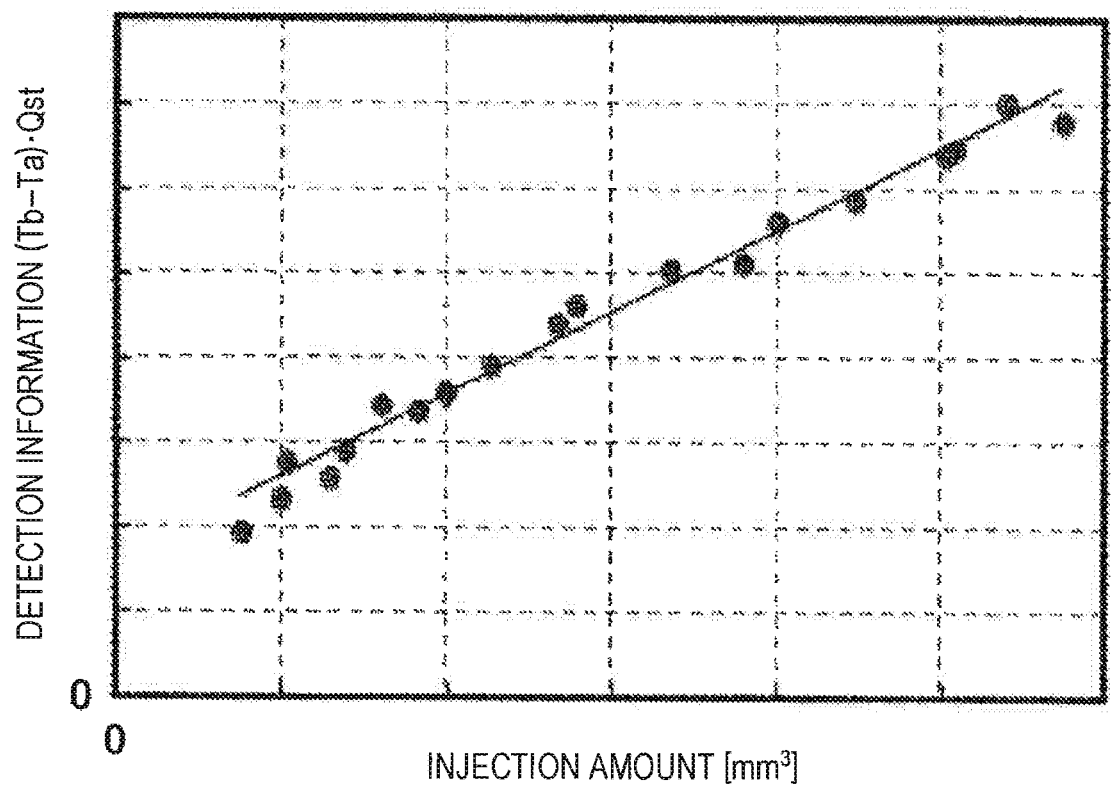
FIG. 16 is a graph illustrating a relation between an injection amount of each cylinder and detection information (Tb−Ta')·Qst obtained from a valve closed timing Tb, a valve opening timing Ta', and a flow rate Qst (hereinafter, referred to as static flow) per unit time injected from the fuel injection device in a case where the injection pulse width Ti is changed on a condition of a certain fuel pressure in the first embodiment.
Figure 17:
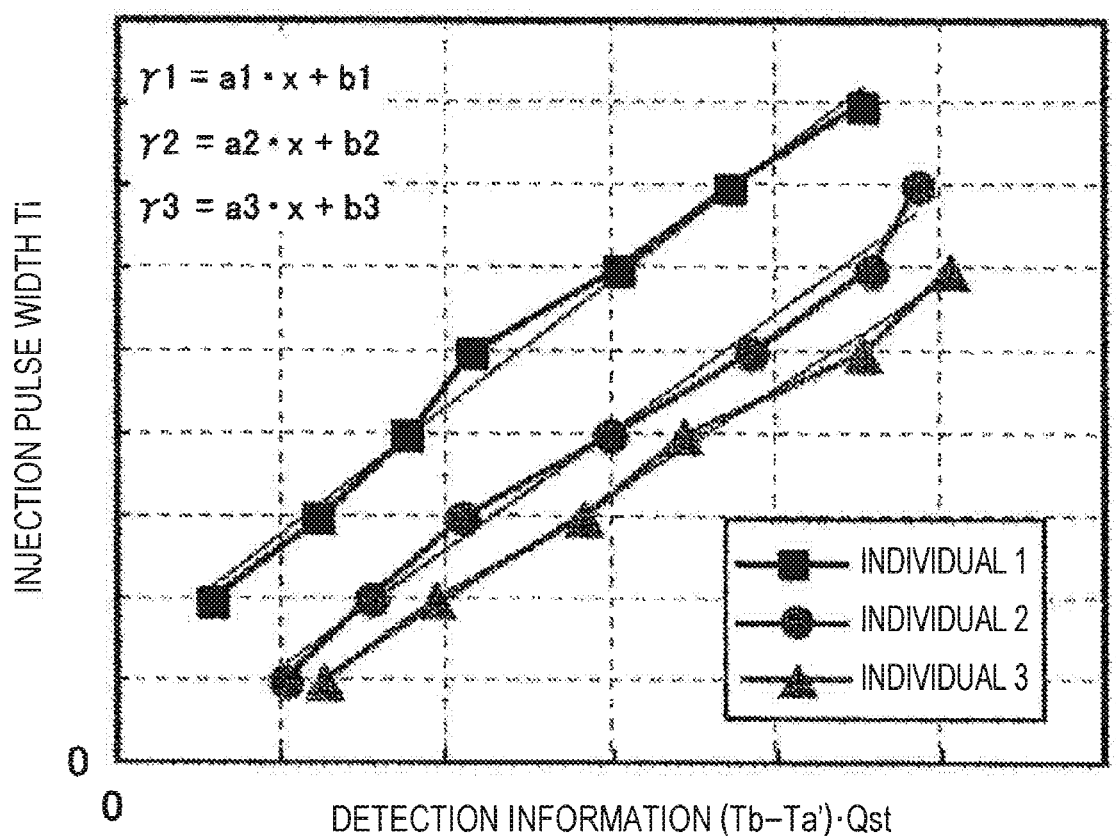
FIG. 17 is a graph illustrating a relation between the detection information of individual devices 1, 2, and 3 of the fuel injection device of each cylinder and the injection pulse width Ti in the first embodiment.
Figure 18:
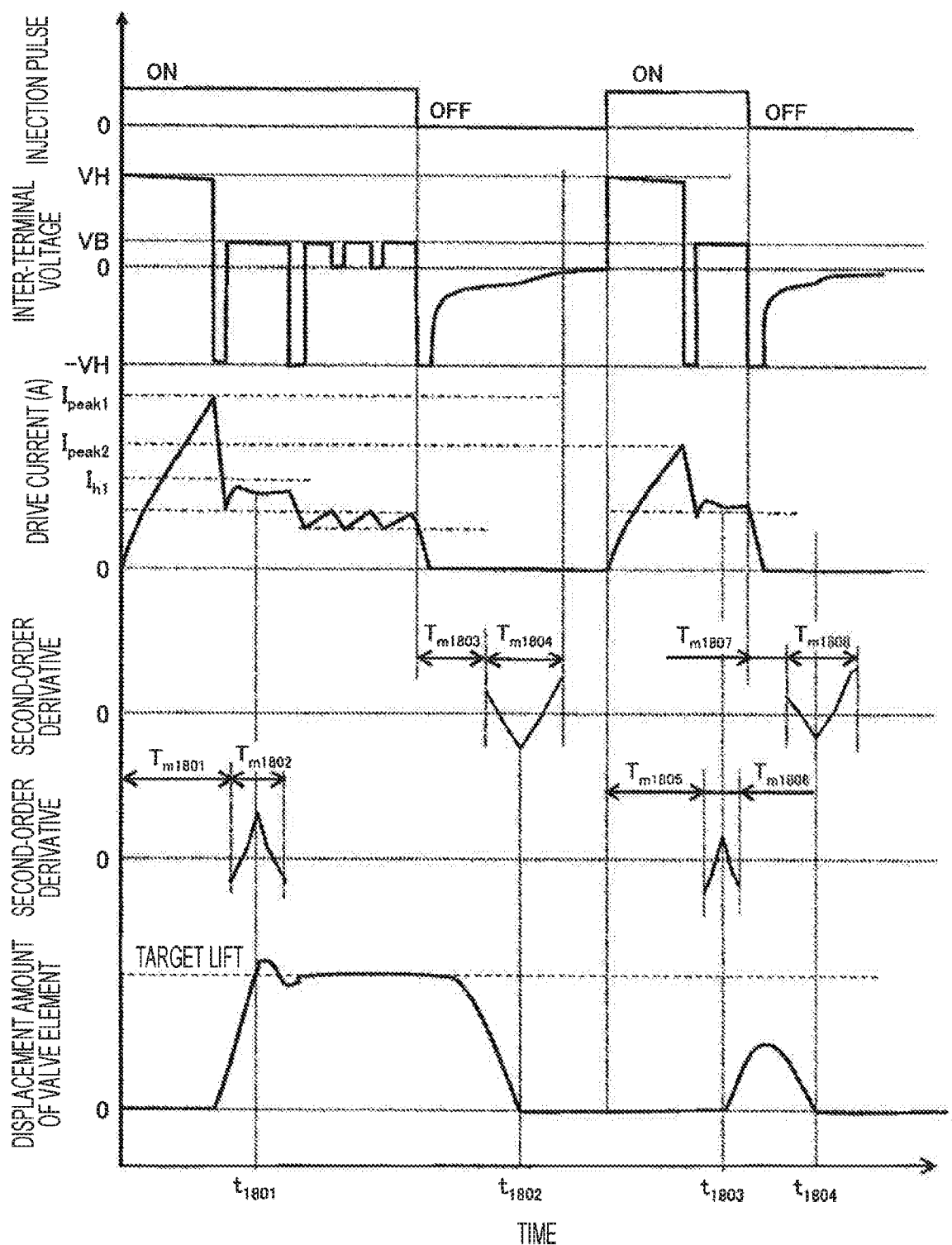
FIG. 18 is a graph illustrating a relation between the injection pulse width Ti, the drive current, the inter-terminal voltage Vinj, the second-order derivative of the voltage VL1, a second-order derivative of a voltage VL2 (that is, current), the displacement amount of the valve element, and time on a condition that the injection is dividedly performed in a stroke of intake/exhaust in the first embodiment.

Subsequently, the description will be made about FIGS. 5 to 13. FIG. 5 is a graph illustrating a relation between the injection pulse width Ti and the individual variation in the injection amount generated by a component tolerance of the fuel injection device. FIG. 6 is a graph illustrating a relation between the individual variation in the injection amount in FIG. 5 and the displacement amount of the valve element 114, and a relation between the displacement amount of the valve element 114 in each injection pulse width and time. FIG. 7 is a graph illustrating a relation between the injection pulse width output from the drive device, the drive current, the displacement amount of the valve element 114, and the displacement amount of the movable element in accordance with time. The graph of a displacement amount of the valve element of FIG. 7 illustrates the displacement amount of the valve element in the individual devices having the same valve opening timing but different in the valve closed timing and the displacement amount of the valve element in the fuel injection device of the conventional structure in which no preliminary operation is performed. In addition, FIG. 8 is a diagram illustrating details of the drive device 121 and the ECU 120 of the fuel injection device. FIG. 9 is a graph illustrating a relation between the injection pulse width Ti, the drive current, a current derivative, a second-order derivative of a current, the displacement amount of the valve element, the displacement amount of the movable element, and time in three fuel injection devices of the valve element 114 having different operation timings under an influence of a variation in the dimensional tolerance in an embodiment of the invention. In addition, FIG. 10 is a graph illustrating a relation between the injection pulse, the drive current supplied to the fuel injection device, the operation timings of switching elements 805, 806, and 807 of the drive device, an inter-terminal voltage of the solenoid 105, the displacement amounts of the valve element 114 and the movable element 102, an acceleration of the movable element, and time in an embodiment of the invention. FIG. 11 is a graph illustrating an enlarged view of the drive current supplied to the solenoid 105, the displacement amount of the valve elements of three individual devices 1, 2, and 3 having different valve close behaviors by the variation in the dimensional tolerance of a fuel injection device 840, and a voltage VL1, illustrating a relation with respect to a second-order derivative of the voltage VL1. FIG. 12 is a table showing a correspondence relation between a displacement (referred to as gap x) between the movable element 102 and the fixed core 107, a magnetic flux φ passing through an attraction plane between the movable element 102 and the fixed core 107, and an inter-terminal voltage Vinj of the solenoid 105 in this embodiment. FIG. 13 is a graph illustrating a relation between the inter-terminal voltage Vinj, the drive current, a first-order derivative of the current, the second-order derivative of the current, the displacement amount of the valve element, and time in three fuel injection devices having different valve opening/opened timings on a condition that the valve element reaches the target lift in this embodiment. FIG. 14 is a graph illustrating an initial magnetization curve and a return curve of a magnetization curve (BH curve) of a magnetic material which is used in the magnetic circuit in the first embodiment. FIG. 15 is a flowchart illustrating a method of correcting the injection amount of each cylinder in a region which is an intermediate lift region having a small injection pulse width Ti and in which the valve element does not reach the target lift. FIG. 16 is a graph illustrating a relation between the injection amount of each cylinder and detection information (Tb−Ta')·Qst obtained from a valve closed timing Tb, a valve opening timing Ta', and a flow rate Qst (hereinafter, referred to as static flow) per unit time injected from the fuel injection device 840 in a case where the injection pulse width Ti is changed on a certain condition of the fuel pressure. FIG. 17 is a graph illustrating a relation between the detection information of the individual devices 1, 2, and 3 of the fuel injection device of each cylinder and the injection pulse width Ti. FIG. 18 is a graph illustrating a relation between the injection pulse width Ti, the drive current, the inter-terminal voltage Vinj, the second-order derivative of the voltage VL1, a second-order derivative of a voltage VL2 (that is, current), the displacement amount of the valve element 114, and time on a condition that the injection is dividedly performed in a stroke of intake/exhaust.

First, a relation between the injection amount of each injection pulse width Ti and the displacement amount of the valve element 114 and a relation between the individual variation in the injection amount and the displacement amount of the valve element 114 will be described using FIGS. 5 and 6. The individual variation in the injection amount is caused by an influence of a change in dimension due to the component tolerance of the fuel injection device, a secular change, and a change in environmental conditions (that is, the fuel pressure supplied to the fuel injection device, a battery voltage source of the drive device, a change in the current value supplied to the solenoid 105 generated by the individual variation in a voltage value of a boosting voltage source, and a change in resistance value of the solenoid 105 depending on a temperature change). The injection amount of the fuel injected by an injection hole 119 of the fuel injection device is determined by a cross-sectional area of the flow passage between the valve element 114 and the valve seat 118 where the fuel flows in the fuel seat portion determined by the displacement amount of the valve element 114 in a case where a total cross-sectional area of a plurality of injection holes determined by the diameter of the injection hole 119 and a pressure loss occurring from the seat portion of the valve element 114 to the entrance of the injection hole are equal. FIG. 5 is a graph illustrating an individual device Qu having a large injection amount and an individual device Ql having a small injection amount with respect to an individual device Qc which is a designed center value of the injection amount in a region of a small injection pulse width in a case where a constant fuel pressure is supplied to the fuel injection device.

A relation between the injection amount in each injection pulse width Ti of the individual device Qc of the designed center value and the displacement amount of the valve element 114 on a condition of the injection amount in an injection pulse width t51 will be described using FIGS. 5 and 6. The displacement amount of the valve element 114 on a condition of Point 501 where the injection pulse width Ti is small is indicated by a solid line 501, and the injection pulse width Ti is turned off before the valve element 114 reaches the target lift, the valve element 114 starts to be closed, and the locus of the valve element 114 draws a parabola. Next, the displacement amount of the valve element 114 becomes larger than a solid line 601 at Point 502 where the injection amount is large with respect to the chain line 530 extrapolated from the straight line region in which the relation between the injection pulse width Ti and the injection amount is substantially linear. The valve element 114 starts to be closed as illustrated by the chain line 602 without reaching the target lift position, and the locus draws a parabola similarly to the solid line 601. Further, in the chain line 602, the energy supplied to the solenoid 105 is large compared to the solid line 601, and thus the valve close delay time is increased. As a result, the injection amount is also increased. Next, at Point 503 where the injection amount becomes small with respect to the chain line 530, the valve element 114 starts to be closed at a timing when the bounding of the movable element is maximized after the movable element 102 comes into conflict with the fixed core 107, and the locus is drawn as illustrated by a two-dotted chain line 603. The valve close delay time becomes small compared to the condition of the chain line 602. As a result, the injection amount at Point 503 becomes small compared to Point 502. In addition, the displacement amounts of the valve elements 114 at Points 532, 501, and 531 of the individual devices Qu, Qc, and Ql in the injection pulse width Ti at t51 in the drawing are indicated by 606, 605, and 604. In a case where an injection pulse width 601 at a timing t1 is input to the drive circuit, a timing when the movable element 102 comes into conflict with the valve element 114 after the injection pulse is turned on (that is, the valve opening timing of the valve element 114) is changed as indicated by t61, t62, and t63 under the influence of the individual difference of a fuel injection device 640 of the dimensional tolerance. In a case where the same injection pulse width is applied to each cylinder, the displacement amount of the valve element 114 in the individual device 604 having a fast valve opening timing is maximized at the timing t64 when the injection pulse width is turned off. Even after the injection pulse width is turned off, the valve element 114 is continuously displaced by the kinetic energy of the movable element 102 and a residual magnetic attraction force according to a residual magnetic flux caused by an eddy current, and the valve element 114 starts to be closed at the timing t67 when the force in the valve opening direction by the kinetic energy of the movable element 102 and the magnetic attraction force is less than the force in the valve closing direction. As illustrated by the displacements 604, 604, and 606 of the valve element, the lift amount of the valve element 114 in the individual device having a delayed valve opening timing is large, and the valve close delay time until the valve element 114 is completely closed after the injection pulse width is turned off is increased. Therefore, since the injection amount is determined by the valve opening timing of the valve element 114 and the valve closed timing of the valve element 114 in the intermediate lift region where the valve element 114 does not reach the target lift, the lift amount in the intermediate lift can be controlled as long as the valve opening timing of the fuel injection device of each cylinder and the individual variation in the valve closed timing can be detected or estimated in the drive device. The individual variation in the injection amount is decreased, so that the injection amount even in the intermediate lift region can be stably controlled.

Next, the description will be made using FIG. 7 about the valve operation of the individual device of the fuel injection device in which the valve opening timing is equal but the valve closed timing is different. Further, as described above, in the displacement amount of the valve element of FIG. 7, the individual device has the same valve opening timing but different in the valve closed timing.

In FIG. 7, as illustrated by the individual devices 1, 2, and 3 of the displacement amount of the valve element, since there is an individual variation of the fuel injection device, the differential force operated on the valve element 114 and the load by the set spring 110 are changed in the individual device due to the influence of the component tolerance even in the case of the same valve opening timing t73, and a maximum value of the displacement amount of the valve element 114 and the valve closed timing are changed in the individual device. In the individual device 3 having a small differential force operated on the valve element 114, the force in the valve closing direction is small with respect to the individual device 2 of which the differential force is the center value, so that the displacement amount of the valve element 114 becomes large. As a result, a magnetic gap between the movable element 102 and the fixed core 107 becomes small. Therefore, even in a case where the same current value is supplied, the magnetic attraction force in the valve opening direction is increased, and the valve closed timing is delayed as indicated by t76 compared to t75 of the individual device 2. On the other hand, in the individual device 1 of which the differential force is large compared to the individual device 2, the displacement amount of the valve element 114 becomes small, and the magnetic gap between the movable element 102 and the fixed core 107 becomes large. Therefore, the magnetic attraction force operated on the movable element 102 is decreased, and the valve closed timing comes fast as indicated by t74 compared to t75 of the individual device 2. Since the influence caused by the individual variation in the differential force and the magnetic attraction force appears in the valve closed timing, the individual variation in the injection amount can be detected by detecting the valve opening timing and the valve closed timing for each fuel injection device of each cylinder by the drive device.

In addition, in the fuel injection device in which the movable element 102 does not perform the preliminary operation before the valve element 114 starts to be opened, the valve element 114 starts to be opened at a timing t77 in a state where a difference between the magnetic attraction force in the valve opening direction operated on the movable element and the force in the valve closing direction (a resultant force) by the load of the spring 110 and the differential force due to the fuel pressure operated on the valve element 114 is small. Thereafter, the displacement amount of the valve element 114 is smoothly increased as indicated by 701. In the region where the displacement amount of the valve element 114 is small, the flow passage cross-sectional area of the seat portion of the valve element 114 is small, so that the flow rate of the fuel flowing in the seat portion becomes fast. In addition, the pressure loss of the fuel when the fuel passes through the seat portion is large. When the pressure loss is large in the vicinity of the seat portion, the flow rate of the fuel injected from the injection hole 119 is delayed. Therefore, shearing resistance between the injected fuel and the air becomes small, a droplet of the injection fuel is hardly pulverized. In addition, a droplet having a large particle diameter (a droplet having a coarse diameter) is easily generated. According to the fuel injection device in this embodiment, the movable element 102 comes into conflict with the valve element 114 and the valve element 114 starts to be opened, so that it is possible to decrease the region where the displacement amount of the valve element 114 is small. Therefore, the particle diameter of the injecting fuel is made small, and the droplet of the coarse diameter is hardly generated. As a result, the injected fuel and the air is easily mixed, and the droplet of the coarse diameter becomes less, so that a uniformity of the air-fuel mixture is improved at an ignition timing. Furthermore, the fuel is suppressed from being attached to a piston and a cylinder wall, so that an exhaust performance is improved. Particularly, non-combusted particles (PM: Particulate Matter) and the number (PN: Particulate Number) of non-combusted particles can be suppressed. In addition, the air-fuel mixture having a good uniformity can be formed, so that a fuel efficiency can be improved.

Next, the description will be described using FIGS. 8, 9, and 10 about a configuration of the drive device of the fuel injection device in this embodiment and a method that the drive device detects a variation in the operation of the valve element 114 causing the individual variation in the injection amount for each fuel injection device of each cylinder.

A CPU 801 is, for example, embedded in the ECU 120, receives signals indicating the states of the engine from various types of sensors such as a pressure sensor provided in a fuel pipe on the upstream side of the fuel injection device, an A/F sensor measuring an amount of the air flowing into the engine cylinder, an oxygen sensor detecting an oxygen concentration of the exhaust gas discharged from the engine cylinder, and a crank angel sensor, and calculates a width of the injection pulse and an injection timing for controlling the injection amount of the fuel injected from the fuel injection device according to an operation condition of the internal combustion engine.

In addition, the CPU 801 calculates a pulse width (that is, the injection amount) of the injection pulse width Ti and an injection timing appropriate for the operation condition of the internal combustion engine, and outputs the injection pulse width Ti to a drive IC 802 of the fuel injection device through a communication line 804. Thereafter, energizing/de-energizing of the switching elements 805, 806, and 807 is switched by the drive IC 802, and the drive current is supplied to the fuel injection device 840.

The switching element 805 is connected between the high voltage source higher than a voltage source VB input to the drive circuit and a terminal on a side near the high voltage of the fuel injection device 840. The switching elements 805, 806, and 807 are, for example, configured by FETs or transistors, and can switch energizing/de-energizing of the fuel injection device 840. For example, a boost voltage VH (the voltage value of the high voltage source) is 60 V, and is generated by boosting the battery voltage using a booster circuit 814. The booster circuit 814 is configured by, for example, a DC/DC converter, or may be configured by a coil 830, a switch element 831, a diode 732, and a capacitor 833. The switch element 831 is, for example, a transistor. In addition, a diode 835 is provided between a power source side terminal 890 of the solenoid 105 and the switching element 805 to make the current flow from a second voltage source in a direction toward the solenoid 105 and a ground potential 815, and a diode 811 is also provided between the power source side terminal 890 of the solenoid 105 and the switching element 807 to make the current flow from the battery voltage source in a direction toward the solenoid 105 and the ground potential 815, so that the current does not flow from the ground potential 815 in a direction toward the solenoid 105, the battery voltage source, and the second voltage source during a period when a switch element 808 is energized.

In a case where the booster circuit 814 is configured by the coil 830, the switch element 831, the diode 832, and the capacitor 833, the battery voltage VB is applied toward a ground potential 834 when a transistor 831 is energized. When the transistor 831 is de-energized, a high voltage generated in the coil 830 is rectified by the diode 832, and charges are accumulated in the capacitor 833. Until the high voltage becomes the boost voltage VH, the energizing/de-energizing of the switch element 831 is repeated, and the voltage of the capacitor 833 is increased. The energizing/de-energizing of the switch element 831 may be controlled by the IC 802 or the CPU 801.

In addition, the switching element 807 is connected between the low voltage source VB and a terminal on a high voltage side of the fuel injection device. The low voltage source VB is, for example, the battery voltage, and the voltage value thereof is about 12 to 14 V. The switching element 806 is connected between a terminal on a low voltage side of the fuel injection device 840 and the ground potential 815. The drive IC 802 detects a current value of the current flowing in the fuel injection device 840 by resistors 808, 812, and 813 for current detection, and switches the energizing/de-energizing of the switching elements 805, 806, and 807 based on the detected current value so as to generate a desired drive current. Further, as the resistors 808, 812, and 813 for current detection, a shunt resistor of which the resistance value is small and the individual variation in the resistance value is small may be used from a viewpoint of improvement in detection accuracy of the current, reliability, and heating suppression. In particular, the resistance values of the resistors 808, 812, and 813 are sufficiently small compared to the resistance value of the solenoid 105 of the fuel injection device 840, an influence on the current of the solenoid 105 caused by the loss of the resistors 808, 812, and 813 is small. Diodes 809 and 810 are provided to apply a reverse voltage to the solenoid 105 of the fuel injection device so as to steeply decrease the current which is supplied to the solenoid 105. The CPU 801 communicates with the drive IC 802 through a communication line 803. The drive current generated by the drive IC 802 may be switched according to the pressure of the fuel supplied to the fuel injection device 840 and an operation condition. In addition, both ends of the resistors 808, 812, and 813 are connected to A/D conversion ports of the IC 802 to detect the voltages on both ends of the resistors 808, 812, and 813 by the IC 802. In addition, capacitors 851 and 850 are provided on a Hi side (high voltage side) of the fuel injection device 840 and on a side of the ground potential (GND) in order to protect the signals of the input voltage and the output voltage against a surge voltage and a noise, and a resistor 852 and a resistor 853 may be provided in parallel with the capacitor 850 on the downstream side of the fuel injection device 840.

In addition, there is provided an active low-pass filter 861 which is configured by a terminal 880 between the switching element 806 and the resistor 808, and an operational amplifier 821, resistors R83 and R84, and a capacitor C82 between the CPU 801 and the IC 802. There is provided an active low-pass filter 860 which is configured by a terminal 881 between the resistor 852 and the resistor 853 provided on a side near the ground potential (GND) of the fuel injection device 840, and an operational amplifier 820, resistors R81 and R82, and a capacitor C81 between the CPU 801 and the IC 802. In addition, in the CPU 801 or the IC 802, a terminal 871 is provided for the connection to the ground potential 815, and a terminal y80 is provided to detect a voltage difference VL1 between the terminal 881 and the ground potential 815 by the CPU 801 or the IC 802 through the active low-pass filter 860. In addition, since the resistor 852 and the resistor 853 are set to be have resistance values larger than that of the solenoid 105 of the fuel injection device 840, the current is effectively supplied to the solenoid 105 when a voltage is applied to the fuel injection device 840. In addition, since the resistance value of the resistor 852 is set to be large compared to the resistor 853, the voltage VL between the ground potential of the terminal of the fuel injection device 840 on a side near the ground potential (GND) and the ground potential can be divided. As a result, the detected voltage can be set to VL1, and withstand voltages of the operational amplifier 821 and an A/D conversion port of the CPU 801 can be decreased. Therefore, it is possible to detect time periods of the inter-terminal voltage Vinj and the voltage VL without need to provide a circuit for inputting the high voltage.

In addition, the terminal y81 may be provided to detect a voltage difference VL2 between the terminal 880 on a side near the fuel injection device 840 of the resistor 808 and the ground potential 815 by the CPU 801 or the IC 802 through the active low-pass filter 861. In the CPU 801, there is provided a terminal y82 connected to the battery voltage VB to monitor the battery voltage VB using the CPU 801.

Next, a method of detecting the valve opening timing of the valve element 114 in the first embodiment of the invention will be described using FIG. 9. FIG. 9 illustrates waveforms about three individual devices having different operation timings, and there are the valve opening timing and the valve closed timing as important operation timings. In addition, a change in the current flowing in the solenoid 105 can be detected by detecting the voltage VL2 using the drive device.

In FIG. 9, the boost voltage VH is applied to the solenoid 105 until the current supplied to the solenoid 105 reaches the peak current Ipeak. Thereafter, as indicated by 901, the current value is decreased by applying the boost voltage VH in a negative direction or by applying a voltage of 0 V, and a voltage blocked period T2 is provided to decrease the current for a predetermined period. When the magnetic attraction force in the valve opening direction operated on the movable element 102 exceeds the force of the spring 110 in the valve closing direction operated on the movable element 102 after the boost voltage VH is applied to the solenoid 105, the movable element 102 is displaced in the valve opening direction, and the movable element 102 performs an idle operation. Thereafter, the valve element 114 starts to be displaced at timings t91, t92, and t93 when the movable element 102 of the individual device of the fuel injection device 840 comes in contact with the valve element 114, and the fuel is injected from the injection hole 119. Before the valve element 114 starts to be opened, the peak current Ipeak, or a boost voltage apply time tp and the voltage blocked period T2 may be adjusted to make a constant voltage supplied from the battery voltage source at the timing t91.

In the fuel injection device 840 of this embodiment, the movable element 102 comes into conflict with the valve element 114 after the idle operation to cause the force of the fuel pressure operated only on the valve element 114 to be operated to the movable element 102 through the valve element 114, so that the acceleration of the movable element 102 is significantly changed at the valve opening timing of the valve element 114. Since the path between the movable element 102 and the fixed core 107 serves as a main path of the magnetic flux of the magnetic circuit configured by the fixed core 107, the movable element 102, the nozzle holder 101, the housing 103, and the solenoid 105, the magnetic flux passing through between the movable element 102 and the fixed core 107 is changed as the acceleration of the movable element 102 is changed. Therefore, an induced electromotive force is changed, and a slope of the current value is changed. In order to detect a timing when the slope of the current (that is, the current derivative), a timing when the second-order derivative of the current is maximized is detected by the ECU. Therefore, the valve opening timing can be detected for each fuel injection device 840 of each cylinder. In addition, the energizing/de-energizing of the switching elements 805, 806, and 807 is not switched in a section from after the timing t91 when a constant voltage is supplied from the battery voltage source to the valve opening timing of the valve element 114, so that the electrical change in the drive current is cancelled to decrease the temporal change in the current. Therefore, the change in the acceleration caused when the movable element 102 comes into conflict with the valve element 114 can be effectively detected with ease, and a detection accuracy of the valve opening timing can be improved.

Herein, the CPU 801 may be provided with the terminal y81 to measure the voltage VL2 in order to make the drive device detect the temporal change in the current flowing in the solenoid 105. Since the resistance value of the resistor 808 is a given value, the current flowing in the solenoid 105 can be detected based on Ohm's law V=R·I (a voltage V is a product of a resistance value R and a current I) by detecting the voltage VL2. In addition, according to the method of detecting the timing when the second-order derivative of the current is maximized, even in a case where the resistance value of the resistor 808 varies by the individual variation or a change in temperature of the resistor, the time when the voltage VL2 becomes the second-order derivative is not changed even when a maximum value of the second-order derivative of the voltage VL2 varies. Therefore, the valve opening timing can be detected with high accuracy, and the detection is performed with robustness. In addition, the voltage VL2 is connected to the A/D conversion port of the CPU 801 through the active low-pass filter 861. A digital signal obtained by A/D converting the voltage VL2 is subjected to digital differentiating or digital filtering by the CPU 801 to detect a time when the second-order derivative of the current is maximized, so that the valve opening timing of the valve element 114 can be detected. In addition, a time until the injection pulse reaches the valve opening timing after being turned on may be stored in the drive device as a valve-opening-start delay time. Further, in a case where the current keeping on being decreased so far is changed to be increased at the valve opening timing, the valve opening timing may be detected as a timing when the current derivative exceeds a certain threshold. However, even in a case where the current is changed from decrease to increase at the valve opening timing by the configuration of the fuel injection device 840 and the drive device, the valve opening timing can be detected with high accuracy by detecting the valve-opening-start delay time until the second-order derivative of the current is maximized after the injection pulse is turned on.

Further, even though the voltage blocked period T2 is not an essential component, a change in the current flowing to the solenoid 105 becomes easy to be detected by applying the boost voltage VH or 0V in the negative direction based on the following reason.

In addition, in a case where the entire voltage VL2 is detected by the drive device during a period when the injection pulse is turned on, an inflection point generated in the current due to the energizing/de-energizing of the current switching elements 805, 806, and 807 may be falsely detected as the second-order derivative of the voltage VL2. In this case, the valve opening timing when the movable element 102 comes into conflict with the valve element 114 can be detected with high accuracy by setting an acquisition period of the voltage VL2 to a period 903 in which the switching operation of the energizing/de-energizing of the switching elements 805, 806, and 807 is not performed. A time t98a when the data acquisition in the period 903 starts may be set to be delayed compared to a time t91 of an end timing of the voltage blocked period T2, and a time 98b when the data acquisition in the period 903 is ended may be set to be earlier than a time t98 when the injection pulse is turned off. In addition, the start of the injection pulse or the timing of the energizing/de-energizing of the switching elements 805 and 806 may be used as a trigger for the start of the time t98a. In a case where the timing of the energizing/de-energizing of the switching elements 805 and 806 is used as a trigger of the time t98a, information on the energizing/de-energizing of the switching elements 805 and 806 may be transmitted to the CPU 801 through the communication line 803.

In a case where the start of the injection pulse is used as a trigger, the time t98a can be controlled with accuracy since the injection pulse is generated in the CPU 801. On the other hand, in a case where the timing of de-energizing the switching elements 805 and 806 is used as a trigger for the start of the time t98a, the period of the valve opening timing can be securely acquired even in a case where the boost voltage apply time Tp until the current reaches the peak current value Ipeak varies by a change in resistance or a variation in the boost voltage VH in accordance with the change in temperature of the solenoid 105, so that the detection accuracy of the valve opening timing can be increased.

As described above, it is desirable that the second-order derivative of the voltage VL2 for detecting the current flowing in the solenoid 105 be detected by the drive device in order to detect the valve opening timing of the valve element 114. In a case where a second-order differentiating having a high degree of the differentiating is performed, when a noise is superimposed on the voltage VL2 before the differentiating, a derivative may diverge when the differentiating is performed, and the timing of a maximum value after the second-order differentiating may be falsely detected. In order to cope with such a problem, the active low-pass filter 861 configured by the operational amplifier 821, the resistor R83, the resistor R84, and the capacitor C82 may be provided between the terminal 880 of the fuel injection device 840 and the terminal y81 of the CPU 801. In this embodiment, the valve opening timing is detected using a configuration that the movable element 102a comes into conflict with the valve element 114 to change the acceleration of the movable element 102a so as to cause a change in the current and the voltage VL2 of the solenoid 105. The change in the current and the voltage VL2 of the solenoid 105 at this time has a small frequency compared to that of the noise superimposed on the current and the voltage VL2. Therefore, the high-frequency noise generated in the current and the voltage VL2 can be decreased by interposing the active low-pass filter 861 between the terminal 880 for measuring the voltage VL2 and the CPU 801, and the detection accuracy of the valve opening timing can be increased.

In addition, a cutoff frequency fc1 of the active low-pass filter 861 can be expressed as the following Equation (1) using the values of a resistor R82 and the capacitor C81. A switching timing of a switching element 831 and the value of the second voltage source for configuring the switching elements 805, 806, and 807 and the second voltage source are different according to the configuration of the fuel injection device and the drive device. As a result, the frequency of the noise generated in the voltage is different. Therefore, the design values of the resistor R82 and the capacitor C81 may be changed according to the specifications of the fuel injection device 840 and the drive circuit. In addition, in a case where the low-pass filter is configured by an analog circuit, there is no need to perform the filtering process for removing the high-frequency noise by the CPU 801 in a digital manner, so that a calculation load of the CPU 801 can be reduced. In addition, the signal of the voltage VL1 may be directly input to the CPU 801 or the IC 802 to perform the filtering process in a digital manner. In this case, since there is no need to use the operational amplifier 820, the resistor R81, the resistor R82, and the capacitor C81 of the components of the analog low-pass filter, and the cost of the drive device can be reduced. In addition, a primary low-pass filter configured by the resistor connected to the terminal 880 and the capacitor disposed in parallel to the resistor may be used as the low-pass filter described above. In a case where the primary low-pass filter is used, two components of the resistor and the operational amplifier can be reduced compared to the configuration of the active low-pass filter, and the cost of the drive device can be reduced. In addition, as a calculation method of the cutoff frequency of the primary low-pass filter, Equation (1) in a case where the active low-pass filter is used can be used to calculate the cutoff frequency. In addition, as the configuration of the low-pass filter, the low-pass filter can be configured to have a secondary or higher order time constant using a coil and the capacitor. In this case, since the low-pass filter can be configured without a resistor, there is a merit on saving power consumption compared to a case where the active low-pass filter and the primary low-pass filter are used.

$$fc1=1/(2 \cdot \pi \cdot R84 \cdot C82) \quad (1)$$

Further, the current of the solenoid 105 for detecting the valve opening timing may be detected by measuring the voltage of both ends of the resistor 813. In a case where the voltage of both ends of the resistor 813 is measured, the number of terminals for measuring the voltage is increased and the number of necessary A/D conversion ports is also increased compared to the case of the voltage VL2 obtained by measuring the voltage difference of the ground potential 815, leading to the cost-up of the drive device and the processing load of the CPU 801 or the IC 802 for the A/D conversion of the voltage signal is increased. In addition, in the voltage VL2, in a case where the energizing/de-energizing of the switching element 831 is repeatedly performed at high speed for accumulating the charges in the capacitor 833 to recover the voltage value of the boost voltage VH which is the output of the booster circuit 814, the high-frequency noise may be superimposed on the voltage of both ends of the resistor 813 serving as the path toward the power source of the fuel injection device 840. The high-frequency noise generated on the upstream side of the fuel injection device 840 can be attenuated by the coil of the solenoid 105 by setting the voltage VL2 positioned on a side near the ground potential of the solenoid 105 of the fuel injection device 840 as a measurement point of the current, and the valve opening timing can be detected with high accuracy using a maximum value of the second-order derivative of the voltage VL2.

Next, the description will be made using FIGS. 2, 8, and 10 about a configuration of the drive circuit in the first embodiment and a switching timing of the switching element for generating the drive current flowing in the fuel injection device on a condition that the valve opening timing is detected.

First, when the injection pulse width Ti is input to the drive IC 802 through the communication line 804 at a timing t101 by the CPU 801, the switching elements 805 and 806 are energized, the boost voltage VH is applied to both ends of the solenoid 105, the drive current is supplied to the solenoid 105, and the current is steeply increased. Thereafter, the magnetic flux is formed in the magnetic circuit as the eddy current generated in the magnetic circuit disappears, the magnetic flux passes through between the fixed core 107 and the movable element 102, and the magnetic attraction force operated on the movable element 102 comes to be increased. The movable element 102 starts the lift at a timing t102 when the sum of the magnetic attraction force operated on the movable element 102 in the valve opening direction and the force of the return spring 112 exceeds the load of the spring 110 in the valve closing direction. At this time, since the movable element 102 moves in the valve opening direction, shearing resistance (viscous resistance) is generated between the movable element 102 and the nozzle holder 101, and a shearing resistance force operates on the movable element 102 in the valve closing direction opposed to the movement direction. In this case, the shearing resistance force operated on the movable element 102 can be reduced by securing a cross-sectional area of the passage between the movable element 102 and the nozzle holder 101. In addition, the shearing resistance force operated on the movable element 102 is sufficiently small compared to the magnetic attraction force in the valve opening direction operated on the movable element 102, the acceleration of the movable element comes to be increased after the movable element 102 starts the lift. When the energized switching elements 805 and 806 are de-energized at a timing t103 when the rive current reaches the peak current value Ipeak given to the ECU in advance, the current does not flow in the path in which the current has flown from the boost voltage VH toward the solenoid 105 and the ground potential 815. The voltage of the terminal of the fuel injection device 840 on a side near the ground potential (GND) becomes large by a counter electromotive force due to inductance of the fuel injection device 840. A path of the current is formed through the ground potential 815 of the drive device, the diode 809, the fuel injection device 840, the diode 810, the resistor 812, and the boost voltage VH, so that the current is returned toward the boost voltage VH of the booster circuit 814. The boost voltage VH in the negative direction is applied to both end of the solenoid 105, and the drive current supplied to the solenoid 105 is steeply reduced as indicated by 1002.

Even in a case where the change in the resistance value due to the change in temperature of the solenoid 105 and the change in the boost voltage VH occur, the energy necessary for opening the valve element 114 is stably secured by setting the timing t103 when the switching elements 805 and 806 are de-energized as a timing when the drive current exceeds the peak current value Ipeak. In addition, the change in the valve opening timing generated by a time variation when the current reaches the peak current Ipeak according to the change in environmental conditions can be made as a movement component in parallel, and the current waveform and the timing of the valve operation can be suppressed from being changed.

In addition, the timing t103 of de-energizing the switching elements 805 and 806 may be set to the boost voltage apply time Tp after the injection pulse Ti is turned on. Since the setting resolution of the peak current Ipeak is determined by the resistance values and the accuracy of the resistors 808 and 813 for current detection, a minimum value of the resolution of Ipeak settable by the drive device is restricted by the resistor of the drive device. On the contrary, in a case where the timing t103 of de-energizing the switching elements 805 and 806 is controlled by the boost voltage apply time Tp, the setting resolution of the boost voltage apply time Tp can be set according to a clock frequency of the CPU 801 without being restricted by the resistor of the drive device. Therefore, a time resolution can be reduced compared to a case where the peak current Ipeak is used for the setting, and the boost voltage apply time Tp or a timing of stopping the peak current value Ipeak can be corrected with higher accuracy, so that the correction accuracy of the injection amount of the fuel injection device of each cylinder can be increased.

In addition, a time of the voltage blocked period T2 when the switching elements 805 and 806 are de-energized is stored in the drive device in advance, and may be changed according to the operation condition such as a fuel pressure. When the voltage blocked period T2 is expired, the switching elements 806 and 807 are energized, and the battery voltage VB is applied to the solenoid 105. At this time, as indicated by 1004, the switching element 806 is continuously turned on until the current value reaches the target current by setting the current value of a target value Ih1 of the drive current to be higher than the current at the time of the end of the voltage blocked period T2. At this time, the charges accumulated in the capacitors 851 and 852 are discharged and, the drive current is increased as indicated by 1003 after a timing t105 when the switching elements 806 and 807 are energized. Thereafter, when the battery voltage is applied, the current is supplied to the solenoid 105, the displacement amount of the movable element 102 is increased, the current is changed to be decreased at the timing t105 by the induced electromotive force generated as the magnetic gap is reduced, and the movable element 102 comes into conflict with the valve element 114 at a timing t106. At this time, since the differential force due to the fuel pressure operated on the valve element 114 operates on the movable element 1-2 through the valve element 114 by the conflict of the movable element 102 to the valve element 114, the acceleration of the movable element 102 is largely changed. Since the induced electromotive force is changed as the acceleration of the movable element 102 is changed, the slope of the drive current is changed. Since the switching elements 806 and 807 are energized at the value opening timing of the valve element 114 when the movable element 102 and the valve element 114 come into conflict, the change in the inter-terminal voltage value Vinj is small. In addition, since the current is smoothly changed as the voltage is applied due to the application of the battery voltage VB lower than the boost voltage VH, a slight change in the induced electromotive force due to the conflict of the movable element 102 to the valve element 114 can be detected as the change in the drive current by the drive device. In addition, since the current is steeply decreased from the peak current value Ipeak and the current value is made small at the valve opening timing of the valve element 114, the electric field generated in the magnetic circuit is reduced, and accordingly a magnetic flux density is reduced. Therefore, the magnetic flux density of the end surface of the movable element 102 on a side near the fixed core 107 is hardly saturated. As a result, the change in the acceleration of the movable element 102 caused when the movable element 102 comes into conflict with the valve element 114 and the valve element 114 starts to be opened is more easily detected as a current temporal change (that is, a change in the slope of the current). The valve opening timing of the valve element 114 can be detected with high accuracy by setting the values of the peak current Ipeak and the voltage blocked period T2 such that the valve element 114 starts to be opened during the period when the switching elements 806 and 807 are energized and a battery voltage VH is applied to the solenoid 105.

In addition, a profile of the displacement of the valve element 114 in a case where the fuel pressure supplied to the fuel injection device 840 is small, middle, and large is plotted in the displacement amount of the valve element 114 illustrated in FIG. 10. In the fuel injection device 840 of the first embodiment, since the movable element 102 does not receive the force of the fuel pressure operated on the valve element 114 until the valve element 114 starts to be opened, the profile of the movable element 102 is not changed until the movable element 102 comes into conflict with the valve element 114 even on a condition that the fuel pressure is different, and the valve opening timing t106 of the valve element 114 is also not changed. Therefore, the valve opening timing t106 of the valve element 114 is detected on a certain operation condition such as engine starting or idle operation, and stored in the drive device, so that the detection information of each cylinder stored in the drive device can be used even in a case where the operation condition such as the fuel pressure is changed. Therefore, since it is possible to reduce the frequency of using the A/D conversion port of the drive device for converting an analog voltage signal of the voltage of both ends of the resistor 813 for detecting the drive current or the voltage difference VL2 of the resistor 808 with respect to the ground potential 815 into a digital signal for the purpose of detecting the valve opening timing, the processing load of the CPU 801 and the IC 802 can be reduced. As described above, as long as the valve opening timing is detected on a certain operation condition for each fuel injection device 840 of each cylinder, the detection accuracy can be secured even in a case where the operation condition such as the fuel pressure is changed.

In addition, the CPU 801 is provided with the terminal y82 as an A/D conversion port for convergence of the voltage into the digital signal to be detected by the drive device in order to monitor the voltage value of the battery voltage VB of the battery voltage source. The battery voltage VB falls by the operation of an in-vehicle device connected to the battery voltage source, and the variation is large. The in-vehicle device is, for example, a starter motor, an air conditioning unit such as an air conditioner, lights (head lights, stop lamps), and an electric power steering device which are used in starting the engine. In addition, an alternator is activated as the voltage falls, so that the battery voltage source is charged. Therefore, the valve opening timing may be detected by detecting the voltage VL2 or the voltage of both ends of the resistor 813 at the time when the battery voltage VB monitored by the CPU 801 falls into a variation range of the voltage value set in the drive device. With the above configuration, in a case where the battery voltage VB is changed by the operation of the in-vehicle device and a timing when the battery voltage is changed approaches the valve opening timing on a condition that the valve opening timing is detected, it is possible to suppress a possibility that the current varies by the influence and a time when the second-order derivative of the current for detecting the valve opening timing is maximized is deviated, so that the valve opening timing can be stably detected.

In addition, since the center value of the voltage value on a condition that the valve opening timing is detected is changed according to a degradation of the battery voltage source, the center value may be configured to be arbitrarily set by the CPU 801. Therefore, the valve opening timing can be detected with high accuracy even in a case where the center value of the battery voltage VB in an unused state is changed with time.

In addition, since a ferrite magnetic material having a high saturated magnetic flux density used in the member of the magnetic circuit of the fuel injection device 840 in this embodiment has a low hardness compared to an austenite metal, the conflict surface with respect to the valve element 114 and the conflict surface with respect to the fixed core 107 of the movable element 102 may be subjected to the plating process. Since the movable element 102 performs the valve opening operation at high speed without receiving the force of the fuel pressure so as to come into conflict with the valve element 114, when a total rotation speed of the engine is increased and the number of driving times of the fuel injection device 840 is increased, a conflict surface 210 of the movable element 102 with respect to the valve element 114 may be degraded by friction. In particular, in a case where the uniformity of the air-fuel mixture of the fuel and the air is intended to be improved in order to suppress a total amount of the non-combusted particles PM containing tin and the number PN of non-combusted particles, a method of injecting the fuel plural times in a stroke of intake/exhaust is effective. However, since the number of injection times is increased as much as the division injection is performed even in a case where a traveling distance is the same compared to a case where the division injection is not performed, the frictional degradation of the conflict surface 210 easily occurs. In a case where the frictional degradation occurs, the void 201 between the contact surface 205 of the valve element 114 in the valve closed state with respect to the movable element 102a and the conflict surface 210 of the movable element 102a is increased, and a moving distance of the movable element 102 necessary for coming into conflict with the valve element 114 is increased, and the valve opening timing of the valve element 114 is delayed. The valve opening timing is detected again at every predetermined period according to the number of driving times of the fuel injection device 840, a time, or a value measured by a meter of the traveling distance equipped in a vehicle, and the information of the valve opening timing of the fuel injection device 840 of each cylinder stored in the drive device is updated, so that the change in the valve opening timing due to the frictional degradation of the conflict surface can be handled even in a case where the number of driving times of the fuel injection device 840 is increased due to the division injection, and the injection amount can be controlled with high accuracy.

In addition, on a condition that the switching elements 805 and 806 are energized and the boost voltage VH is applied in the positive direction to the solenoid 105, the charges accumulated in the capacitor 833 so far are reduced by using the boost voltage VH, and the voltage value of the boost voltage VH is reduced. At this time, in order to recover the voltage of the boost voltage VH to an initial voltage value previously set in the CPU 801 or the IC 802, the switching element 831 of the booster circuit 814 may be repeatedly energized and de-energized at a high frequency to accumulate the charges in the capacitor 833 when the voltage value of the boost voltage VH is lower than a predetermined threshold voltage so as to recover the voltage value of the boost voltage VH. However, since the change in the induced electromotive force generated by the change in the acceleration of the movable element 102 when the movable element 102 comes into conflict with the valve element 114 and the valve element 114 starts to be opened less influences on the voltage VL2 and the voltage of both ends of the resistor 812 compared to the change in the voltage value, it is difficult to detect the change in the acceleration of the movable element 102 according to the opening start of the valve element 114 using the voltage VL2 or the voltage of both ends of the resistor 812 on a condition that the boost voltage VH is applied. In addition, in a case where the operation for recovering the voltage value of the boost voltage VH is performed, there is a need to repeatedly energize and de-energize the switching element 831 of the booster circuit 814 at a high frequency. Therefore, a high-frequency noise occurs by the switching, and the noise is superimposed on the voltage VL2 or the voltage of both ends of the resistor 812 for detecting the valve opening timing of the valve element 114, thereby causing an adverse influence on the detection accuracy of the valve opening timing.

In FIG. 9, the application voltage may be configured such that the switching elements 805 and 806 are energized after the injection pulse width Ti is supplied to apply the boost voltage VH to the solenoid 105, the boost voltage VH in the negative direction is applied in a predetermined period of time after the current value reaches the peak current value Ipeak, a constant voltage as the battery voltage VB is applied from the battery voltage source after the current value is steeply lowered as indicated by 901, and the valve element 114 reaches the target lift at a timing when the constant voltage is supplied from the battery voltage VB.

Next, the description will be made about a method of detecting the valve close delay time as a time until the valve element 114 is closed after the injection pulse is turned off.

In addition, the resistors 852 and 853 are provided between the terminal of the fuel injection device 840 on a side near the ground (GND) and the ground potential 815 in order to detect the temporal change in the voltage generated in the voltage VL as the voltage difference between the terminal of the fuel injection device 840 on a side near the ground potential (GND) and the ground potential 815 by the CPU 801 or the IC 802 when the valve element 114 and the movable element 102 are closed from the valve opened state. The resistance values of the resistors 852 and 853 are set to be larger than that of the solenoid 105, so that the current can efficiently flow in the solenoid 105 at the time when the battery voltage VB and the boost voltage VH are applied. In addition, since the resistance value of the resistor 852 is set to be larger than that of the resistor 853, the voltage difference VL1 between the resistor 853 and the ground potential 815 can be made small, and the value of a withstand voltage required for the operational amplifier 821 and the A/D conversion port of the CPU 801 can be reduced. Therefore, it is possible to detect the voltages generated in the inter-terminal voltage Vinj and the voltage VL without need to provide circuits or elements for inputting the high voltage. The voltage VL1 divided from the voltage VL is input to the A/D conversion port mounted in the CPU 801 or the IC 802 through the active low-pass filter 860. Since the signal of the voltage VL1 passes through the active low-pass filter 860, the high-frequency noise component generated in the voltage VL1 can be reduced, the change in the acceleration of the movable element 102 generated at the moment when the valve element 114 starts to be closed from the valve opened state and comes into contact with the valve seat 117 can be detected as the change in the induced electromotive force by the voltage VL1, and can be detected as the digital signal by the IC 802 or the CPU 801. As a result, the differentiating can be easily performed. At this time, the voltage difference between the terminal y80 and the ground potential 815, which passes through the active low-pass filter 860 and is input to the A/D conversion port of the CPU 801, is referred to as a voltage VL3.

Next, the description will be made using FIGS. 2, 8, 11, and 12 about the operation of the drive circuit in the first embodiment, and about a principle of detecting the valve closed timing for calculating the valve close delay time until the valve element 114 comes in contact with the valve seat 118 after the injection pulse is turned off as a factor of the individual variation in the injection amount of the fuel injection device 840 together with the individual variation in the valve opening timing of the valve element. Further, since the temporal change in the inter-terminal voltage Vinj is also generated in the voltage VL and the voltage VL1, the change in the voltage of FIG. 11 is the same as the temporal change in the voltage of the voltage VL1 detected by the CPU 801. In addition, the movable element 102b comes in contact with the movable element 102a in an end surface 204 provided in the movable element 102a, and the movable element 102a and the movable element 102b can be relatively displaced.

In addition, in FIG. 11, when the injection pulse width Ti is turned off, the magnetic flux starts to disappear from the vicinity of the solenoid 105 under the influence of the eddy current generated in the magnetic material of the magnetic circuit, the magnetic attraction force generated in the movable element 102a and the movable element 102b is reduced, and the valve element 114 starts to be closed at a timing when the magnetic attraction force is lower than the force in the valve closing direction operated on the valve element 114 and the movable elements 102a and 102b. A magnetic resistance value of the magnetic circuit is in inverse proportion to a cross-sectional area of each path of the magnetic flux and a magnetic permeability of the material, and in proportion to a length of the magnetic path of the magnetic flux. The magnetic permeability of the gap between the movable element 102 and the fixed core 107 is the magnetic permeability $\mu 0 = 4\pi \times 10-7$ [H/m] in the vacuum compared to a metal magnetic material having a high saturated magnetic flux density, and is very small compared to the magnetic permeability of the metal magnetic material, so that the magnetic resistance becomes large. The magnetic permeability $\mu$ of the magnetic material is determined by a characteristic of the BH curve (the magnetization curve) of the magnetic material based on a relation of $B=\mu \cdot H$, and changed by the magnitude of the inner magnetic field of the magnetic circuit. However, in a general case of a weak magnetic field, the magnetic permeability becomes small, the magnetic permeability is increased as the magnetic field is increased [ ], and the magnetic permeability is decreased at a time point exceeding a certain magnetic field. When the valve element 114 is displaced from the opening position, the gap x is generated between the movable element 102 and the fixed core 107, the magnetic resistance of the magnetic circuit is increased, the magnetic flux capable of being generated in the magnetic circuit is reduced, and the magnetic flux passing through the attraction plane of the end surface of the movable element 102 on a side near the fixed core 107 is also reduced. When the magnetic flux generated in the magnetic circuit of the solenoid 105 is changed, the induced electromotive force based on Lenz's law is generated. In general, the magnitude of the induced electromotive force in the magnetic circuit is in proportion to a rate (a first-order derivative of the magnetic flux) of change in the magnetic flux flowing in the magnetic circuit. When the number of windings of the solenoid 105 is set to N, and the magnetic flux generated in the magnetic circuit is set to $\varphi$, the inter-terminal voltage Vinj of the fuel injection device is expressed by the sum of a term $-N \cdot (d\varphi/dt)$ of the induced electromotive force and a product of a resistance component R of the solenoid 105 generated based on Ohm's law and a current i flowing in the solenoid 105 as shown in Equation (2).

$$Vinj = -N \cdot (d\varphi/dt) + R \cdot i \quad (2)$$

When the valve element 114 comes in contact with the valve seat 118, the movable element 102a is separated from the movable element 102b and the valve element 114. Then, the load of the spring 110 operated on the movable element 102a through the valve element 114 and the movable element 102b and the force in the valve closing direction due to the fuel pressure operated on the valve element 114 disappear, and the movable element 102a is biased in the valve opening direction by the force of the return spring 112. In other words, since the direction of the force operated on the movable element 102a at the moment when the valve element 114 is completely closed is changed from the valve closing direction to the valve opening direction, the acceleration of the movable element 102a is changed.

A relation between the gap x generated between the movable element 102 and the fixed core 107 and the magnetic flux $\varphi$ passing through the attraction plane can be considered as a relation of a first-order approximation in a minute time. When the gap x becomes large, a distance between the movable element 102 and the fixed core 107 become large, and the magnetic resistance is increased. The magnetic flux capable of passing through the end surface of the movable element 102 on a side near the fixed core 107 is reduced, and the magnetic attraction force also falls down. The attraction force operated on the movable element 102 can be logically derived by Equation (3). In Equation (3), the attraction force operated on the movable element 102 is in proportion to a square of a magnetic flux density B of the attraction plane of the movable element 102, and in proportion to an attraction area S of the movable element 102.

$$Fmag = (B^2 \cdot S)/(2 \cdot \mu_0) \quad (3)$$

In Equation (2) and FIG. 12, the inter-terminal voltage Vinj of the solenoid 105 and the first-order derivative of the magnetic flux $\varphi$ passing through the attraction plane of the movable element 102 are in a correspondence relation. In addition, since the area of the space between the movable element 102 and the fixed core 107 is increased by the change in the gap x as a distance between the end surface of the movable element 102 on a side near the fixed core 107 and the end surface of the fixed core 107 on a side near the movable element 102, the magnetic resistance of the magnetic circuit is changed. As a result, the magnetic flux capable of passing through the attraction plane of the movable element 102 is changed, so that it can be considered that the gap x and the magnetic flux φ are in the relation of the first-order approximation in a minute time. Since the area of the space between the movable element 102 and the fixed core 107 is small on a condition that the gap x is small, the magnetic resistance of the magnetic circuit is small, and the magnetic flux capable of passing through the attraction plane of the movable element 102 is increased. On the other hand, since the area of the space between the movable element 102 and the fixed core 107 is large on a condition that the gap x is large, the magnetic resistance of the magnetic circuit is large, and the magnetic flux capable of passing through the attraction plane of the movable element 102 is reduced. In addition, in FIG. 12, the first-order derivative of the magnetic flux is in a correspondence relation with respect to the first-order derivative of the gap x. Furthermore, the first-order derivatives of the inter-terminal voltage Vinj and the voltage VL2 correspond to a second-order derivative of the magnetic flux φ, and the second-order derivative of the magnetic flux φ corresponds to a second-order derivative of the gap x (that is, the acceleration of the movable element 102). Therefore, the second-order derivative of the inter-terminal voltage Vinj or the voltage VL is necessarily detected in order to detect the change in the acceleration of the movable element 102, so that the voltage VL may be divided to input the voltage VL2 to the A/D conversion port of the CPU 801.

In FIG. 11, when the injection pulse width Ti is stopped (that is, the energizing to the solenoid 105 is stopped), and the valve element 114 starts to be displaced from a maximum displacement position, the profile of the voltage VL2 is changed. In addition, the voltage VL2 is changed according to the displacement amount of the movable element 102 which moves in conjunction with the valve element 114. Since the magnetic resistance becomes large as the gap x between the movable element 102 and the fixed core 107 is large, the residual magnetic flux becomes less. As a result, the voltage VL2 approaches 0 V.

In addition, when the movable element 102a is separated from the movable element 102b and the valve element 114 at the moment when the valve element 114 comes in contact with the valve seat 118, the force in the valve closing direction operated on the movable element 102a through the movable element 102b and the valve element 114 disappears. The movable element 102a receives the force in the valve opening direction of the return spring 112, and the direction of the force operated on the movable element 102a is changed from the valve closing direction to the valve opening direction. Therefore, the change in the acceleration of the movable element 102a can be detected at a minimum value of the second-order derivative of the voltage VL2. Further, as a place where the voltage is detected, the inter-terminal voltage Vinj, the voltage VL2, or a voltage VHL obtained by subtracting the voltage VL from the voltage VH between a terminal 890 and the ground potential may be used. In a case where the valve closed timing of the valve element 114 is detected at the voltage VL, the inflection point may occur in the voltage VL after the injection pulse Ti is stopped at a timing when the charges are completely discharged from the capacitor 851. In a case where a time difference between the timing when the inflection point occurs and the valve closed timing is small, the inflection point occurring by the capacitor 851 interferes in the voltage VL at the valve closed timing, and a detection error may occur. Since the inflection point occurring by the capacitor 851 can be cancelled by detecting the voltage VHL or the inter-terminal voltage Vinj, the detection accuracy of the valve closed timing can be improved.

After the injection pulse width Ti is stopped, the movable element 102a and the movable element 102b are displaced from the target lift position in conjunction with the valve element 114, the voltage VL at this time smoothly approaches 0 V from the positive boost voltage VH. When the movable element 102a is separated from the valve element 114 and the movable element 102b after the valve element 114 is closed, the force in the valve closing direction operated on the movable element 102a through the valve element 114 and the movable element 102b (that is, the load of the spring 110 and the force of the fuel pressure) disappears, and the load of the return spring 112 is operated on the movable element 102a as a force in the valve opening direction. When the valve element 114 reaches the valve closing position to change the direction of the force operated on the movable element 102a from the valve closing direction to the valve opening direction, the second-order derivative of the voltage VL which has been smoothly changed comes to be steeply changed. The individual variation in the displacement amount of the valve element 114 can be detected with accuracy by detecting the minimum value of the second-order derivative of the voltage VL. In addition, the value of the voltage VL caused when the movable element 102a and the movable element 102b are displaced from the opening position is changed by the resistance value determined by a diameter of a winding wire of the solenoid 105 and the number of windings, a specification of the magnetic circuit, an inductance determined by a material (the electric resistance and the BH curve), a design value of the target lift of the valve element 114, and a current value at a timing when the injection pulse width Ti is stopped, and receives a large influence of a variation in tolerance of the dimensions and the setting values described above. In a method of detecting the valve close delay time using the second-order derivative of the voltage VL, the change points of the acceleration of the movable element 102a and the movable element 102b are detected as a physical amount. Therefore, the valve closed timing can be detected with high accuracy without influence of the variation in the setting values, the tolerance, and the environmental condition (current value), and it is possible to detect the valve close delay time which is a time until the valve element 114 is closed after the injection pulse is turned off.

In order to detect a time until the valve element 114 is completely closed after the injection pulse width T is stopped, the inter-terminal voltage Vinj to be input to the IC 802 or the CPU 801 or the voltage VL1 obtained by dividing the voltage VL is subjected to the second-order differentiation, and a timing when the second-order derivative is minimized is detected as the timing when the valve element 114 is completely closed, so that the valve closed timing can be detected with accuracy. In addition, for the pre-processing for detecting the inter-terminal voltage Vinj or the voltage VLI obtained by dividing the voltage VL, the active low-pass filter 860 configured by the operational amplifier 820, the resistor R81, the resistor R82, and the capacitor C81 may be provided between the terminal 881 of the fuel injection device 840 and the terminal y80 of the CPU 801. The changes in the inter-terminal voltage Vinj, the voltage VL, and the voltage VL1 generated by the change in the acceleration of the movable element 102a as the valve element 114 is completely closed contain low frequencies compared to that of the noise superimposed on the voltage signal. Therefore, the high-frequency noise generated in the inter-terminal voltage Vinj, the voltage VL, and the voltage VL1 can be reduced by interposing the active low-pass filter between the terminal 881 for measuring the voltage VL1 and the CPU 801, and the detection accuracy of the valve closed timing can be increased.

In addition, a cutoff frequency fc2 of the active low-pass filter 860 can be expressed as the following Equation (4) using the values of the resistor R84 and the capacitor C82. The switching timing of the switching elements 805, 806, and 807, the switching timing of the switching element 831 for configuring the second voltage source, and the value of the second voltage source are changed according to the configuration of the fuel injection device and the drive device, and as a result, the frequency of the noise generated in the voltage is changed. Therefore, the design values of the resistor R84 and the capacitor C82 may be changed according to the specifications of the fuel injection device 840 and the drive circuit. In addition, in a case where the low-pass filter is configured by an analog circuit, there is no need to perform a filtering process in a digital manner by the CPU 801, so that the calculation load of the CPU 801 can be reduced. In addition, the signal of the voltage VL1 is directly input to the CPU 801 or the IC 802, and may be subjected to the filtering process in a digital manner. In this case, there is no need to use the analog components of the low-pass filter such as the operational amplifier 820, the resistor R81, the resistor R82, and the capacitor C81, so that the cost of the drive device can be reduced. In addition, as the low-pass filter described above, a primary low-pass filter configured by the resistor disposed in series to a terminal 853 and the capacitor disposed in parallel may be used. In a case where the primary low-pass filter is used, two components of the resistor and the operational amplifier can be reduced compared to the configuration using the active low-pass filter, so that the cost of the drive device can be reduced. In addition, a method of calculating the cutoff frequency of the primary low-pass filter can be calculated by Equation (4) in a case where the active low-pass filter 860 is used. The cutoff frequency fc2 may be configured to be different from the value of the active low-pass filter fc1 for detecting the valve opening timing.

In addition, as a configuration of the low-pass filter, it is possible to configure the low-pass filter using a coil and a capacitor such that the time constant is higher than the second order. In this case, since the low-pass filter can be configured without a resistor, there is a merit on reducing the power consumption compared to a case where the active low-pass filter and the primary low-pass filter are used.

$$fc2=1/(2 \cdot \pi \cdot R82 \cdot C81) \quad (4)$$

As a measurement point of the voltage for detecting the valve closed timing, the inter-terminal voltage Vinj may be used, but the high-frequency noise generated by the switching element 831 of the booster circuit of the fuel injection device 840 occurs in the inter-terminal voltage Vinj. In the inter-terminal voltage Vinj, the profile of the voltage after the injection pulse Ti is stopped is reversed in polarity compared to the voltage VL, and approaches the voltage 0 V from the boost voltage VH in the negative direction. Therefore, a maximum value of a second-order derivative of the inter-terminal voltage Vinj is necessarily detected in order to detect the valve closed timing, and a time constant of the low-pass filter is necessarily designed large to reduce the switching noise in order to perform the detection with high accuracy, and thereby there may be an error between the timing when the valve element 114 and the valve seat 118 come in contact and the valve closed timing which is detected using the second-order derivative of the detected inter-terminal voltage Vinj. Since the error comes a variation in detection and imposes a restriction on the control of the minute injection amount, a place for measuring the valve closed timing is desirably set to the voltage VL which is the voltage difference between the terminal of the fuel injection device 840 on a side near the ground potential and the ground potential (GND) instead of the inter-terminal voltage Vinj.

In addition, the signal input to the CPU 801 or the IC 802 triggers the injection pulse width Ti, and may receive the signal of the voltage VL2 in a predetermined time after a period of time passes after the injection pulse width Ti is stopped. With such a configuration, a sequence of data of the voltage VL2 input to the CPU 801 or the IC 802 can be suppressed as many as required for the detection of the valve closed timing, so that a storage capacity and a calculation load of the CPU 801 and the IC 802 can be reduced. In addition, when the differentiating of the voltage is performed at a timing of switching from the boost voltage VH to the battery voltage VB and a timing of repeating the energizing/de-energizing of the switching elements 805, 806, and 807 (that is, a timing when the voltage is steeply changed), a high-frequency signal is generated in the processed data. Therefore, when the valve closed timing when the valve element 114 comes in contact with the valve seat 118 is detected using the second-order derivative of the voltage VL2, the valve closed timing may be falsely detected. However, it is possible to prevent the false detection of the valve opened timing by determining the period of detecting the voltage by the CPU 801 or the IC 802.

In addition, as a resistor 816 for detecting the voltage, a shunt resistor having a highly-accuracy resistance value may be used. In the drive device of the fuel injection device 840, in order to measure the current or the voltage, the voltages of both ends of the resistors 812, 813, 808, and 816 provided in the drive circuit for detecting the voltage are checked by the IC 802 or, the CPU 801. If the resistance value of the individual device is different from a predetermined resistance value in the IC 802 or the CPU 801, an error occurs in the voltage value estimated by the IC 802. Therefore, the drive current supplied to the solenoid 105 of the fuel injection device 840 varies in each fuel injection device 840 of each cylinder, the variation in the injection amount becomes large.

In addition, when the inter-terminal voltage Vinj of the fuel injection device 840 is small at the valve closing position where valve element 114 and the valve seat 118 come in contact, the change in the voltage due to the change in the acceleration of the movable element 102 becomes relatively small. Therefore, when the load of the spring 110 is increased to reach the valve closing position on a condition that inter-terminal voltage Vinj of the solenoid 105 is high, the valve close delay time is effectively shortened. In addition, the force of the fuel pressure operated on the valve element 114 and the movable element 102 is increased as the fuel pressure supplied to the fuel injection device 840 is large, the valve close delay time becomes small. For example, the individual variation of each cylinder at the valve closed timing when the valve element 114 comes in contact with the valve seat 118 may be detected on a condition that the fuel pressure is high and on an operation condition that the fuel pressure supplied to the fuel injection device 840 in each cylinder is equal. With this effect, the residual magnetic flux generated in the magnetic circuit at the valve closed timing becomes large compared to the condition that the fuel pressure is low. In addition, the speed when the valve element 114 comes into conflict with the valve seat 118 is increased, the change in the acceleration of the movable element 102 when the movable element 102 is separated from the valve element 114 at the moment of the contact between the valve element 114 and the valve seat 118 is increased, and the change in the induced electromotive force becomes large. Therefore, the valve closed timing is easily detected at the second-order derivative of the inter-terminal voltage Vinj or the voltage Vl. In addition, on a condition that the fuel pressure supplied to the fuel injection device 840 is high and the load of the engine is large, the injection amount injected in an intake stroke becomes large, and the fuel pressure supplied to the fuel injection device 840 varies under the influence of pressure pulsations of the pipe provided on the upstream side of the fuel injection device 840. In this case, the valve closed timing may be detected on a condition that the engine load is small and the injection amount of each cylinder is in the idle operation.

In addition, a microcomputer for detecting the voltage VL2 and processing the data may be provided other than the CPU 801 and the IC 802. In a case where the voltage VL1 and the voltage VL2 are detected and processed by the CPU 801, the data is necessarily subjected to the A/D conversion at a high sampling rate and differentiated. In a case where an interrupt process is issued when the signal is received from another sensor or on a condition that the calculation load of the CPU 801 is high, it may be difficult that the voltage VL1 and the voltage VL2 are detected and differentiated. Therefore, when the microcomputer other than the CPU 801 is provided to function of detecting the voltage VL1 and the voltage VL2, performing a masking process and the differentiating, calculating the second-order derivatives of the voltage VL1 and the voltage VL2, detecting maximum and minimum timings of the second-order derivatives of the voltage as the valve closed timing and the valve opening timing, and storing the data, the calculation load of the CPU 801 and the IC 802 is reduced and the valve opened timing can be securely detected, so that the correction accuracy of the injection amount can be improved. The microcomputer is provided with a communication line to communicate with the CPU 801 or the IC 802, and the information of the fuel pressure received by the CPU 801 from the pressure sensor and the detection information of the valve closed timing transmitted from the microcomputer may be stored in the CPU 801. With such a configuration, the valve opening timing and the valve closed timing can be securely detected, so that the injection amount of each cylinder can be accurately controlled.

Further, as a first alternative method of detecting the valve closed timing, it is considered a method of detecting the inflection point of a leak current flowing in the coil 105 after the injection pulse Ti is stopped. When the injection pulse Ti is stopped from a state where the drive current is supplied to the coil 105, the switching elements 805, 806, and 807 are de-energized, the boost voltage VH in the negative direction is applied to the coil 105, and the drive current is steeply decreased. The voltage generated by a counter electromotive voltage disappears at a timing when the drive current reaches the vicinity of 0 A, and the current does not flow in the path returning toward the boost voltage VH, so that the boost voltage in the negative direction is automatically stopped, but a leak current slightly flows in the coil 105. At this time, since the switching elements 805, 806, and 807 are all turned off, the leak current flows from the coil 105, toward the ground potential 815 through the resistor 852 and the resistor 853. Therefore, in order to detect the leak current, the voltage of both ends of the resistor 852 or 853 is measured or the shunt resistor is provided in the path between the coil 105 and the ground potential 815 to measure the voltage of both ends. Alternatively, the switching element 806 is turned on at a timing when the current reaches the vicinity of 0 A and the application of the boost voltage VH in the negative direction is stopped, and the leak current is caused to flow from the resistor 808 toward the ground potential 815. Then, the voltage of both ends of the resistor 808 which is the shunt resistor having a highly-accurate resistance value is measured. Then, the measured voltage is differentiated, so that the inflection point of the leak current can be detected and the valve closed timing of the valve element 114 can be detected.

In addition, as a second alternative method of detecting the valve closed timing when the valve element 114 comes in contact with the valve seat 118, it is considered a method of detecting the valve closed timing in which an acceleration pickup is provided in an injector of each cylinder or the engine where the injector is fixed, and an impact when the valve element 114 comes into conflict with the valve seat 118 or a vibration caused by the impact generated when the fuel injection is abruptly stopped is detected. In this case, in order to detect the valve closed timing of each cylinder with high accuracy, a flat surface portion is provided in a cylinder portion on a side near the housing of the injector as an installation position of the acceleration pickup, and fixed thereto, the acceleration pickup is tightly fixed to the housing using a mounting screw, so that the vibration can be easily detected according to the valve closed timing of the injector. In addition, in the method of using the acceleration pickup, the valve opened timing when the movable element 102 comes into conflict with the fixed core 107 can also be detected. On the contrary, the acceleration pickup, an amplifier for amplifying the output voltage, and two lines (a voltage signal line and a GND line) are necessary for each injector. In addition, there is a need to increase the sampling rate for accurately processing a high-frequency vibrating waveform obtained by the acceleration pickup in order to make the detection with high accuracy, so that a high-performance A/D converter is required.

In addition, as a third alternative method of detecting the valve closed timing when the valve element 114 comes in contact with the valve seat 118, it is considered a method using a pressure sensor provided in the rail pipe on the upstream side of the injector for detecting a knocking or a sensor for detecting a knocking provided in the engine. In the state where the fuel is injected from the injector, the pressure of the rail pipe is reduced, a pump provided on the upstream side is operated to add pressure by an amount of reduced pressure so as to make a target fuel pressure. It is considered a method in which the pressure reduction of the fuel pipe on the upstream side of the injector is stopped when the valve element 114 comes into conflict with the valve seat 118 from the valve opened state and the valve closed timing comes, and thus the inflection point of the pressure is detected as the valve closed timing. In addition, since the sensor for detecting the knocking is generally a vibration pickup for detecting the vibration, a vibration at the time of closing the valve generated when the valve element 114 comes into conflict with the valve seat 118 according to the valve closed timing of the injector and a vibration at the time of opening the valve generated when the movable element 102 comes into conflict with the fixed core 107 can be detected, and the valve opened/closed timings can be detected. In the case of using the sensor, the valve opened timing and the valve closed timing may be detected on a condition that the engine is in a low rotation such as the idle operation and a small load in order to prevent that the valve opened/closed timings of other cylinders and the vibration at the time of combustion are matched with the detecting valve opened/closed timings.

In a typical engine, a command value from an A/F sensor (an air-fuel ratio sensor) is detected by the CPU 801, and the injection pulse width for each fuel injection device of each cylinder is finely adjusted even in the same operation condition. The fine adjustment on the injection pulse width based on the command value from the A/F sensor is stopped on a condition of detecting the valve closed timing, and the valve opening timing and the valve closed timing may be detected on a condition that the same injection pulse width is supplied. In this way, an influence of a variation other than the individual variation according to the valve operation of the fuel injection device 840 such as a variation in the inflow air when a valve closing timing and the valve closed timing are detected can be made small, and the variation in each fuel injection device of each cylinder at the valve opening timing and the valve closed timing of the fuel injection device 840 can be detected with high accuracy.

In addition, when the injection pulse width Ti is stopped, and the valve element 114 is closed from the valve opened state, the switching operation of the drive device may be controlled not to switch the energizing/de-energizing of the switching elements 805, 806, and 807 of the drive device until the valve element 114 comes in contact with the valve seat 118 and completely closed after the valve element 114 or the movable element 102 starts to be closed. With such a configuration described above, the high-frequency measurement noise caused by the switching of the switching elements 805, 806, and 807 is not superimposed on the inter-terminal voltage Vinj or the voltage VL, so that the detection accuracy of the valve closed timing can be improved.

Next, a method of detecting the valve opened timing when the valve element 114 reaches the target lift will be described using FIG. 13. In the drive current, the first-order derivative of the current, the second-order derivative of the current, and the displacement amount of the valve element 114 of FIG. 13, a profile of three individual devices of the fuel injection device 840 having different operation timing of the valve element are plotted according to the variation in the force operated on the movable element 102 and the valve element 114 caused by the dimensional tolerance. In FIG. 13, first, the current is steeply increased by applying the boost voltage VH to the solenoid 105, and the magnetic attraction force operated on the movable element 102 is increased. Thereafter, the peak current value Ipeak, or the peak current reaching time Tp and the voltage blocked period T2 may be set such that the valve opening timings of the valve elements 114 of the individual devices 1, 2, and 3 which are the fuel injection device of each cylinder are arrived until the timing t1303 when the voltage blocked period T2 is ended after the drive current reaches the peak current value Ipeak. Since the change in the voltage applied to the solenoid 105 is small on a condition that a constant voltage value 1301 is supplied subsequently to the application of the battery voltage VB, the movable element 102 starts to be lifted from the valve closing position, and the change in the magnetic resistance can be detected as a change in the induced electromotive force as the gap between the movable element 102 and the fixed core 107 is reduced. Since the gap between the movable element 102 and the fixed core 107 is reduced when the valve element 114 and the movable element 102 start to be lifted, the induced electromotive force becomes large, and the current supplied to the solenoid 105 is smoothly reduced as indicated by 1303. Since the change in the induced electromotive force according to the change in the gap becomes small at the timing when the movable element 102 reaches the fixed core 107, that is, a timing when the valve element 114 reaches the target lift (hereinafter, referred to as a valve opened timing), the current value is smoothly increased as indicated by 1304. The strength of the induced electromotive force is influenced by the current value other than the gap, but the change in the current is small on a condition that a low voltage such as the battery voltage VB compared to the boost voltage VH is applied. Therefore, the change in the induced electromotive force caused by the change in the gap is easily detected by the current.

The individual devices 1, 2, and 3 of each cylinder of the fuel injection device 840 described above are subjected to a first-order differentiating of the current to detect the timing when the valve element 114 reaches the target lift as a change point from decrease to increase of the drive current, and the timings t113, t114, and t115 when the first-order derivative of the current becomes 0 may be detected as the timing when the valve is completely opened.

In addition, in the configuration of the drive portion and the magnetic circuit in which the induced electromotive force generated by the change in the gap is small, the current may be not reduced due to the change in the gap. However, since the slope of the current (that is, the derivative of the current) is changed when the valve opened timing is arrived, the valve opened timing can be detected by detecting a maximum value of the second-order derivative of the current detected by the drive device. The valve opened timing can be stably detected without restriction on the magnetic circuit, the inductance, the resistance value, and the current. Therefore, the correction accuracy of the injection amount can be increased.

In addition, even in a case where the valve element 114 and the movable element 102 are configured as an integrated movable valve, the valve opened timing can be detected on the same principle of the detection of the valve opened timing described using the separated structure of the valve element 114 and the movable element 102.

Herein, the BH characteristic of the magnetic material used in the magnetic circuit of the fuel injection device 840 in the first embodiment is illustrated in FIG. 14. In FIG. 14, the BH curve of the magnetic material shows a non-linear relation between the magnetic field and the magnetic flux density which are input values. When the increasing magnetic field is applied to the unmagnified magnetic material, the magnetic material starts to be magnetized and the magnetic flux density is increased to reach a saturated magnetic flux density Bs. In this process, there is a region H1 where the slope of the magnetic field and the magnetic flux density is large, and a region H2 where the slope of the magnetic field and the magnetic flux density is small. In addition, when the magnetic field is reduced after reaching the saturated magnetic flux density Bs, the magnetization of the magnetic material is delayed in time, and thus the curve is drawn differently from the initial magnetization curve. In the fuel injection device 840, since the magnetic field in the positive direction is repeatedly applied in many times, a hysteresis minor loop appears between the initial magnetization curve and the return curve in many cases. Therefore, on a condition that the valve opening timing and the valve opened timing are detected, the current is increased to reach the peak current Ipeak, and a period T2 to steeply reduce the drive current is provided before the valve opening timing and the valve opened timing after the magnetic attraction force required for the displacement of the valve element 114 is generated in the movable element 102, so that the magnetic attraction force operated on the movable element 102 may be reduced. On a condition that the drive current supplied to the solenoid 105 of the fuel injection device 840 is high compared to the current value required for holding the valve element 114 in the valve opened state such as the peak current value Ipeak, the current value supplied to the solenoid 105 becomes large, and is positioned in the region H2 in which the slope of the magnetic field and the magnetic flux density is small as illustrated in FIG. 14, and thus the magnetic flux density enters a nearly-saturated state. In this first embodiment, after the magnetic attraction force required for opening the valve is generated in the movable element 102, the boost voltage VH in the negative direction is applied during the period T2, the drive current is made small at the valve opening timing and the valve opened timing by rapidly reduce the current, the slope of the magnetic field and the magnetic flux density can be made large compared to the slope of the magnetic field and the magnetic flux on a condition of the peak current value Ipeak, and the change in the acceleration of the movable element 102 at the timing of opening the valve element 114 can be easily detected more remarkably as the maximum value of the second-order derivative of the voltage VL2. In addition, similarly, at the valve opened timing, the change in the magnetic resistance as the valve element 114 starts to be displaced and the gap between the movable element 102 and the fixed core 107 is reduced can be easily detected more remarkably as the change in the induced electromotive force.

In this way, when the valve opening timing or the valve opened timing is detected, it is not essential that the boost voltage VH in the negative direction or 0 V is applied after the current is increased to reach the peak current Ipeak, but if so, the valve opening timing or the valve opened timing can be detected with more accuracy.

In addition, when the valve opened timing is detected, only the current value may be detected in a period from a time when the drive current reaches the peak current value Ipeak or after the application of the boost voltage VH in the negative direction is ended and then a predetermined period of applying the current to the drive device passes, and the detection may be performed using the first-order differentiating of the current value. With such a configuration, the current value is rapidly changed at the time when the boost voltage VH is turned on and off. Therefore, it is possible to suppress that the first-order derivative of the current exceeds the threshold previously given in the drive device at a time other than the valve opened timing, and the detection accuracy of the valve opened timing can be improved. Further, in a period when the voltage value 1301 is supplied from the battery voltage source VB after the application of the boost voltage VH in the negative direction is stopped, a period Thb when the peak current value Ipeak and the boost voltage VH in the negative direction are applied may be adjusted not to make the drive current reach the target current value Ih1 which is previously set in the IC 802. With this effect, when the drive current reaches the target current value Ih1 before the valve element 114 reaches the target lift, the current Ih1 is controlled to be constant in the drive device. Therefore, it is possible to solve the problem in that the change in the induced electromotive force cannot be detected using the drive current because the first-order derivative of the current repeatedly passes through Point 0.

In addition, switching elements 605, 606, and 607 are controlled such that the boost voltage VH in the negative direction or the application of the voltage is stopped (the application of 0 V) from a state where a constant voltage value 1102 is applied so as to make the current value reach the current 704 of FIG. 7 and then the battery voltage VB is repeatedly turned on and off to be the current 703. The time until the drive current reach the current value Ih1 after the injection pulse width Ti is turned on is changed by the variation in the valve opened timing according to a difference of the individual device of the valve element 114 and the change in the fuel pressure. The magnetic attraction force when the injection pulse width Ti is stopped depends heavily on the value of the drive current when the injection pulse width Ti is turned off. When the drive current is large, the magnetic attraction force becomes large, and the valve close delay time is increased. On the contrary, in a case where the drive current when the injection pulse width Ti is turned off is small, the attraction force becomes small, and the valve close delay time is decreased. As described above, on a condition that the valve opened timing is detected, the current value at the timing when the injection pulse width Ti is turned off is desirably the same current 703 for the individual device, so that the timing when the boost voltage VH in the negative direction is applied from the constant voltage value 1102 or the application of the voltage is stopped may be controlled at the time after the injection pulse width Ti is turned on or the time after the current reaches the peak current value Ipeak.

In the method of detecting and estimating the variation in the injection amount of each cylinder in the first embodiment, a time when the valve is completely opened after the injection pulse width Ti is supplied is stored as a valve opening delay time in each fuel injection device 840 of each cylinder, a deviation value from the center value of the valve opening delay time previously given to the CPU 801 is calculated, and a correction value of the injection pulse width Ti after the next injection is calculated according to the deviation value, so that the injection pulse width Ti may be corrected for each fuel injection device 840 of each cylinder based on the detection information of the valve opening delay time. The individual variation in the injection amount generated according to the variation in the valve opening delay time caused by the variation in tolerance can be reduced by correcting the injection pulse width Ti based on the detection information of the valve opening delay time.

Subsequently, a control method in a case where an intermediate lift operation is performed using the information of the valve opened timing of the fuel injection device 840 detected in this embodiment will be described. On a condition that the valve element 114 performs the intermediate lift operation without reaching the target lift, the individual variation in the injection amount is determined by the variation in the valve opening/closed timing. However, since the intermediate lift operation for detecting the valve opening timing and the valve closed timing is not performed at a stage where the fuel injection device is not driven in a state where the drive device and the fuel injection device are connected, in a case where the injection pulse width for obtaining the injection amount calculated by the drive device is output and the intermediate lift operation is performed, the variation in the injection amount becomes large with respect to the injection amount expected by the fuel injection device of each cylinder, the fuel of the air-fuel mixture enters a rich or lean state, and the flame may be off in some cases. Therefore, before the intermediate lift operation is performed at the beginning, there is a need to detect the valve opened timing to estimate the valve opening timing on a condition that the valve element 114 reaches the target lift. In this case, the detection is performed using the waveform for detecting the valve opened timing, and a correction coefficient is multiplied by the valve opening delay time of each fuel injection device stored in the drive device, so that the valve opening timing may be estimated. In addition, since a correlation coefficient between the valve opened timing and the valve opening timing is necessarily high in order to estimate the valve opening timing with high accuracy, the valve opening timing may be estimated based on the information of the valve opening delay time on a condition of a low fuel pressure in which the differential force due to the fuel pressure operated on the valve element 114 affecting the valve opened timing becomes small.

Next, a method of correcting the injection amount in the intermediate lift will be described using FIGS. 4, 15, 16, and 17. Further, FIG. 15 is a flowchart of correcting the injection amount in a region of the injection pulse width smaller than Point 402 in FIG. 4.

In a case where the intermediate lift operation is performed at the beginning, since the drive device has not obtained the detection information of the valve opening timing and the valve opened timing in the intermediate lift operation of each cylinder, the intermediate lift operation may be performed by multiplying the valve opening delay time and the valve close delay time detected for each fuel injection device 840 of each cylinder and the correction coefficient previously given to the CPU 801 on a condition that the valve element 114 reaches the target lift so as to estimate the valve closed timing and the valve opening timing, calculating an actual injection period (Tb−Ta') in the intermediate lift calculated based on the estimated valve opening timing Ta' and the estimated valve closed timing Tb, and correcting the injection pulse width Ti by a deviation value between the setting value previously given to the CPU 801 and the actual injection period (Tb−Ta'). In addition, in FIG. 15, the actual injection period (Tb−Ta') as the detection information is multiplied by the flow rate Qst (hereinafter, referred to as static flow) per unit time injected from the fuel injection device 840 on a condition that the valve element 114 is stopped at the target lift position so as to obtain the value (Tb−Ta')·Qst, and a relation between the value (Tb−Ta')·Qst and the injection amount is defined as a function and set in the CPU 801 of the drive device. In FIG. 16, for example, the relation between the injection amount and (Tb−Ta')·Qst can be obtained from a relation of the first-order approximation. In FIG. 17, the detection information (Tb−Ta')·Qst in each injection pulse width is acquired, and a coefficient of each cylinder is determined from the detection information based on the relation between the injection pulse width Ti and the detection information (Tb−Ta')·Qst. The relation between the detection information (Tb−Ta')·Qst and the injection pulse width Ti can be expressed by, for example, the relation of the first-order approximation, and coefficients a1, b1, a2, b2, a3, and b3 of the functions of the individual devices 1, 2, and 3 can be calculated from the detection information. The detection information at two points different in the injection pulse width Ti is detected by the CPU 801, and the coefficients can be calculated. According to the flowchart described above, in a case where a required injection amount is determined by the CPU 801, the injection amount in the intermediate lift can be corrected by correcting the injection pulse width Ti for each cylinder, and the injection amount can be accurately and finely controlled.

Next, a method of controlling the fuel injection device 840 to obtain the detection information in the intermediate lift will be described using FIG. 18.

In the fuel injection system configured by the fuel injection device and the drive device in this embodiment, the valve opening timing and the valve closed timing on an the condition of the intermediate lift are necessarily acquired plural times on a condition that the fuel pressure supplied to the fuel injection device and the injection pulse Ti are different. However, in a case where the detection information in the intermediate lift is not acquired, there is a need to estimate the injection amount in the intermediate lift from the valve opened timing and the valve closed timing on a condition that the valve element 114 reaches the target lift, and perform the intermediate lift operation. In this case, the deviation value from the target injection amount becomes large, the ratio (the air-fuel ratio) of the intake air and the fuel enters the rich or lean state, the combustion is unstable and thus unburnt substances are discharged, the exhaust performance is deteriorated, and the flame may be off in some cases.

In FIG. 18, the injection in a stroke of intake/exhaust is divided plural times, the injection of a constant amount is performed on a condition that the valve element 114 of which the variation in the injection amount of each cylinder is known reaches the target lift. Before or after the injection of a constant amount, the injection in the intermediate lift is performed, and the valve opening timing and the valve closed timing in the intermediate lift operation can be detected. At this time, an integral value of the displacement amount of the valve element 114 corresponds to the injection amount, and the injection amount in the intermediate lift may be set to be small compared to the injection amount on a condition that the valve element 114 reaches the target lift. Therefore, the majority of the injection amount in a stroke of intake/exhaust is determined by the injection amount on a condition that the valve element reaches the target lift, so that it is possible to suppress that the flame is off even when the injection amount in the intermediate lift is deviated from the target value.

On a condition of the intermediate lift, the injection for obtaining the detection information of the valve closed timing may be performed one or plural times in a stroke of intake/exhaust. The operation of the intermediate lift in a stroke of intake/exhaust is performed plural times, and the detection information of the valve closed timing for correcting the injection amount can be obtained plural times at the same time by using the injection pulse widths Ti different in the first intermediate lift operation and the second intermediate lift operation. In addition, in a case where the detection information of the valve opening timing is already obtained, there is no need to use the waveform of the injection at the second time illustrated in FIG. 15, but a current waveform appropriate for an injection of the intermediate lift operation may be actually used as a drive waveform in the intermediate lift. According to the above method, the detection information of the valve closed timing in the intermediate lift can be obtained while keeping the stability in combustion, so that the individual variation of the fuel injection device of each cylinder on the condition of the intermediate lift can be corrected in a short time and the fuel can be finely injection.

In addition, according to the method of this embodiment, not only the individual variation in the intermediate lift but also the variation in the injection amount of the injector of each cylinder generated by the individual variation in the valve closed timing can be reduced even in a case where the valve element 114 is driven on a condition of reaching the target lift. The valve element 114 starts to be closed after the injection pulse Ti is stopped, and the individual variation in the valve opened timing is generated by the load of the set spring and the variation in tolerance of the dimension for determining the magnetic attraction force. Therefore, the movable element 102 of the individual device having a fast valve closed timing is separated from the fixed core 107, and the valve closing timing when the valve element 114 starts to be closed occurs also fast. Therefore, a value obtained by integrating the flow rate per unit time in a full lift on a variation time of the valve closed timing corresponds to the variation amount of the injection amount caused by the individual variation in the valve closed timing. Therefore, the variation in the injection amount until the valve element 114 reaches the valve closed timing after the valve opened state can be derived by the ECU by detecting the valve closed timing. In addition, the injection amount injected until the valve element 114 reaches the target lift can be derived from the slope of the valve element 114 which can be estimated from the information of the valve opening timing and the valve opened timing of the injector of each cylinder detected by the ECU. Therefore, in addition to the variation in the injection amount estimated from the valve closed timing, the variation in the injection amount of the injector of each cylinder can be detected by the ECU, and the injection amount on a condition that the valve element 114 reaches the target lift can be corrected by correcting the injection pulse width Ti and the current setting value.

Furthermore, as illustrated in FIG. 18, after the information of the valve opening timing and the valve closed timing in the intermediate lift operation is acquired, the division injection performed in an intake stroke may be performed in the operation of the intermediate lift. In the case of the operation in the intermediate lift, a time taken for the acceleration of the valve element 114, the movable element 102a, and the movable element 102b in the valve closing direction after the injection pulse Ti is stopped is short compared to the operation performed in a case where the valve element 114 reaches the target lift. Therefore, since the speeds of the valve element 114, the movable element 102a, and the movable element 102b can be reduced at a timing when the valve element 114 comes in contact with the valve seat 118, the movable element 102a moves along a parabolic curve in the valve closing direction after the valve element 114 is closed, and a time taken for returning up to the contact position with respect to the valve element 114 can be shortened by the return spring 112. When the injection pulse of the next injection in the division injection is applied in the middle of the motion of the movable element 102b, a time until the movable element 102b comes into conflict with the valve element 114 after the injection pulse is turned on is shortened by the kinetic energy of the movable element 102b in addition to the magnetic attraction force operated on the movable element 102b, and thereby the valve opening timing of the valve element 114 becomes fast to cause a variation in the injection amount between the first and second injections. In this embodiment, the division injection in a stroke of intake/exhaust can be performed in the intermediate lift operation by storing the valve-opening-start delay time and a valve-closed delay time in the drive device of each fuel injection device of each cylinder. As a result, the injection interval for the next injection after the valve element 114 is closed can be reduced, so that the number of division injections can be increased and the accurate control on the injection amount and the control on the injection timing can be made. Therefore, the uniformity of the air-fuel mixture can be improved. In addition, since the injection amount in the intermediate lift is small compared to a case where the valve element 114 is driven after reaching the target lift, a penetrating force of the injection fuel spray can be weakened, and it is possible to suppress that the fuel is attached to the piston and the wall of the cylinder. The non-combusted particles PM containing tin and the number PN of non-combusted particles can be reduced, and the exhaust gas can be made cleaner.

Second Embodiment

Figure 19:
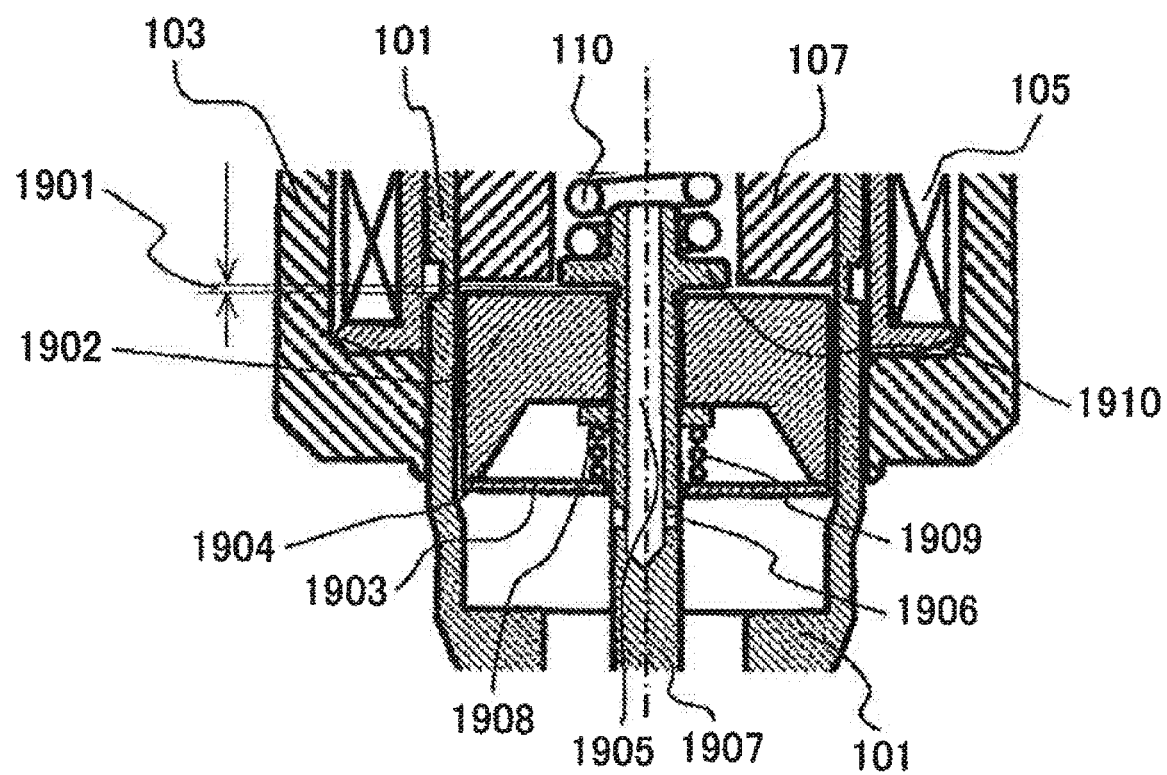
FIG. 19 is an enlarged cross-sectional view of the drive portion in a valve closed state in which the valve element of a fuel injection device comes in contact with a valve seat in a second embodiment.
Figure 20:
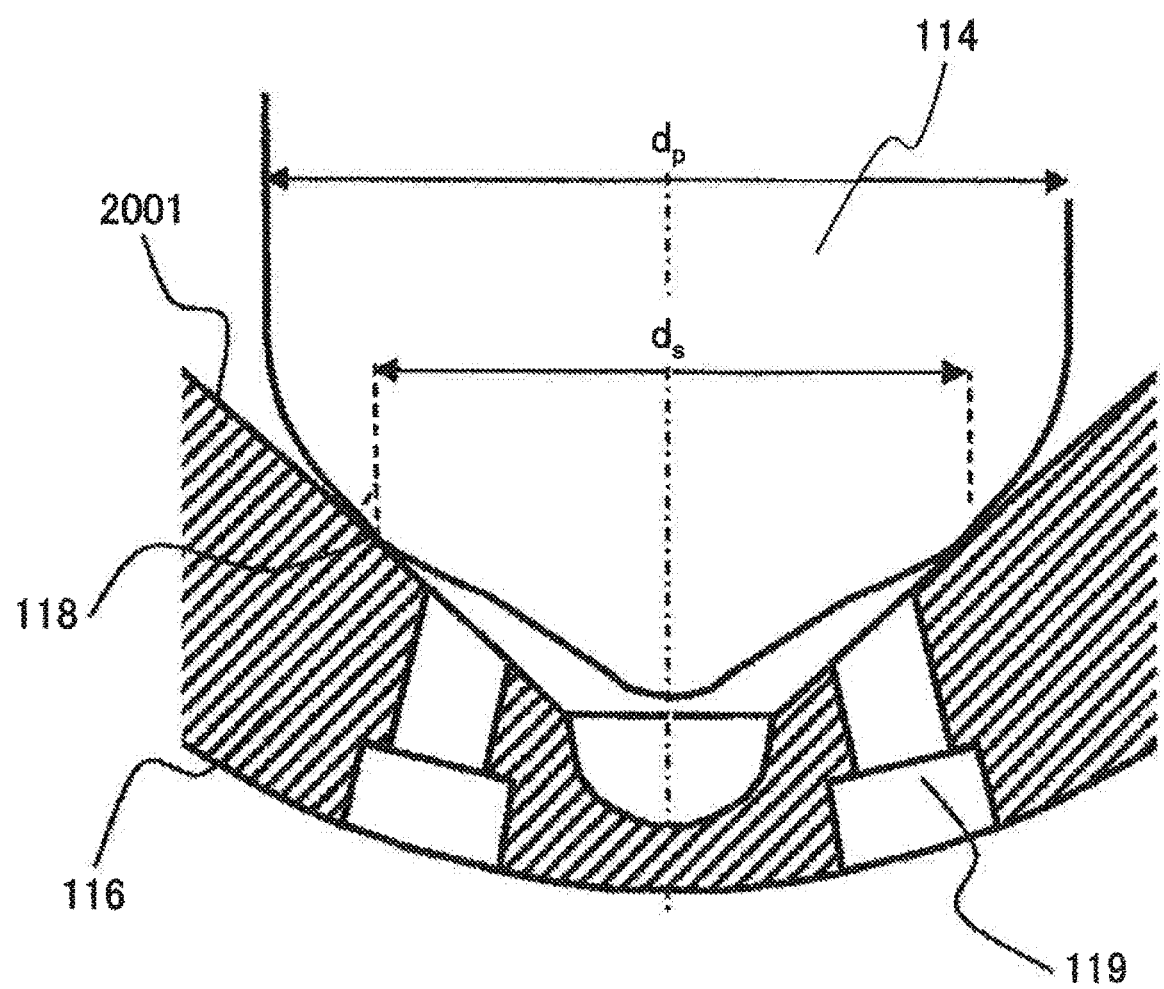
FIG. 20 is an enlarged cross-sectional view of a tip of the valve element of the fuel injection device in the second embodiment.
Figure 21:
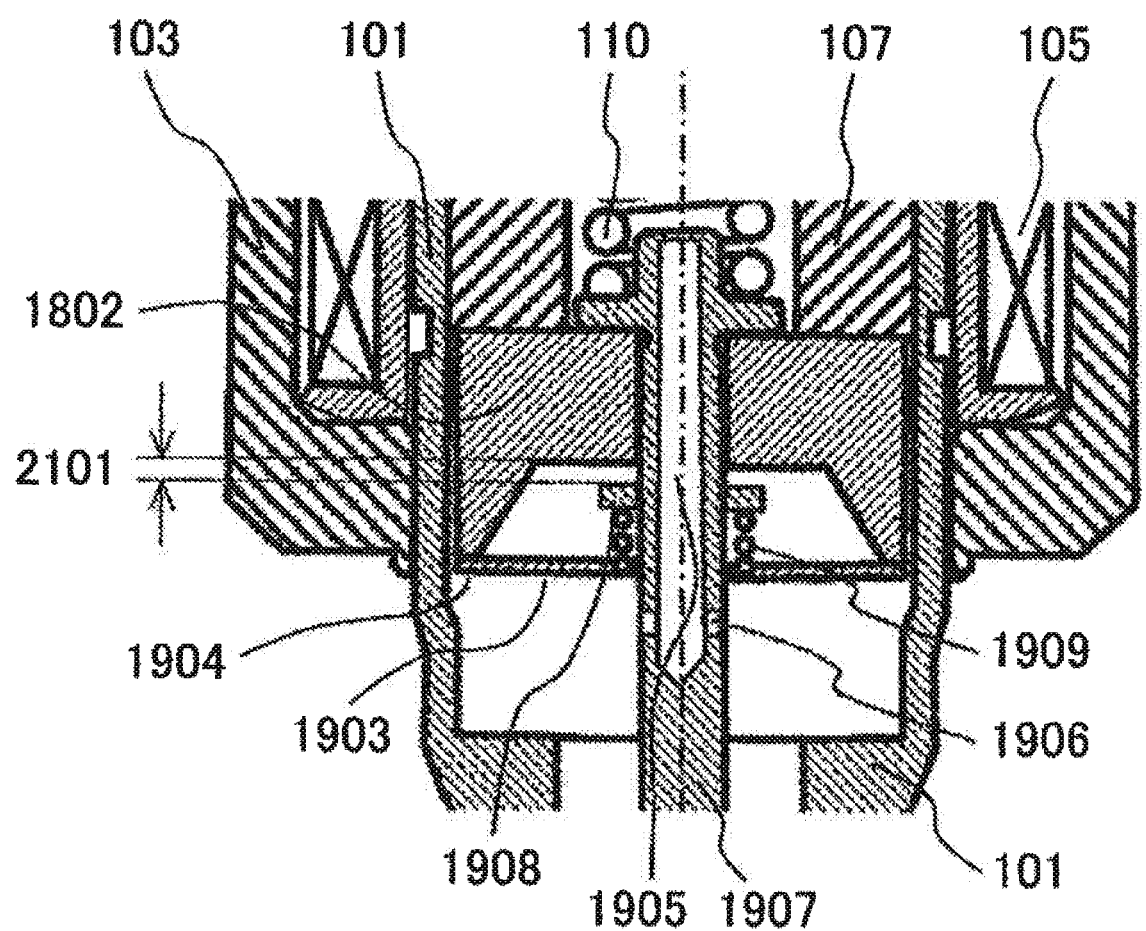
FIG. 21 is an enlarged cross-sectional view illustrating the drive portion when the valve element of the fuel injection device in the second embodiment of the invention is in a valve opened state.
Figure 22:
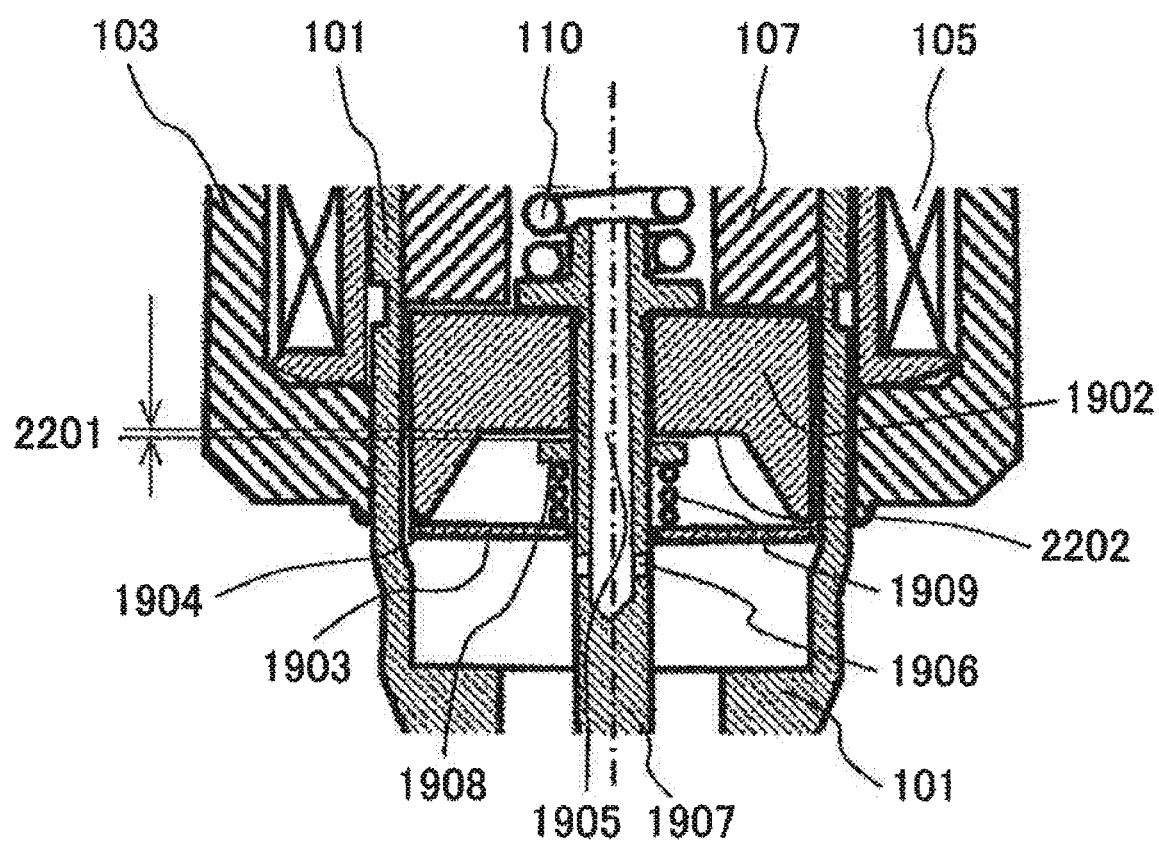
FIG. 22 is an enlarged cross-sectional view illustrating the drive portion at the moment when the valve element of the fuel injection device in the second embodiment starts to be closed from the valve opened state, and comes in contact with a valve seat 118.
Figure 23:
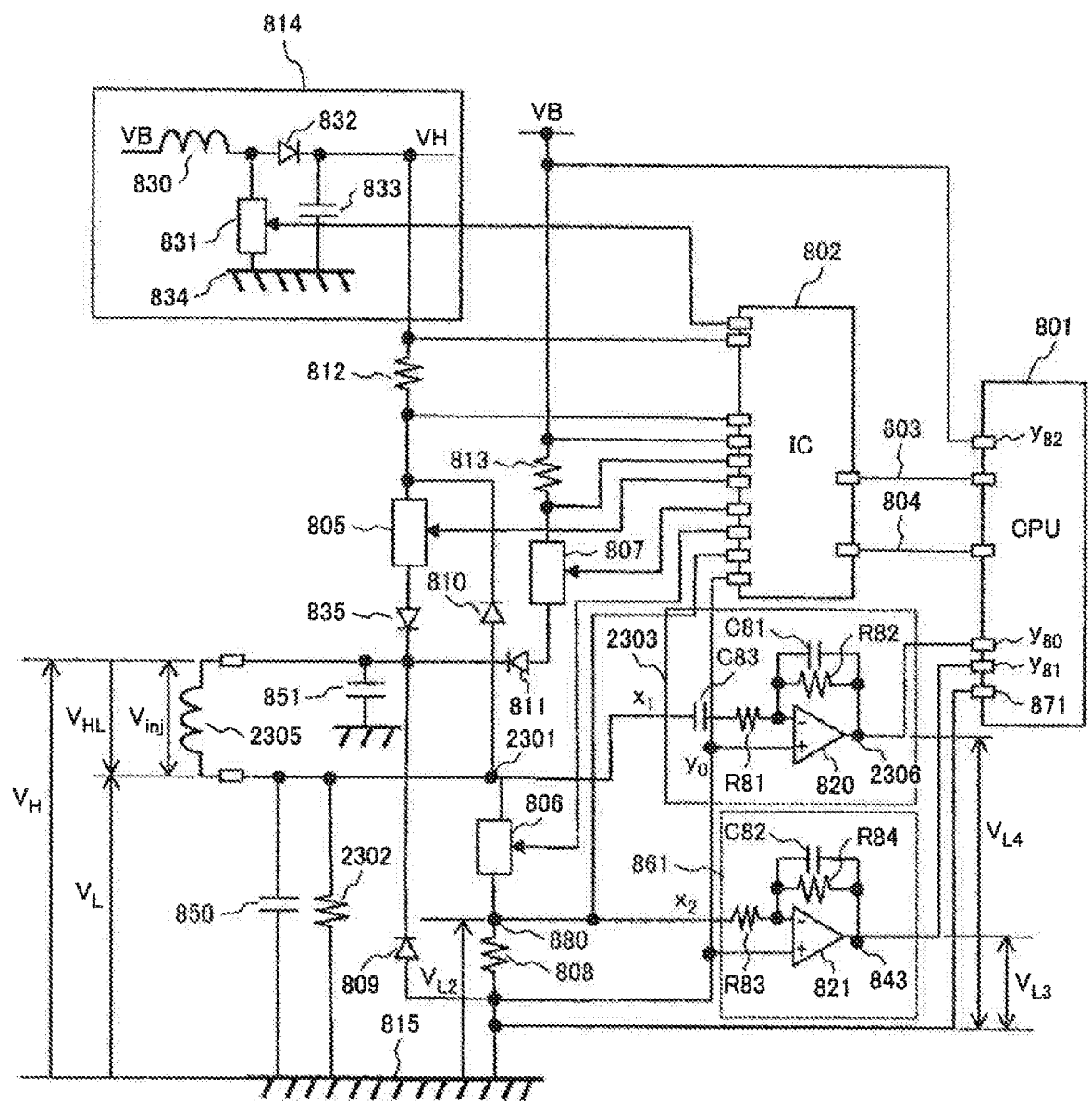
FIG. 23 is a diagram illustrating a configuration of the drive device in the second embodiment.
Figure 24:
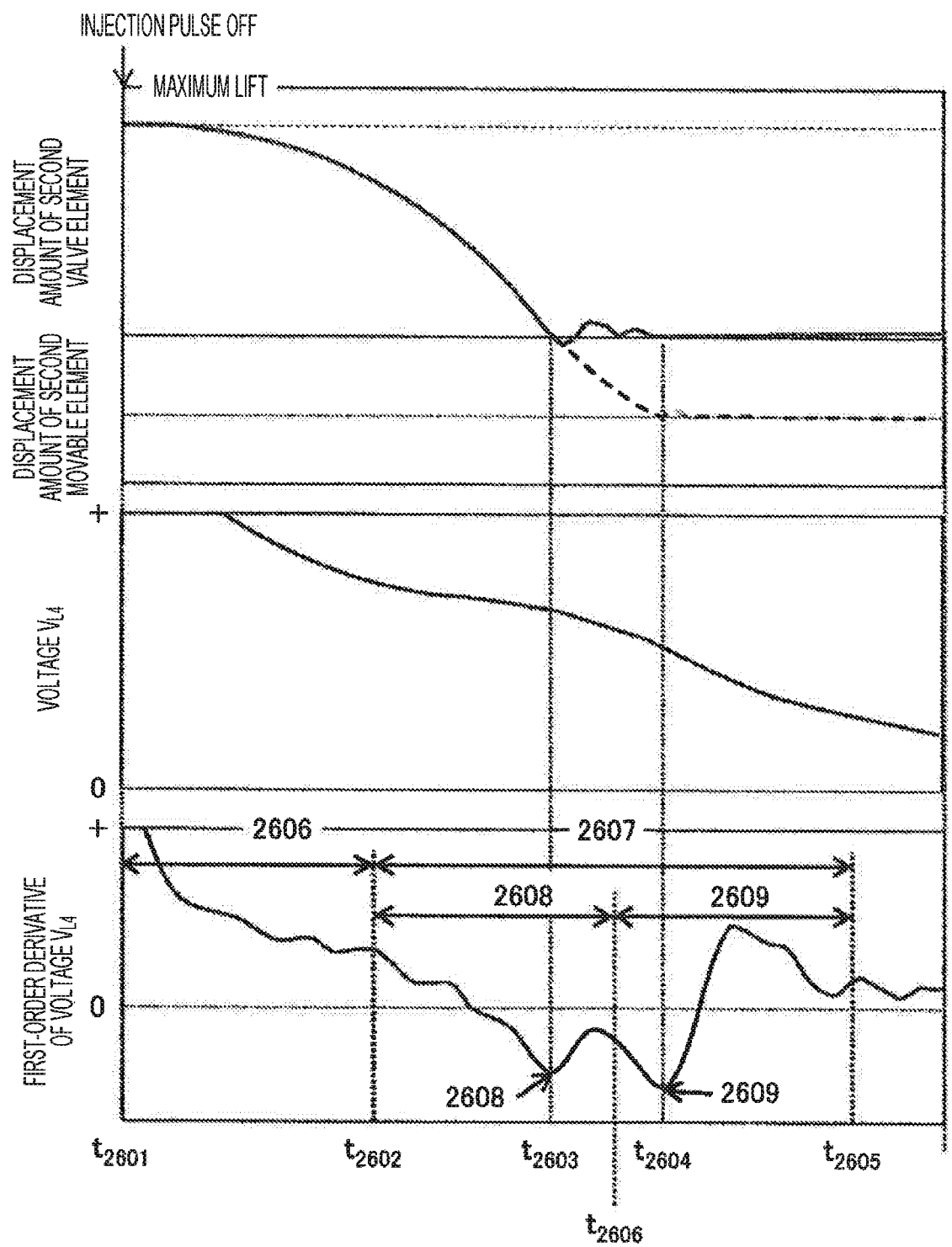
FIG. 24 is a graph illustrating a relation between the displacement amounts of a second valve element and a second movable element, a voltage difference VL4 between a terminal for detecting a voltage VL, by a CPU and a ground potential, a second-order derivative of the voltage VL4, and time after the injection pulse is turned off when the valve element is closed in an intermediate lift state from a maximum lift in the second embodiment.

The configuration of a fuel injection device and the drive device in a second embodiment of the invention will be described using FIGS. 19 to 24. FIG. 19 is an enlarged cross-sectional view of the drive portion in the valve closed state in which the valve element comes in contact with the valve seat in the fuel injection device in this embodiment. FIG. 20 is an enlarged cross-sectional view of a tip of the valve element of the fuel injection device. FIG. 21 is an enlarged cross-sectional view illustrating the drive portion in the valve opened state in the fuel injection device in this embodiment. FIG. 22 is an enlarged cross-sectional view of the drive portion at the moment when the valve element starts to be closed from the valve opened state, and comes in contact with the valve seat 118. FIG. 23 is a diagram illustrating a configuration of the drive device in this embodiment. FIG. 24 is a graph illustrating a relation between the displacement amounts of a second valve element 1907 and a second movable element 1902, a voltage difference VL4 between a terminal 2306 for detecting the voltage VL by the CPU 801 and the ground potential 815, a second-order derivative of the voltage VL4, and time after the injection pulse is turned off when the valve element is closed in an intermediate lift state from a maximum lift. Further, the same components as those of FIGS. 1 and 2 will be denoted by the same symbols in FIGS. 19, 20, 21, and 22. In addition, the same components as those of FIG. 19 will be denoted by the same symbols in FIGS. 21 and 22. In addition, the same components as those of FIG. 8 will be denoted by the same symbols in FIG. 23.

First, the description will be made using FIGS. 19 and 20 about the structure and the configuration of the drive portion of the fuel injection device in the valve closed state in which the valve element and the valve seat 118 in this embodiment come in contact. In FIG. 19, the second valve element 1907 is provided with a first regulation member 1910 in the upper portion, and the second valve element 1907 is combined with a second regulation member 1908. In the second movable element 1902, a first member 1903 for supporting an initial position spring 1909 is bonded to the second movable element 1902 by a bonding portion 1904. The second movable element 1902 is relatively movable between the first regulation member 1910 and the second regulation member 1908. In the valve closed state in which the second valve element 1907 and the valve seat 118 come in contact, a fluid force (hereinafter, referred to as a differential force) obtained by a product of the load of the spring 110, the area of a seat diameter d2 at a position where the fuel pressure of the second valve element 1907 and the valve seat 118 come in contact, and the fuel pressure is operated on the second valve element 1907 in the valve closing direction. In addition, the second movable element 1902 is biased in the valve closing direction by the load of the initial value spring 1909, and comes in contact with the second regulation member 1908 and stopped. In the valve closed state, a gap 1901 is provided between the second regulation member 1910 and the second movable element 1902. In addition, in a state where the second valve element 1907 comes in contact with the valve seat 118, there is no pressure difference between the upper portion and the lower portion of the second movable element, so that the differential force is not operated on the second movable element. In addition, a longitudinally bored fuel passage 1905 is formed in the center of the second valve element 1907, and a horizontally bored fuel passage 1906 is provided to make the fuel flow to the downstream side.

The configuration of the drive device in a second embodiment will be described using FIG. 23. The drive device of the second embodiment is different from that of the first embodiment in that the measurement place of the voltage to detect the valve closed timing is changed from the voltage VL1 to the voltage VL, and a capacitor C83 is provided between the resistor R81 of the active low-pass filter 860 and a terminal 2301 of the fuel injection device 840 on a side near the ground potential (GND), so that an analog differential circuit 2203 configured by the capacitors C81 and C83, the resistors R81 and R82, and the operational amplifier 820 is provided. Therefore, the first-order differentiating of the voltage VL is performed by the drive device in an analog manner, and the signal, of the first-order derivative of the voltage VL is input to the A/D conversion port of the CPU 801. In the analog differential circuit 2203, since the voltage difference between the terminal of the solenoid 105 on a side near the ground potential (GND) and the ground potential (GND) is detected in the configuration that the voltage VL is not divided, a maximum value of the voltage VL becomes a high voltage value (for example, 60V) on a condition that the voltage in the negative direction is applied to the solenoid 105. Since the voltage input to the operational amplifier 820 can be made small by disposing the capacitor CI between the measurement terminal 2301 for detecting the voltage VL and the operational amplifier 820, a withstand voltage required for the operational amplifier 820 and the A/D converter of the CPU 801 can be reduced, and the costs of the operational amplifier 820 and the CPU 801 can be reduced. In addition, according to the configuration, since there is no need to provide the resistor 853 required for dividing the voltage VL in the first embodiment, the cost of the drive device is reduced. In addition, since the differentiating is performed by the analog differential circuit 2203, the high-frequency noise superimposed on the voltage VL of the drive device can be reduced. Since the voltage value after the first-order differentiating is input to the CPU 801, a time resolution required for the A/D conversion port of the CPU 801 can be reduced. The load of the CPU 801 such as a filtering process and a digital differential operation can be reduced.

In addition, the voltage difference between the ground potential 815 and a terminal 843 in which the high-frequency noise is removed by making the voltage VL2 pass through the active low-pass filter 861 for detecting the valve opening timing and the valve opened timing is referred to as the voltage VL3. Since the voltage VL3 is input to the A/D conversion port of the CPU 801 and a value obtained by dividing the voltage VL3 by the resistance value of the resistor 808 according to Ohm's law becomes the current flowing in the solenoid 105, the current flowing in the solenoid 105 can be detected by the CPU 801. In addition, according to the method in this embodiment, the change (that is, the current derivative value) in the slope of the current flowing in the solenoid 105 is configured to be detectable by the drive device. Therefore, the valve opening timing and the valve opened timing can be detected by differentiating the voltage VVL3.

Next, the valve opening operation of a fuel injection device 2305 in the second embodiment will be described using FIGS. 19, 20, and 21. When the current is supplied to the solenoid 105 and the magnetic attraction force operated on the second movable element 1902 exceeds the load of the initial position spring 1909, the second movable element 1902 moves in the valve opening direction, the second movable element 1902 comes into conflict with the second valve element 1907 at a timing when the gap 1901 becomes 0, and the second valve element 1907 is separated from the valve seat 118. When the second movable element 1902 moves in the valve opening direction, shearing resistance is generated in the second movable element 1902 between the outer diameter of the second movable element 1902 and the nozzle holder 101, and a shearing resistance force is operated on the second movable element 1902 in the valve closing direction. In this case, the shearing resistance can be reduced by increasing a gap between the outer diameter of the second movable element 1902 and the nozzle holder 101. In addition, since the shearing resistance force operated on the second movable element 1902 is small compared to the magnetic attraction force in the valve opening direction, the second movable element 1902 accelerates in the valve opening direction by the magnetic attraction force generated when the switching elements 805 and 808 are energized and the boost voltage VH is supplied to the solenoid 105 so as to supply the current to the solenoid. Thereafter, the switching elements 805 and 806 are de-energized, and the boost voltage VH in the negative direction is applied to the inter-terminal voltage Vinj of the solenoid 105, so that the current flowing in the solenoid is steeply reduced. Thereafter, the switching elements 807 and 806 are energized, and the battery voltage VB is applied to the solenoid 105. In the period when the switching elements 807 and 806 are energized, the second movable element 11902 comes into conflict with the second valve element 1907 to make the second valve element 1907 start to be opened. The valve opening timing can be detected as a maximum value of the second-order derivative of the current by energizing the switching elements 807 and 806 in a predetermined period of time even after the second valve element 1907 starts to be opened or until the current value flowing in the solenoid 105 reaches a predetermined current value. In addition, compared to the method in the first embodiment, since the load of the spring 110 is operated on the second valve element 1907 instead of the movable element 102, the change in the acceleration of the second movable element 1902 at the valve opening timing of the second valve element 1907 is large, and the change in the slope of the current for detecting the valve opening timing is large. Since the change in the slope of the current affects even on the voltage VL2 for detecting the current flowing in the solenoid 105, a maximum value or a minimum value of the voltage VL2 is easily detected using the second-order differentiating of the voltage VL2. As a result, the detection accuracy of the valve opening timing can be increased.

Next, the description will be made using FIGS. 19, 20, and 21 about the operations of the second movable element 1902 and the second valve element 1907 and a method of detecting the valve opened timing in the second embodiment when the valve element 114 is opened from the valve closed state.

Since the differential force is not operated on the second movable element 1902 in a state where the second valve element 1907 comes in contact with the valve seat 118, the second movable element 1907 accelerates when the current is supplied to the solenoid 105, and reaches the target lift in a short time after coming into conflict with the second valve element 1907, and the second movable element 1902 comes into conflict with the fixed core 107 at a timing t2503. Unlike the fuel injection device 840 in the first embodiment, the load of the initial value spring 1909 operated on the second movable element 1902 is operated on the fuel injection device 2305 of the second embodiment in the valve closing direction. Therefore, as indicated by 2506, 2507, and 2508, there occurs plural times of boundings of the second movable element 1902 generated when the second movable element 1902 comes into conflict with the fixed core 107 after the second valve element 1907 reaches the target lift, and it takes a long time until the bounding of the second movable element 1902 converges. As a result, the inflection point caused by the conflict between the second movable element 1902 and the fixed core 107 is generated in the voltage VL3 for detecting the valve opened timing at timings t2502, t2503, and t2504, a mountain portion where a second-order derivative of the voltage VL3 protrudes in the positive direction may be generated in plural places as indicated by 2501, 2502, and 2503 (hereinafter, referred to as peak 2501, peak 2502, and peak 2503). Even in this case, the valve opened timing can be detected by detecting the timing t2502 when the second-order derivative of the voltage VL3 is maximized for each fuel injection device of each cylinder using the drive device. In addition, the timing t2502 serving as a trigger of an acquisition period 2505 of the voltage VL3 for detecting the valve opened timing is set using an energizing timing of the injection pulse or the energizing/de-energizing timings of the switching elements 805, 806, and 807 so as to occur after a certain period 2504 of the energizing/de-energizing operations. In particular, since the injection pulse output from the CPU 801 is generated in the CPU 801, the timing is easily used as a trigger for determining the period 2504. The acquisition period 2505 includes a time for detecting the individual variation in the valve opened timing of the fuel injection device of each cylinder, and the setting values of the period 2504 and the acquisition period 2505 may be set in the drive device in advance in order to reduce the number of pieces of data of the voltage VL3 input to the CPU 801. In addition, when the fuel pressure supplied to the fuel injection device 2305 is changed, the differential force operated on the second valve element 1907 is changed, and thus the valve opened timing is also changed. Therefore, the period 2504 and the acquisition period 2505 may be determined based on a target fuel pressure set by the CPU 801 of the drive device or a value obtained by detecting the output signal of the pressure sensor provided in the pipe on the upstream side of the fuel injection device 2305 using the drive device. Therefore, the valve opened timing can be detected with high accuracy even in a case where the operation condition is changed, and a sequence of data of the voltage VL3 necessary for the detection to be input in the CPU 801 can be reduced, and the processing load of the CPU 801 can be reduced. In addition, in the acquisition period 2505, there are provided a plurality of mountain portions where the second-order derivative of the voltage VL3 protrudes in the positive direction, and in a case where the values of the second and third peaks 2502 and 2503 are larger than the value of the first peak 2501, the initial peak 2501 may be stored in the drive device as the valve opened timing. With such a configuration, since the false detection of the valve opened timing can be suppressed while keeping the acquisition period 2505 necessary for detecting the individual variation in the valve opened timing of the fuel injection device 2305 of each cylinder, the detection accuracy of the valve opened timing and the correction accuracy of the injection amount can be increased. In addition, in FIG. 21, in a state where the second movable element 1902 comes in contact with the fixed core and stopped, a second gap 2101 is formed between the end surface on the lower side of the second movable element 1902 and the second regulation member 1908.

Next, the description will be made using FIGS. 20, 22, and 24 about the operations of the second movable element 1902 and the second valve element 1907 and a method of detecting the valve closed timing in the second embodiment when the second valve element 1907 is closed from a state where the displacement amount of the intermediate lift is maximized. In FIGS. 22 and 24, the load of the spring 110 as a force in the valve closing direction and the differential force generated by the flowing fuel are operated on the second valve element 1907 when the second valve element 1907 is closed from the valve opened state, the second movable element 1907 receives the force in the valve closing direction through the second valve element 1907, and the load of the initial position spring 1909 is operated on the second movable element 1902 in the valve closing direction. When the injection pulse is stopped, the switching elements 805 and 806 are de-energized, the boost voltage VH in the negative direction is applied to the solenoid 105, and the current flowing in the solenoid 105 is reduced, so that the magnetic attraction force operated on the second movable element 1902 comes to be reduced as the eddy current generated in the magnetic circuit disappears. When the magnetic attraction force in the valve opening direction operated on the second movable element 1902 is lower than the force in the valve closing direction operated on the second valve element 1902 and the second movable element 1907, the second movable element 1902 and the second valve element 1907 start the valve closing operation. The second movable element 1902 is separated from the second valve element 1907 at the valve opened timing t2602 when the second valve element 1907 comes in contact with the valve seat 118, and keeps on moving in the valve closing direction. Thereafter, a third gap 2201 between an end surface 2202 on the lower side of the second movable element and an end surface of the second regulation member 1908 at the moment when the second valve element 1907 and the valve seat 118 come in contact becomes 0 at a timing t2604, and the second movable element 1902 come into conflict with the second regulation member 1908 at the timing t2604 and stopped. In this embodiment, a timing t2601 of turning off the injection pulse Ti is set as a trigger for receiving the voltage VL4 in the CPU 801, the data of the voltage VL4 starts to be acquired after the injection pulse Ti is turned off and a predetermined period of time 2606 passes, and the voltage VL4 corresponding to the first-order derivative of the voltage VL may be input to the A/D conversion port of the CPU 801 only by a period 2607. Thereafter, the voltage VL4 received by the CPU 801 is subjected to digital differentiating to calculate the first-order derivative of the voltage VL4. At this time, the first-order derivative of the voltage VL4 corresponds to the second-order derivative of the voltage VL.

In the detection of the first-order derivative (corresponding to the second-order derivative of the voltage VL) of the voltage VL4 using the drive device, the force in the valve closing direction which has been operated on the second movable element 1902 through the second valve element q907 disappears from the second movable element 1902 at the valve closed timing when the second valve element 1907 comes in contact with the valve seat 118 and the second movable element 1902 is separated from the second valve element 1907. Therefore, the acceleration of the second movable element 1902 is changed, and a first mountain 2608 in which the first-order derivative of the voltage VL4 is in the negative direction is generated. Thereafter, at the moment when the second movable element 1902 comes into conflict with the second regulation member 1908, the acceleration of the second movable element 1902 is significantly changed due to a reactive force caused by the conflict with the second regulation member 1908, and a second mountain 2609 in which the first-order derivative of the voltage VL4 is in the negative direction is generated. The first-order derivative values of the voltage VL4 at the first mountain 2608 and the second mountain 2609 depend on the gap 1901 and the shape of the magnetic circuit, and significantly depend on the speed of the second movable element 1902 at the valve closed timing which is changed according to the spring load and the differential force due to the fuel pressure. Since the kinetic energy of the second movable element 1902 at the valve closed timing becomes small in a case where the speed at the valve closed timing is small, a time until the second movable element 1902 is stopped after the valve closed timing becomes long, and the value of the second mountain 2609 may be small compared to the value of the first mountain 2608 in the first-order derivative of the voltage VL4 in some cases. As described above, in a case where a minimum value of the first-order derivative of the voltage VL4 in the period 2607 is searched, it means that any one of the first mountain 2608 and the second mountain 2609 is detected. In such a case, the period 2607 is divided into a first period 2608 and a second period 2609. A minimum value of the first-order derivative of the voltage VL4 of the first period 2608 is determined as the valve closed timing when the second valve element 1907 comes in contact with the valve seat 118. A minimum value of the first-order derivative of the voltage VL4 in the second period is detected and determined as a movable element stop timing when the second movable element 1902 comes in contact with the second regulation member 1908 of the second valve element 1907 for each fuel injection device of each cylinder. Therefore, the valve closed timing can be determined with high accuracy. In addition, in the middle of the valve closing operation, the second movable element 1902 keeps on moving in the valve closing direction until coming into conflict with the second regulation member 1908 after the second valve element 1907 comes in contact with the valve seat 118. In a case where the next second injection pulse Ti is supplied for the division injection in the middle of the movement of the second movable element in the valve closing direction, the injection amount at the time of supplying the second injection pulse Ti is changed compared to the time when the first injection pulse width Ti is supplied according to the change in the position of the second movable element 1902 and the kinetic energy of the second movable element 1902 at a timing when the second injection pulse is supplied even when the same second injection pulse as the previous injection pulse (referred to as a first injection pulse) is supplied. Therefore, a timing of supplying the second injection pulse Ti may be controlled by detecting the timing t2604 when the fuel injection device 2305 of each cylinder detected by the drive device is stopped. In addition, a timing of supplying the second injection pulse Ti may be adjusted in accordance with the individual device of the fuel injection device 2305 of which the timing t2604 is the longest. According to this embodiment, a gap between the first injection pulse and the second injection pulse can be reduced on a condition of the division injection in which the fuel injection is performed plural times in a stroke of intake/exhaust. In addition, since the injection amounts of the first injection pulse and the second injection pulse can be accurately controlled, it is effective in a case where a large number of division injections are required. In addition, as the trigger for receiving the voltage VL4, a timing when the injection pulse Ti is turned on or a timing when the switching elements 805, 806, and 807 is energized/de-energized may be used.

Further, the fuel injection device 2305 and the drive device in the second embodiment may be used by combination with the fuel injection device 840 and the drive device in the first embodiment.

Third Embodiment

A control method according to a third embodiment in the invention to correct the injection amount of the fuel injection device 840 and the fuel injection device 2305 of the first and second embodiments will be described using FIGS. 25 to 28.

Figure 25:
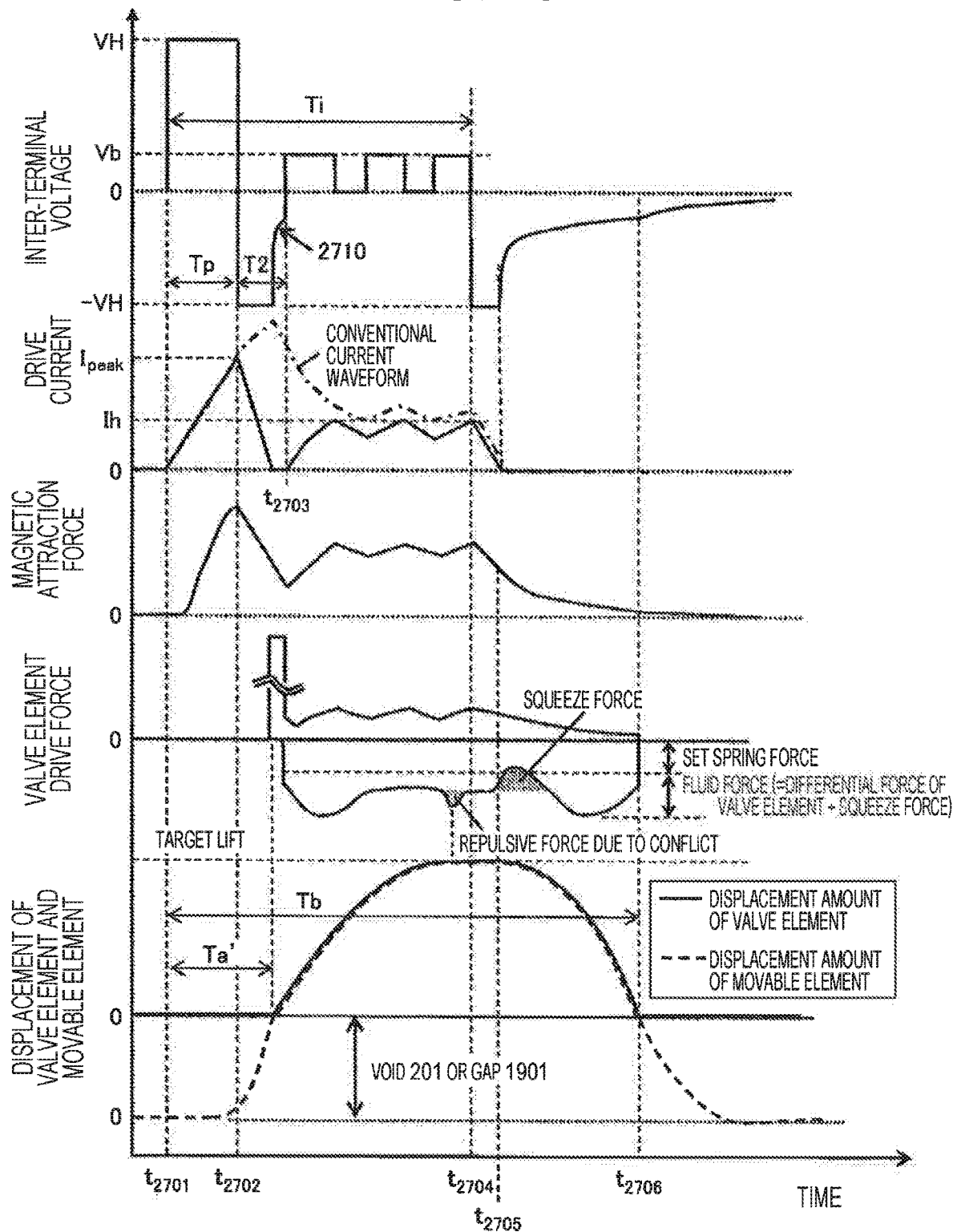
FIG. 25 is a graph illustrating a relation between the inter-terminal voltage Vinj of the fuel injection device, the drive current, a magnetic attraction force operated on the movable element or the second movable element, a valve element drive force operated on the valve element or the second valve element, the displacement amount of the valve element or the second valve element, the displacement amount of the movable element or the second movable element, and time when the valve element or the second valve element is used while being held at a target lift position in a predetermined period of time in a case where the fuel injection device is driven by a method of a third embodiment.
Figure 26:
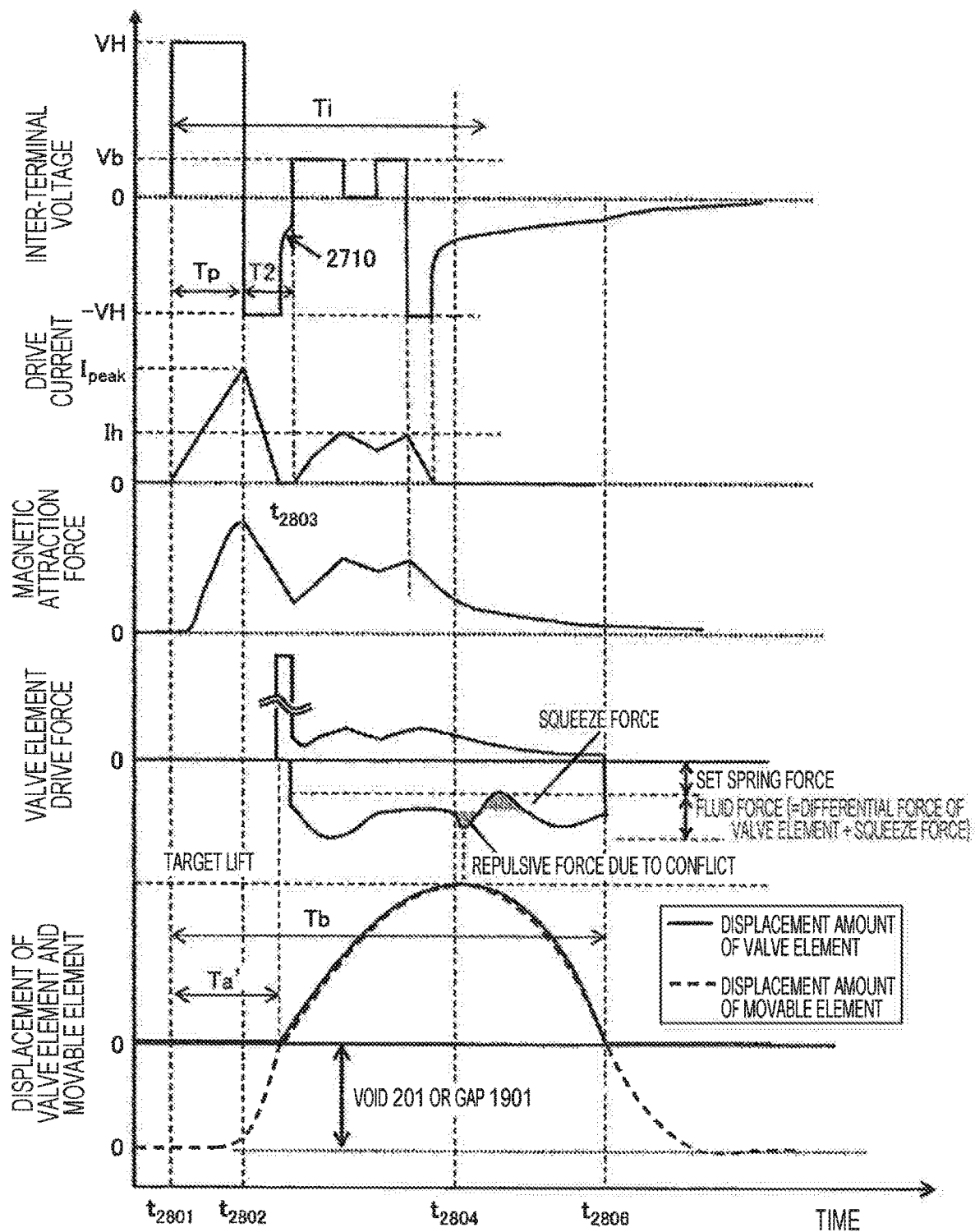
FIG. 26 is a graph illustrating a relation between the inter-terminal voltage Vinj, the drive current, the magnetic attraction force operated on the valve movable element or the second movable element, the valve element drive force operated on the valve element or the second valve element, the displacement amount of the valve element or the second valve element, the displacement amount of the movable element or the second movable element, and time in an operation state of a minimum injection amount in the middle of making the valve element or the second valve element reach the target lift in a case where the fuel injection device is driven by the method of the third embodiment.
Figure 27:
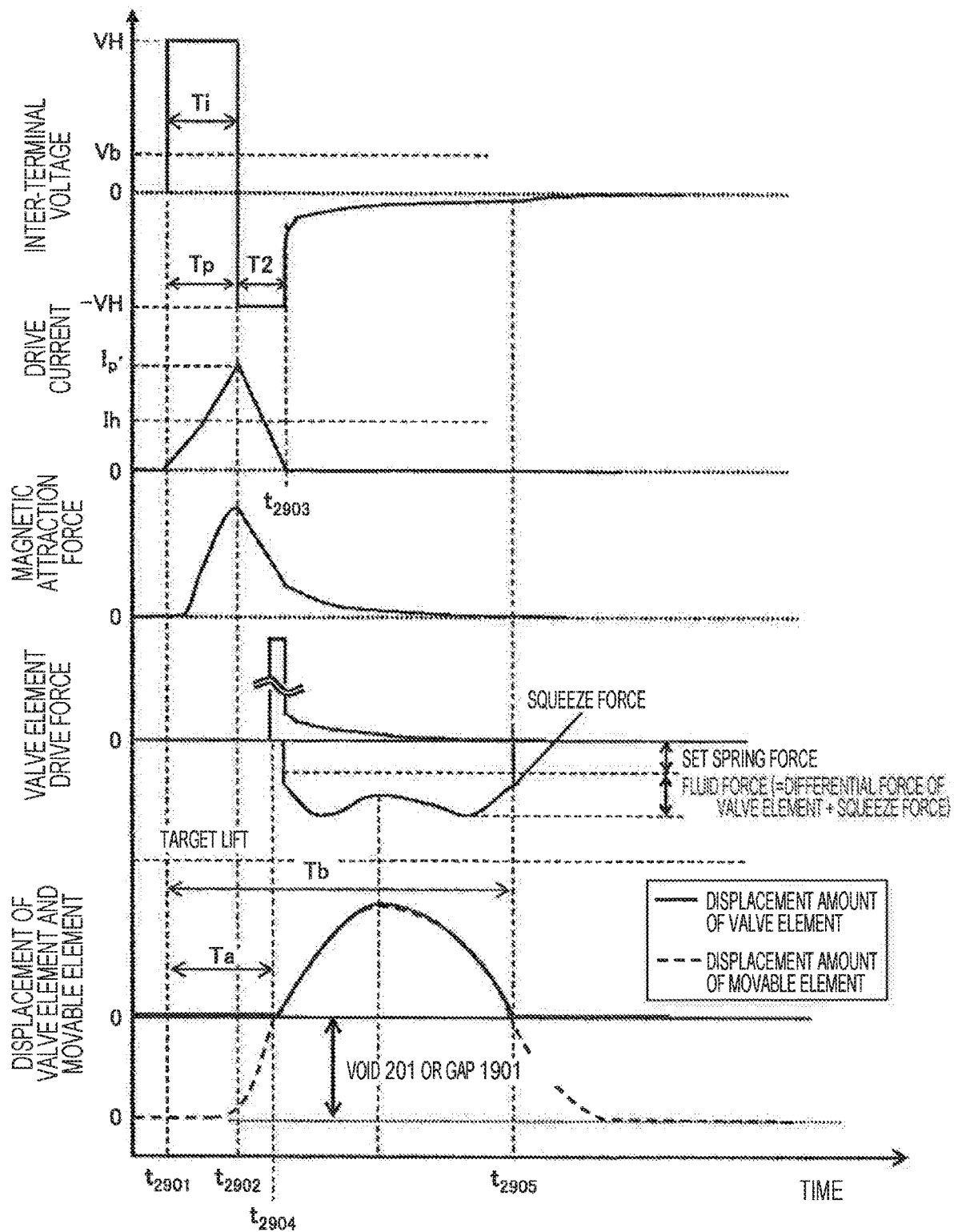
FIG. 27 is a graph illustrating a relation between the inter-terminal voltage Vinj, the drive current, the magnetic attraction force operated on the movable element or the second movable element, the valve element drive force operated on the valve element or the second valve element, the displacement amount of the valve element or the second valve element, the displacement amount of the movable element or the second movable element, and time when the fuel injection device is operated in the intermediate lift in a case where the fuel injection device is driven by the method of the third embodiment, in which a drive force in a valve opening direction is denoted as a positive direction and a drive force in a valve closing direction is denoted as a negative direction in the graph of the valve element drive force.
Figure 28:
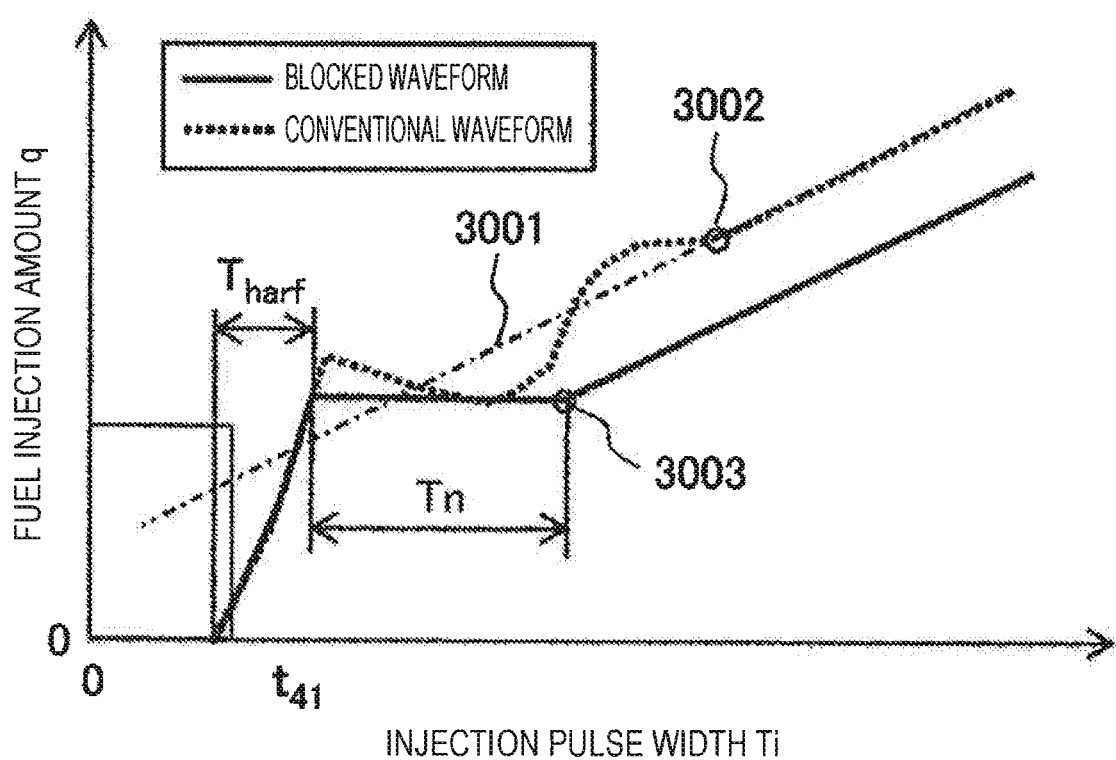
FIG. 28 is a graph illustrating a relation between the injection pulse width Ti and the fuel injection amount q in a case where a current waveform of a control method of FIGS. 27 to 29 of the third embodiment is used.

FIG. 25 is a graph illustrating a relation between the inter-terminal voltage Vinj of the fuel injection device 840 or the fuel injection device 2305, the drive current, the magnetic attraction force operated on the movable element 102 or the second movable element 1902, a valve element drive force operated on the valve element 114 or the second valve element 1907, the displacement amount of the valve element 114 or the second valve element 1907, the displacement amount of the movable element 102 or the second movable element 1902, and time, when the valve element 114 or the second valve element 1907 is used while being held at a target lift position in a predetermined period of time in a case where the fuel injection device 840 or the fuel injection device 2305 is driven by the method of the third embodiment. In addition, in the drawing of the valve element drive force, the drive force in the valve opening direction illustrates the positive direction, and the drive force in the valve closing direction illustrates the negative direction. In addition, the conventional current waveform which is generally used is depicted by the chain line in the drive current of the drawing. FIG. 26 is a graph illustrating a relation between the inter-terminal voltage Vinj, the drive current, the magnetic attraction force operated on the movable element 102 or the second movable element 1902, the valve element drive force operated on the valve element 114 or the second valve element 1907, the displacement amount of the valve element 114 or the second valve element 1907, the displacement amount of the movable element 102 or the second movable element 1902, and time in an operation state of a minimum injection amount in the middle of making the valve element 114 or the second valve element 1907 reach the target lift. In addition, in the drawing of the valve element drive force, the drive force in the valve opening direction illustrates the positive direction, and the drive force in the valve closing direction illustrates the negative direction. FIG. 27 is a graph illustrating a relation between the inter-terminal voltage Vinj, the drive current, the magnetic attraction force operated on the movable element 102 or the second movable element 1902, the valve element drive force operated on the valve element 114 or the second valve element 1907, the displacement amount of the valve element 114 or the second valve element 1907, the displacement amount of the movable element 102 or the second movable element 1902, and time when the fuel injection device is operated in the intermediate lift in which the injection amount less than the injection amount in the operation illustrated in FIG. 26 is realized. In addition, in the drawing of the valve element drive force, the drive force in the valve opening direction illustrates the positive direction, and the drive force in the valve closing direction illustrates the negative direction. FIG. 28 is a graph illustrating a relation between the injection pulse width Ti and the fuel injection amount q in a case where the current waveform of the control method of FIGS. 25 to 27 is used.

First, the operation in a case where the valve element 114 or the second valve element 1907 is used while being held at the target lift position will be described using FIG. 25. In FIG. 25, when the injection pulse width Ti is supplied at a time t2901, the switching elements 805 and 806 are energized, and a valve open signal is turned on, the boost voltage VH is applied to the solenoid 105. Accordingly, the current flowing in the solenoid 105 is slowly increased, and the magnetic attraction force operated on the movable element 102 or the second movable element 1902 is increased after a certain delay time passes as the eddy current generated in the magnetic circuit disappears. Since the magnetic attraction force is larger than a valve closing force operated on the movable element 102 or the second movable element 1902, the movable element 102 or the second movable element 1902 starts to move, and the movement slowly accelerates. In this case, in the fuel injection device 2305 of the second embodiment, the load of the set spring 110 in the valve closed state is operated on the second valve element 1907, and the second movable element 1902 is pressed in the valve closing direction by the load of the initial position spring 1909. Next, since the switching elements 805 and 806 are de-energized at a time 2902 when the current flowing in the solenoid 105 reaches the peak current value Ipeak, the application of the boost voltage VH is stopped, and at the same time, the boost voltage VH in the negative direction is applied. As a trigger of the operation performed at a timing t2902, there is a method of determining the boost voltage apply time Tp in advance or a method of setting a trigger at a timing after the current reaches the peak current Ipeak and a predetermined period of time passes besides a method of using a timing when the current reaches the peak current value Ipeak as described below. According to a circuit configuration, the boost voltage VH may vary. In addition, since there is a variation in the resistance value of the solenoid 105, wiring resistance, or inductance in the fuel injection device 840 or the fuel injection device 2305, the peak current value Ipeak varies in a case where the boost voltage apply time Tp is fixed. It is better to fix the peak current value Ipeak in order to give a stable valve opening force in consideration of the variation in the valve operation of the fuel injection device 840 or the fuel injection device 2305 of each cylinder at the time of the valve opening operation. On the other hand, the variation in time for asserting the valve opening force is effectively reduced by fixing the apply time Tp. In addition, in a method of stopping the application of the boost voltage VH after the current reaches the peak current value Ipeak and a predetermined period of time passes, a current blocking time can be controlled while achieving the effect of setting the peak current value Ipeak without depending on the setting resolution of the peak current Ipeak. Therefore, the current value can be adjusted with more accuracy, and the correction accuracy of the injection amount can be improved.

In addition, the movable element 102 or the second movable element 1907 comes into conflict with the valve element 114 or the second valve element 1907 at a timing t2702 when the movable element 102 or the movable element 1907 comes into conflict with the valve element 114 or the second valve element 1907, so that the valve element 114 or the second valve element 1907 receives the kinetic energy of the movable element 102 or the second movable element 1907 and an impulse generated when the movable element comes into conflict with the valve element, and the valve element 114 or the second valve element 1907 performs the valve opening operation. At this time, the energy applied to the solenoid 105 in a period 1701 is converted into the kinetic energy of the movable element 102 or the second movable element 1907. Thereafter, the valve element 114 or the second valve element 1907 reaches up to the target lift by the magnetic attraction force operated on the movable element 102 or the second movable element 1902, and the differential force (the fluid force) according to the displacement position is operated on the valve element 114 or the second valve element 1907 in the valve closing direction. When the valve element 114 or the second valve element 1907 reaches the target lift position, a reactive force may be generated when the movable element 102 or the second movable element 1902 comes into conflict with the fixed core 107. However, since the valve element 114 or the second valve element 1907 reaches the target lift at a holding current value lIh lower than the peak current value Ipeak while suppressing a valve open speed of the valve element 114 or the second valve element 1907 in the boost voltage blocked period T2, the reactive force is small, and the movable element 102 or the second movable element 1902 is not bounded with respect to the fixed core 107. In addition, according to the configuration of the fuel injection device 840, the load of the return spring 112 is operated in the valve opening direction to suppress the bounding of the movable element 102, so that the bounding of the movable element 102 likely to be generated by the conflict between the movable element 102 and the fixed core 107 can be effectively suppressed.

In addition, in a case where the current reaches 0 A during a period when the boost voltage VH in the negative direction is applied to the solenoid 105 after a time t2702, the change in the induced electromotive force generated by the change in the current is reduced. However, when the magnetic flux is left in the magnetic circuit at this point of time, the magnetic attraction force and the magnetic flux keep on disappearing, and the voltage generated by the induced electromotive force is applied to the solenoid 105 as the voltage in the negative direction as indicated by 2710. The magnetic attraction force operated on the movable element 102 or the second movable element 1902 is reduced at the same time that the current flowing in the solenoid 105 is reduced, and the kinetic energy of the valve element 114 or the second valve element 1907 is reduced. However, thereafter, the magnetic attraction force is changed to be increased again when the holding current value lh is supplied, and the valve element 114 or the second valve element 1907 reaches the target lift position.

In addition, once, after reaching the peak current value Ipeak, the current is rapidly blocked to be lowered to the holding current value lh or less (referred to as a blocked waveform), the magnetic attraction force at a time point when the valve element 114 or the second valve element 1907 reaches the target lift can be made small compared to the case of the conventional current waveform (denoted in the drive current of FIG. 25, referred to as a conventional waveform) shifting from the peak current value Ipeak to the holding current value lh. In addition, a conflict speed between the valve element 114 or the second valve element 1907 and the fixed core 107 can be reduced by making the magnetic attraction force small. Therefore, as illustrated in FIG. 28, in a case where the blocked waveform is used, the non-linearity occurring in the injection amount characteristic can be improved, a region where a relation between the injection pulse width Ti and the fuel injection amount q is linear can be expanded in a direction of a less injection amount compared to the conventional waveform, a controllable minimum injection amount in a case where the valve element 114 or the second valve element 1907 reaches the target lift can be reduced from the minimum injection amount 3002 of the conventional waveform to the minimum injection amount 3003 of the blocked waveform.

In addition, it is better to adjust the peak current value Ipeak, the boost voltage apply time Tp, a voltage blocking time T2 for each fuel injection device of each cylinder using the valve opening delay time until the valve element 114 or the second valve element 1907 reaches the target lift after the injection pulse Ti stored in each fuel injection device of each cylinder is supplied. For example, since the valve open speed is large in the individual device fast in a valve opening delay time, the boost voltage apply time Tp is set to be short, so that a time when the movable element 102 or the second movable element 1902 starts to decelerate occurs fast. On the other hand, the boost voltage apply time Tp is set to be long for the individual device delayed in a valve opening delay time, so that a time when the movable element 102 or the second movable element 1902 starts to decelerate occurs later.

In addition, in a case where the current blocked waveform is used, there is generated a period in which the same current waveform is supplied to the solenoid 105 of the fuel injection device 840 or the fuel injection device 2305 regardless of the size of the injection pulse width Ti when the injection pulse width Ti is turned off in a period of the boost voltage blocking time Tp. Therefore, there is generated a dead zone Tn where the fuel injection amount q is not changed even when the injection pulse width Ti is increased. In the injection amount characteristic of the blocked waveform illustrated in FIG. 28, the slope of the fuel injection amount q with respect to the injection pulse width Ti is different between an intermediate lift region Tharf where the valve element 114 does not reach the target lift and a region of the injection pulse width Ti from 3003 where the valve element 114 reaches the target lift and is driven, but the non-linearity occurring in the injection amount characteristic of the conventional waveform is improved, so that the relation between the injection pulse width and the fuel injection amount q is always in a positive relation, and the fuel injection amount q is also increased as the injection pulse width is increased. In order to simplify a control algorithm for the injection amount mounted on the CPU 801 of the drive device, there is a need to continuously increase the injection amount as an engine speed or the engine load is increased. Therefore, the fuel injection device 840 necessarily increases the fuel injection amount q as the injection pulse width Ti is increased. In such an engine, the fuel injection amount q required as the engine speed or the engine load is increased can be appropriately controlled by using the control method in the third embodiment, so that the injection amount is easily controlled. In addition, in a case where the conventional waveform is used, there is a need to conform the relation between the injection pulse width Ti and the fuel injection amount q by the drive device in a region where the deviation value between an ideal straight line 3001 (obtained from the injection amount in a region the relation between the injection pulse width and the injection amount is almost linear) and the fuel injection amount q varies in the positive and negative directions, and the injection amount characteristic is non-linear. Therefore, there is a need to detect and store the valve closed timing for each injection pulse width Ti as the valve close delay time in the drive device of the fuel injection device of each cylinder. On the other hand, in the control method using the blocked waveform in the third embodiment, since the relation between the injection pulse width Ti and the fuel injection amount q is in a positive correlation in a region after the valve reaches the intermediate lift region Tharf and the target lift, the deviation value can be calculated from the required injection amount based on the detection information of two points of the valve closed timing in each region where the valve reaches the intermediate lift region Tharf and the target lift, one point of the valve opened timing in the region where the valve reaches the target lift, and the detection information of the valve opening timing. A memory capacity necessary for storing the information of the calculation load and the individual device of the CPU 801 or the IC 802 which is necessary for detecting the valve operation can be reduced. The algorithm for correcting the individual variation in the injection amount given to the CPU 801 or the IC 802 can be simplified. In addition, in a case where there is a request for an injection amount less than the minimum injection amount 3003 which is controllable on a condition that the valve element 114 or the second valve element 1907 reaches the target lift, the dead zone Tn may be set in the drive device in advance for the fuel injection device 840 or the fuel injection device 2305 of each cylinder so as to use the injection pulse width Ti smaller than the period of the dead zone Tn.

Specifically, when the peak current value Ipeak, the boost voltage apply time Tp, or the voltage blocking time T2 is adjusted, the valve opening delay time Ta of each cylinder is stored in the drive device, and the parameter is adjusted in a feedback manner, so that the individual variation in the operation characteristics of the fuel injection device 840 or the fuel injection device 2305 and the change caused by the degradation can be handled to realize the stable operation. In the fuel injection device 840 or the fuel injection device 2305, the valve opened timing varies under the influence of the variation in the dimensional tolerance. In a case where the same blocked waveform is supplied to the solenoid 105 with respect to the individual device of which the valve opened timing is delayed or fast, the deceleration of the movable element 102 or the second movable element 1902 is not justly performed, the conflict speed between the movable element 102 or the second movable element 1902 and the fixed core 107 becomes large, and thus the non-linearity may occur in the injection amount characteristic even when the current is blocked at a boost voltage termination timing t2702 at which the peak current value Ipeak is blocked in the individual device having the fast valve opened timing. In addition, the switching elements 805 and 806 in the individual device having the delayed valve opened timing are set to be de-energized at the end timing of the boost voltage blocking time Tp. When the current flowing in the solenoid 105 is reduced, the magnetic attraction force operated on the movable element 102 or the second movable element 1902 required for the valve element 114 or the second valve element 1907 to reach the target lift is hardly secured, and thereby the valve element 114 or the valve element 1907 does not reach the target lift position. Therefore, the switching elements 805 and 806 are set to be de-energized at a stage when the displacement amount reaches a certain value after the valve element 114 or the second valve element 1907 starts to be opened for the fuel injection device 840 or the fuel injection device 2305 of each cylinder using the information of the valve opening delay time stored in the drive device, the boost voltage VH in the negative direction is applied to the solenoid 105, and the boost voltage apply time Tp and the voltage blocking time T2 may be adjusted such that the timing of starting the deceleration is equalized when viewed from the valve opened timing. In addition, the peak current value Ipeak is automatically changed by changing the boost voltage apply time Tp, but the boost voltage applying time Tp may be adjusted by changing the setting of the peak current value Ipeak for the fuel injection device 840 or the fuel injection device 2305. In a case where the peak current value Ipeak is adjusted for each individual device, the current flowing in the solenoid 105 caused by the variation in the voltage value of the boost voltage VH of the drive device and the resultant variation in the valve operation can be suppressed at a minimum level compared to a case where the boost voltage apply time Tp is adjusted, so that the deceleration timing for the fuel injection device 840 or the fuel injection device 2305 of each cylinder can be appropriately adjusted. Since the individual variation in the speed when the movable element 102 or the second movable element 1902 comes into conflict with the fixed core 107 can be reduced by appropriately adjusting the peak current value Ipeak and the drive voltage blocking time T2 for each fuel injection device of each cylinder, a driving sound at the time when the valve is opened by the conflict can be reduced so that the engine can be effectively damped. In addition, the impulse force operated on the conflict surface between the movable element 102 or the second movable element 1902 and the fixed core 107 can be made small by reducing the conflict speed between the movable element 102 or the second movable element 1902 and the fixed core 107, and the deformation and the abrasion of the conflict surface can be prevented, so that the change in the target lift amount caused by the degradation can be suppressed. In addition, according to the effect in this embodiment, since the conflict speed between the movable element 102 or the second movable element 1902 and the fixed core 107 is reduced regardless of the individual device of the fuel injection device of each cylinder so as to be kept constant, the hardness of the material required for preventing the deformation and the abrasion of the conflict surface can be reduced. Further, since the end surface of the movable element 102 or the second movable element 1902 on a side near the fixed core 107 and the end surface of the fixed core 107 on a side near the movable element 102 are not necessarily subjected to the plating process, the cost can be significantly reduced. Since the plating process is not performed, it is possible to suppress the variation in the flow rate per unit time in accordance with the individual variation in the target lift generated due to the individual variation in a plating thickness and the variation in a squeeze force in accordance with the variation in a fluid gap between the movable element 102 and the fixed core 107 in the valve opened state. Therefore, the accuracy of the injection amount can be increased.

In addition, when the valve element 114 or the second valve element 1907 reaches the target lift, the movable element 102 or the second movable element 1902 comes in contact with the fixed core 107, and the valve element 114 or the second valve element 1907 are stopped at the target lift position, the fuel injected from the fuel injection device 840 or the fuel injection device 2305 becomes a certain flow rate, and the injection amount is increased in proportion to the increase of the injection pulse width Ti, so that the injection amount can be controlled with accuracy.

In addition, the value of the dead zone Tn of the injection amount characteristic generated when the current blocked waveform is used is changed for each fuel injection device of each cylinder by correcting any one of the peak current value Ipeak and the boost voltage apply time Tp, and the voltage blocking time T2 to equalize the injection amount in the fuel injection device of each cylinder. When any one of the peak current value Ipeak and the boost voltage apply time Tp, and the voltage blocking time T2 and determined using the detection information, the dead zone Tn is determined. Therefore, with the configuration of the CPU 801 or the IC 802 in which the dead zone Tn can be set differently for the fuel injection device 840 or the fuel injection device 2305 of each cylinder, it is possible to control the injection amount to continuously changed from the intermediate lift region Tharf where the injection pulse width Ti is small and the valve element 114 does not reach the target lift up to the injection amount since the minimum injection amount 3003 after the valve element reaches the target lift. Accordingly, the injection amount can be controlled in accordance with the operation condition of the engine.

In the valve closing operation, the boost voltage VH in the negative direction is applied to the solenoid 105 by de-energizing the switching elements 807 and 806 at a time t2704 when the injection pulse width Ti as a valve open signal time is stopped, and the current flowing in the solenoid 105 is rapidly reduced so that the magnetic attraction force is. The operation in the valve closing direction of the valve element 114 or the second valve element 1907 starts at a time t2705 when the magnetic attraction force is less than the force in the valve closing direction, and is ended at a time t2706. In this case, in the fuel injection device 2305, the load of the set spring 110 is continuously operated in the valve closing direction of the valve element drive force of the second valve element 1907 after the second valve element 1907 is completely closed. The force in the valve closing direction of the valve element drive force before the valve opening and after the valve closed illustrated in FIG. 25 indicates the valve element drive force in a case where the fuel injection device 2305 is used. In addition, the valve-closed delay time Tb until the valve closed timing of the valve element 114 or the second valve element 1907 after the injection pulse width Ti is turned on is detected and stored by the drive device. In a case where there is a deviation in a delay time of a target setting value, the setting value of the holding current value Ih at the target lift position may be increased or decreased so as to be matched with a reference delay time. Otherwise, in a case where the individual variation in the valve-closed delay time is corrected after the drive current and the drive voltage in the fuel injection device of each cylinder are corrected, the injection pulse width Ti is corrected. When the valve-closed delay time is large, the injection pulse width Ti is set to be small in proportion to that time, and when the valve-closed delay time is small, the injection pulse width Ti is set to be large in proportion to that time. The actual injection period (Tb−Ta') when the valve element 114 or the second valve element 1907 is opened can be controlled to be the actual injection period required for realizing the requested injection amount, and the correction accuracy of the injection amount can be increased.

The operation state at the time when a minimum injection amount is performed during a period when the valve element 114 or the second valve element 1907 reaches the target lift according to the operation sequence of this method is illustrated in FIG. 26. The valve open signal (that is, the injection pulse) is turned on at a time t2801, the switching elements 805 and 806 are energized, the boost voltage VH is applied from the second voltage source to the solenoid 105, and the magnetic attraction force is generated in the movable element 102 or the second movable element 1902. Thereafter, the energizing of the switching elements 805 and 806 is stopped at a time point of reaching the peak current Ipeak or a time point of reaching the boost voltage apply time Tp, so that the application of the boost voltage VH is stopped, the boost voltage VH in the negative direction is applied, the current flowing in the solenoid 105 is rapidly reduced, and the magnetic attraction force operated on the movable element 102 or the second movable element 1902 is reduced. After the setting time of the voltage blocking time T2 for blocking the voltage in the driving direction (that is, the voltage in the positive direction), the switching elements 806 and 807 are energized, the injection pulse width Ti as the valve open signal time is turned on at a timing when the voltage is applied from the battery voltage VB to the solenoid 105, and the valve element 114 or the second valve element 1907 reached the target lift position before and after the injection pulse width is turned on is shifted to the operation in the valve closing direction after the timing when the magnetic attraction force is lower than the force in the valve closing direction of the valve element drive force, and the valve closing operation is performed without stopping at the target lift position. In the operation of the minimum injection amount in the full lift, when the injection pulse width Ti is increased, a time that the valve element 114 is stopped at the target lift position is necessarily lengthened in proportion to the increased width. In other words, ideally, the stopping time at the target lift position is extremely near 0 second at the time of the minimum injection amount. Therefore, in a case where the valve open signal time (that is, the injection pulse width Ti) is increased, the time that the valve element is stopped at the position of the target lift is lengthened by the increased time, and the valve closed timing is increased according to the increase of the stopping time to increase the injection amount, so that it is better to control the injection pulse width Ti and the fuel injection amount q in a linear relation.

In addition, when the fuel pressure supplied to the fuel injection device 840 or the fuel injection device 2305 is changed, the peak current value Ipeak required for the valve element 114 or the second valve element 1907 to reach the target lift, and the holding current value lh capable of keeping the valve element 114 or the second valve element 1907 in the valve opened state are changed. When the fuel pressure is increased, a force obtained by multiplying a pressure-receiving area of the seat diameter and the fuel pressure is operated on the valve element 114 or the second valve element 1907 in a state where the valve element 114 or the second valve element 1907 is closed. Therefore, the kinetic energy of the movable element 102 or the movable element 1902 required for the valve element 114 or the second valve element 1907 to start the opening is changed. In addition, when the valve element 114 or the second valve element 1907 starts to be displaced by the conflict of the movable element 102 or the movable element 1907 with the valve element 114 or the second valve element 1907, the fluid speed of the fuel flowing in a fuel seat portion of the valve element 114 or the second valve element 1907 becomes fast. The pressure of the fuel flowing in the vicinity of the seat portion is steeply reduced under the influence of a pressure drop (a decrease in hydrostatic pressure) based on Bernoulli's theorem. A pressure difference between the portion of the valve element 114 or the second valve element 1907 on a side near the pipe and the tip becomes large, and the differential force operated on the valve element 114 or the second valve element 1907 is increased. The peak current value Ipeak, the voltage blocking time T2, and the holding current value lh may be adjusted according to the increase of the differential force. In a case where a constant holding current value lh of the drive current is used on a condition that the fuel pressure is distributed in a wide range where the load of the engine is different, the holding current value lh is necessarily set to be a value as high as possible to generate the magnetic attraction force operated on the movable element 102 or the second movable element 1902, so that the valve element 114 or the second valve element 1907 can be kept in the valve opened state at a high fuel pressure. In a case where the valve element 114 or the second valve element 1907 is driven using a high holding current value lh on a condition of reaching the target lift at a low fuel pressure, the magnetic attraction force generated in the movable element 102 or the second movable element 1902 becomes large at the time when the injection pulse width Ti is stopped, the valve close delay time is increased, and the injection amount is also increased. Therefore, as a configuration of sending a command signal from the ECU 120 to the drive circuit 121, the holding current value lh may be appropriately set according to the fuel pressure using a signal detected by the ECU through the pressure sensor attached to the fuel pipe on the upstream side of the fuel injection device 840 or the fuel injection device 2305.

In addition, similarly to the change in the fuel pressure, the individual variation in the fuel injection device 840 and the fuel injection device 2305 of each cylinder and the holding current value Ih required for keeping the valve element 114 or the second valve element 1907 in the valve opened state are also changed by the variation in the load of the spring 110. In the individual device having a large load of the spring 110, the magnetic attraction force required for keeping the valve element 114 or the second valve element 1907 in the valve opened state becomes large, so that the holding current value Ih is necessarily set to be large. The load of the spring 110 is adjusted in process of adjusting the injection amount of the fuel injection device 840 or the fuel injection device 2305. Therefore, since the valve opening delay time, the valve close delay time, and the load of the spring 110 are strongly correlated to each other, the load of the spring 110 can be estimated from the valve open/close delay time. The information of the load of the spring 110 estimated for each cylinder is stored in the drive device. The bounding between the movable element 102 or the second movable element 1902 and the fixed core can be suppressed by suppressing a timing when the movable element 102 or the second movable element 1907 decelerate, the peak current value Ipeak, or the boost voltage apply time Tp and the voltage blocking time T2 for the fuel injection device 840 or the fuel injection device 2305 of each cylinder based on the information of the load of the spring 110 and the valve opening delay time. Therefore, the continuity in the injection amount characteristic from the intermediate lift to the full lift can be secured, so that the control of the injection amount becomes ease.

It is effective that the current waveform is adjusted according to the fuel pressure in addition to the adjustment of the peak current value Ipeak for reducing the individual variation in the fuel injection device 804 and the fuel injection device 2305 of each cylinder, the boost voltage applying time Tp, and the voltage blocking time T2. When the fuel pressure is increased, the differential force due to the fuel pressure operated on the second valve element 1907 is increased. Therefore, the timing when the second valve element 1907 decelerates after the peak current value Ipeak is blocked also occurs fast, and the bounding of the second valve element 1907 generated by the conflict between the second movable element 1902 and the fixed core 107 after the second valve element 1907 reaches the target lift position becomes less. Therefore, the conflict speed between the second movable element 1902 and the fixed core 107 can also be reduced by increasing the peak current value Ipeak according to the increases of the fuel pressure while securing the peak current value Ipeak required for the second valve element 1907 to reach the target lift, the non-linearity of the injection amount characteristic can be reduced, and the variation in the injection amount can be reduced. In addition, when the peak current value Ipeak is increased, a timing of de-energizing the switching elements (that is, a timing when the application of the boost voltage VH is stopped) is delayed, and a timing when the voltage blocking time T2 starts is also delayed in conjunction. The voltage blocking time T2 may be configured to be decreased according to the increase of the fuel pressure. With such a configuration, when the differential force operated on the valve element 114 or the second valve element 1907 is increased according to the increase of the fuel pressure, the conflict speed between the movable element 102 or the second movable element 1902 and the fixed core 107 is reduced, and the timing required for the deceleration is also delayed. Therefore, it is possible to appropriately set a deceleration timing. Since the differential force operated on the fuel pressure and the valve element 114 or the second valve element 1907 is in a linear relation, the correction coefficients for determining the peak current value Ipeak or the boost voltage applying time Tp and the holding current value Ih may be given to the ECU or the drive circuit in advance according to the fuel pressure. In addition, the use amount of the current can be reduced by adjusting the peak current value Ipeak and the holding current value Ih described above for the fuel injection device 840 or the fuel injection device 2305 of each cylinder and for the fuel pressure supplied to the fuel injection device 840 or the fuel injection device 2305. Therefore, the heating in the solenoid 105 of the fuel injection device 840 or the fuel injection device 2305 and the heating in the ECU can be reduced, and the energy consumption can be effectively reduced. In addition, since a time of applying the boost voltage VH is reduced, the load of the booster circuit can be reduced, and the boost voltage VH at a time point when the next injection pulse width at the time of the division injection is requested can be kept constant, so that the injection amount can be controlled with accuracy.

Next, an operation of using a region where the valve element 114 does not reach the target lift (referred to as intermediate lift region) according to a control method of the second embodiment is illustrated in FIG. 27. In this operation, the injection amount is reduced by lowering a reference setting value of the peak current value Ipeak according to a reduced injection amount in order to realize an injection amount less than a minimum injection amount in a case where the valve element reaches the target lift. In other words, the injection pulse width Ti as the valve open signal time, the setting value of the peak current value Ipeak for determining a time of applying the boost voltage, and the setting value of the boost voltage apply time Tp may be changed in order to realize an injection amount less than the injection amount of the operation illustrated in FIG. 26. As illustrated in FIG. 26, the application of the boost voltage VH is stopped at a time t2902 when the current flowing in the solenoid 105 reaches Ip' by setting a setting value Ip' smaller than the reference peak current value Ipeak. With this configuration, the boost voltage VH in the negative direction is applied to the solenoid 105, and the current flowing in the solenoid 105 is rapidly reduced, so that the magnetic attraction force is reduced. In this case, when the movable element 102 or the second movable element 1902 comes into conflict with the valve element 114 or the second valve element 1907 in the region where the valve element 114 injecting a small amount of the fuel is less displaced, the valve element 114 or the second valve element 1907 starts to be opened by the impulse and the kinetic energy applied to the valve element 114 or the second valve element 1907. Therefore, it is better to stop the voltage application to the solenoid 105 in the positive direction before a time t2904 when the valve element 114 starts to be opened. The stopping of the voltage in the positive direction may be controlled by the setting value Ip' or the boost voltage apply time Tp until the switching element 805 and the switching element 806 are de-energized to apply the boost voltage VH in the negative direction to the solenoid 105 after the injection pulse is turned on and the switching element 805 and the switching element 806 are energized to apply the boost voltage VH to the solenoid 105. Using the boost voltage apply time Tp or the setting value Ip', the kinetic energy generated in the movable element 102 can be controlled at a timing before the valve element 114 starts to be opened, and the displacement amount of the valve element 114 can be controlled. In addition, since the valve element 114 does not reach the target lift in the operation of the intermediate lift, the displacement amount of the valve element 114 is not restricted by a mechanism, and the individual variation in the injection amount easily occurs according to a slight change in the fuel pressure. Therefore, a time when the first-order derivative of the voltage VL4 is minimized after the injection pulse is turned on or a valve closed timing t2905 at which the second-order derivative of the voltage VL is minimized is detected for each fuel injection device of each cylinder, and stored in the drive device. The ECU 120 or the EDU 121 checks whether the stored time or the stored valve closed timing is matched to the valve closed timing or the injection period for realizing the requested injection amount. When the stored time or the stored valve closed timing is separated from the target value, the accuracy in an actual injection amount with respect to the requested injection amount can be increased by increasing or decreasing the setting value Ip' of the peak current at the time of the next injection. Similarly, in the case of the method of setting the boost voltage apply time Tp, a valve closed timing t2904 is detected by the drive device, and the accuracy in the actual injection amount with respect to the request injection amount can be increased by adjusting the boost voltage apply time Tp to be matched to the valve closed timing or the injection period for realizing the requested injection amount.

Fourth Embodiment

A control method of correcting the injection amount in a fourth embodiment according to the invention will be described using FIGS. 29 to 31.

Figure 29:
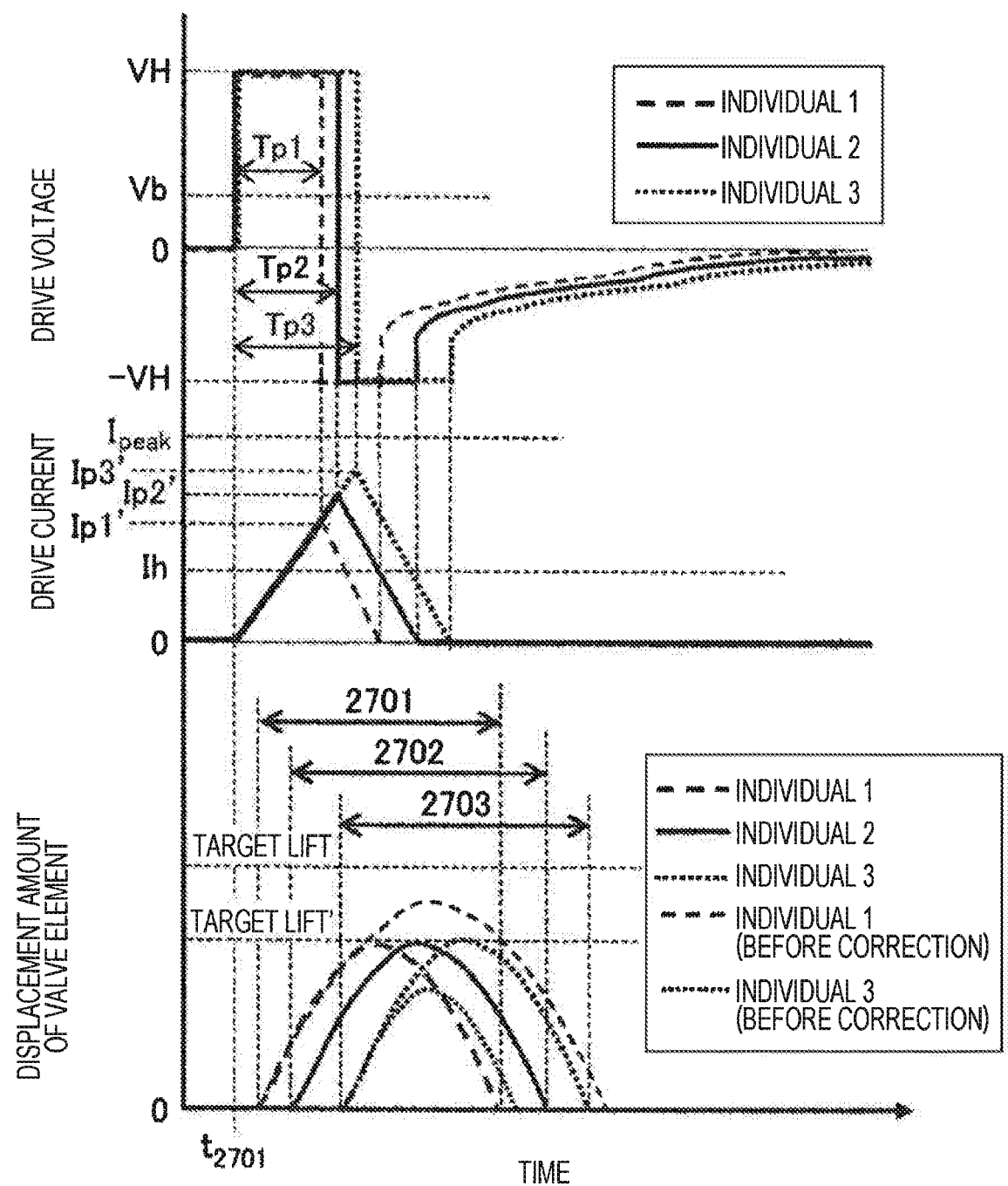
FIG. 29 is a graph illustrating a relation between the drive voltages, the drive currents, the displacement amounts of the valve elements of the individual devices, and time, in which the injection pulses, the drive voltages, and the drive currents are corrected in order to match injection periods (Tb−Ta') of the individual devices in which the valve opening timing Ta' and the valve closed timing Tb of the valve element or the second valve element are different on a condition that the same injection pulse width Ti is supplied.

FIG. 29 is a graph illustrating a relation between the drive voltages, the drive currents, the displacement amounts of the valve elements of the individual devices, and time, as a result of a correction in which the injection pulses, the drive voltages, and the drive currents are corrected in order to match injection periods (Tb−Ta') with respect to the individual devices in which the valve opening timing Ta' and the valve closed timing Tb of the valve element 114 or the second valve element 1907 are different on a condition that the same injection pulse width Ti is supplied by the individual devices 1, 2, and 3 of the fuel injection device of each cylinder. In addition, in the displacement amount of the valve element of FIG. 29, the displacement amounts of the valve elements of the individual devices 1 and 3 in a case where the injection pulse width, the drive voltage, and the drive current which are the same as those of the individual device 2 are plotted.

As described in FIG. 6 of the first embodiment, even when the same injection pulse width is supplied, the timing of the valve operation (that is, the valve opening timing Ta' and the valve closed timing Tb of the valve element 114 or the second valve element 1907) is different in the fuel injection device of each cylinder under the influence of the variation in the dimensional tolerance, and the actual injection period (Tb−Ta') for injecting the fuel after the valve element 1907 is separated from the valve seat 118 varies in each individual device, thereby causing the individual variation in the injection amount. In the control method in the third embodiment, the description will be made about a method of controlling the fuel injection in which the individual variation in the injection amount is suppressed using the detection information of the valve opening timing, the valve opened timing, and the valve closed timing stored in the drive device described in the first and second embodiments. A correction method of the individual variation in the injection amount in a case where the injection amount is a minimum injection amount at a certain fuel pressure will be described using FIG. 25. In the individual device 1 (before correction) having the fast valve opening timing Ta', when the injection pulse width, the drive voltage, and the drive current which are the same as those of the individual device 2 are supplied, a maximum value of the displacement amount of the valve element at a timing when the current supply is stopped becomes large compared to the individual device 2. Therefore, the valve closed timing Tb is delayed, and as a result, the injection period becomes long compared to the individual device 2, and the injection amount is also increased. In addition, in the individual device 1 (before correction) having the delayed valve opening timing Ta', when the injection pulse width, the drive voltage, and the drive current which are the same as those of the individual device 2 are supplied, the displacement amount of the valve element at a timing when the current supply is stopped becomes small compared to the individual device 2. Therefore, the valve closed timing Tb becomes fast, and as a result, the injection period becomes short compared to the individual device 2, and the injection amount is also decreased. In the individual device 1 (before correction) having a long injection period, the above parameter may be corrected to be matched with the injection period 2702 of the individual device 2 by shortening the injection pulse Ti, shortening a period of applying the boost voltage VH to be Tp1, or decreasing the peak current value Ipeak of the drive current to be Ip1'. On the other hand, in the individual device 3 (before correction) having a short injection period, the above parameter may be corrected to be matched with the injection period 2702 of the individual device 2 by lengthening the injection pulse Ti, lengthening a period of applying the boost voltage VH to be Tp3, or increasing the peak current value Ipeak of the drive current to be Ip3'. In a case where the injection period is corrected using the peak currents Ip1', Ip2', and Ip3' of the drive current, the variation in the displacement amount of the valve element 114 or the second valve element 1907 can be suppressed at a minimum even in a case where the change in resistance and the variation in the voltage value of the boost voltage VH occur in accordance with the change in temperature of the solenoid 105, and it is possible to suppress an unexpected variation in the injection period in accordance with an environmental change. In addition, in a case where the injection period is corrected using the boost voltage apply times Tp1, Tp2, and Tp3, it is possible to make the time resolution small compared to a method of using the peak current of the drive current, so that the correction accuracy of the injection period is effectively increased. This is because the setting resolution of the peak current value depends on the resistance value of the resistor 808 or 812 for detecting the current value. The setting resolution of the peak current value is improved as the resistance value is set to be small, but when the current value is too small, the detection in the IC 802 becomes difficult. In addition, the stop timing of the drive voltage for adjusting the injection period may be set to occur after a predetermined time passes from the target current value. With this effect, it is possible to suppress the unexpected variation in the injection period even in a case where the resistor of the solenoid 105 is changed, and the time resolution of the stop timing of the drive voltage can be improved. Therefore, the correction accuracy of the injection period and the correction accuracy of the individual variation in the injection amount can be increased.

Next, a control method of the injection amount after the injection period in the minimum injection amount is adjusted will be described using FIGS. 30 and 31. FIG. 30 is a graph illustrating a method of adjusting the injection amount after the injection period in the minimum injection amount is adjusted. In addition, FIG. 31 is a graph illustrating a relation between the injection pulse and the injection amount after the injection period in the minimum injection amount is adjusted.

Figure 30:
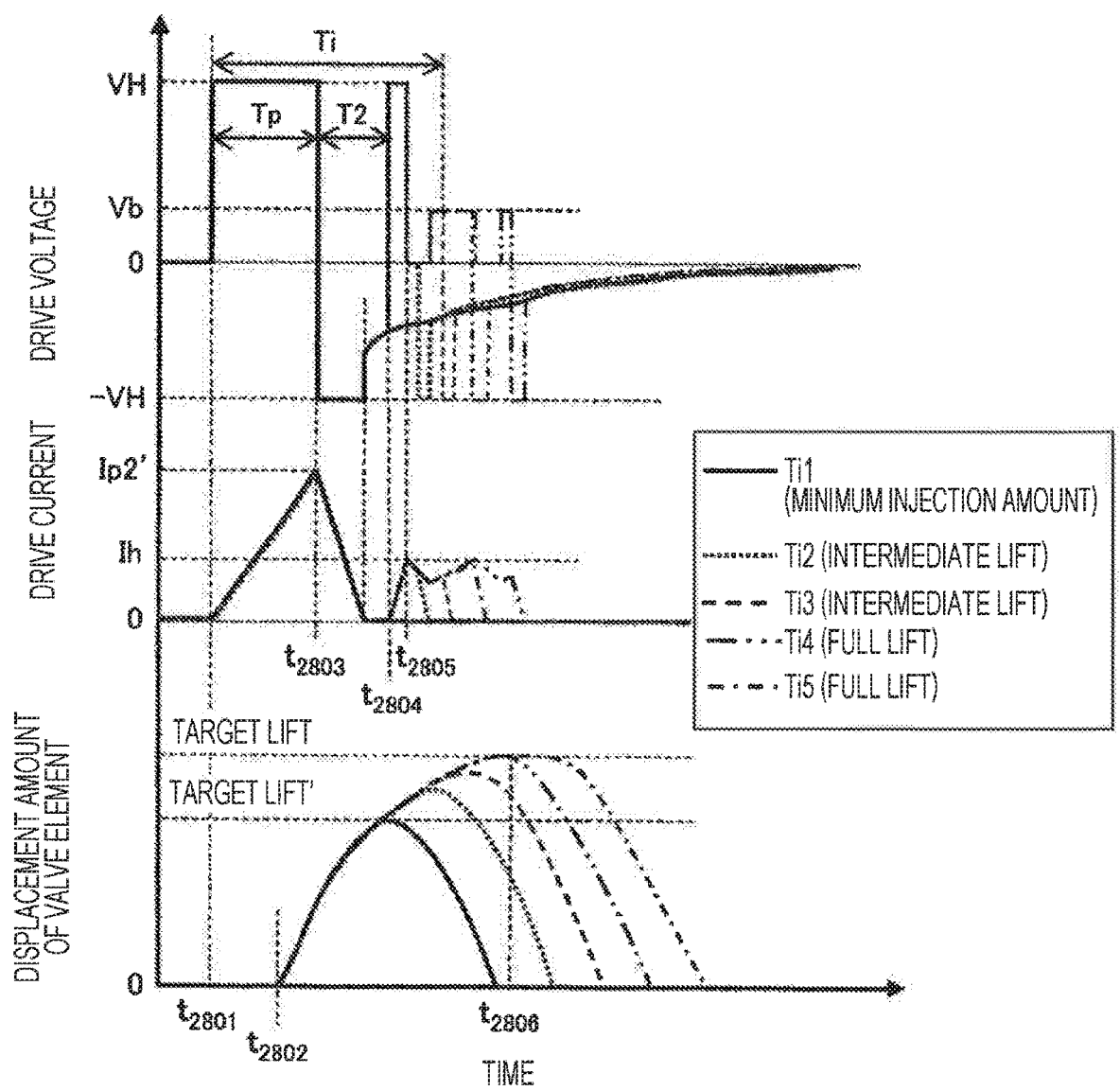
FIG. 30 is a graph illustrating a method of adjusting an injection amount after the injection period is adjusted at a minimum injection amount in a fourth embodiment.

In FIG. 30, the fuel injection device 840 or the fuel injection device 2305 of each cylinder is adjusted in order to match Tp in the minimum injection amount with the injection period as described above. Thereafter, in order to control the injection amount in the intermediate lift, the switching elements 805 and 806 are energized after a T2 end timing t2804, and the boost voltage VH is applied to the solenoid 105 until the holding current Ih flows. Thereafter, the energizing time of the injection pulse Ti is increased to make the valve element 114 or the second valve element 1907 reached at the target lift position to come in contact with the fixed core 107. In a case where the change amount of the valve closed timing caused by the increase of the injection pulse Ti is different for the individual device in the fuel injection device 840 or the fuel injection device 2305 of each cylinder after Ti2 and Ti3 when the intermediate lift operation is performed after the injection pulse width Ti1 in the minimum injection amount, a holding current value Ih2 is set to be large for the individual device having a small change amount of the valve closed timing so as to increase the magnetic attraction force, so that a learning control is performed to match the injection period. On the other hand, the learning control may be performed to match the injection period such that the holding current value Ih1 is set to be small for the individual device having a large change amount of the valve closed timing so as to decrease the magnetic attraction force. In this way, the valve element can stably reach the target lift by adjusting the current value of the holding current Ih for the individual device of each cylinder, and the correction accuracy of the injection amount can be increased.

Figure 31:
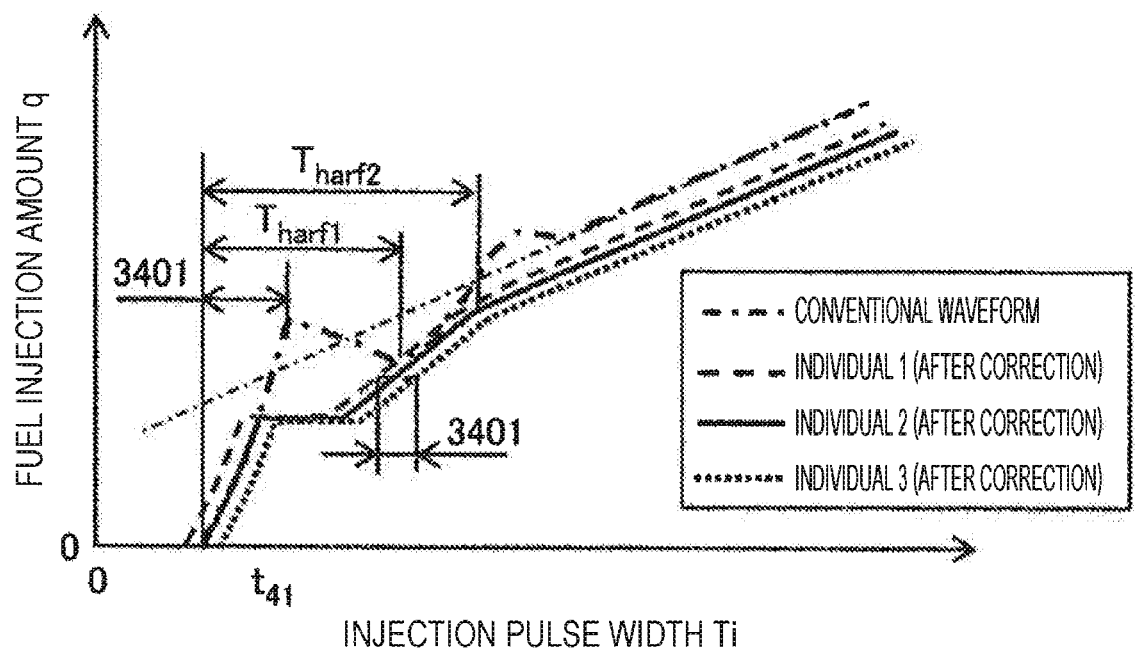
FIG. 31 is a graph illustrating a relation between the injection pulse and the injection amount after the injection period is adjusted at the minimum injection amount in the fourth embodiment.

In the injection amount characteristic illustrated in FIG. 31, the injection pulse width Ti and the slope of the fuel injection amount in a section Tharf2 become small compared to the injection pulse width Ti and the slope of the injection amount in a section 3401 of the conventional waveform in the intermediate lift region by controlling the displacement amount of the valve element 114 or the second valve element 1907 using the method described above, and the intermediate lift region until the valve element reaches the target lift is expended from Tharf1 to Tharf2. In the section 3401 corresponding to the intermediate lift of the conventional waveform, the injection amount is largely changed with respect to the change in the injection pulse width. Therefore, when the control of the minute injection amount is performed, the time resolution of the injection pulse width Ti or the boost voltage apply time Tp should be finely set, and the drive device having a high clock frequency of the CPU 801 should be used, thereby causing a cost-up of the drive device. In addition, since the fuel injection amount is non-linear with respect to the injection pulse width Ti between the section 3401 of the intermediate lift and a target lift region, there is a need to detect the information of the injection period in the injection pulse width Ti at each point in order to control the injection amount. Therefore, the storage capacity of the drive device may be insufficient, and the injection amount after the section 3401 is ended may be significantly changed by the change in the environmental condition, and thus it is difficult to increase the correction accuracy of the injection amount and robustness. According to the control method in the third embodiment, a difference between the injection pulse width Ti and the slope of the fuel injection amount q in the intermediate lift region and the injection pulse width Ti and the slope of the fuel injection amount q after reaching the target lift can be made small compared to the control method used in the conventional waveform. In addition, since the relation between the injection pulse width Ti and the fuel injection amount q after the target lift from the intermediate lift region is linear, there is a merit on that the injection amount is easily corrected and controlled. As described above, when the drive voltage and the current waveform are adjusted by the fuel injection device 840 or the fuel injection device 2305 of each cylinder, the injection amount characteristic becomes a characteristic shifted in parallel in a direction of the injection pulse width Ti, and a deviation 3401 of the parallel shift occurs in a certain fuel injection device. However, since the injection period for determining the fuel injection amount q can be detected for each cylinder, the individual variation in the injection amount can be corrected and controlled by correcting the deviation 3401 of the parallel shift for each cylinder using the injection pulse width Ti. In addition, in a case where the relation between the injection pulse width and the fuel injection amount in the intermediate lift region becomes a first-order approximation, a slope and an intercept of the correction equation can be derived when there are two pieces of information of the injection period for detecting the slope. In addition, in the target lift region, since the fuel injection amount q is linearly increased as the injection pulse width Ti is increased, the relation between the injection pulse width Ti and the fuel injection amount q can be approximated by a function of the first-order approximation, and the slope and the intercept of the function can be derived from the two pieces of information of the injection period. In addition, the injection pulse width Ti of the switching from the intermediate lift to the target lift can be calculated as a point where the fuel injection amounts q of the first-order function in the intermediate lift and the first-order function in the full lift are overlapped, and may be configured to perform the switching between the correction equation of the injection amount in the intermediate lift region and the correction equation of the injection amount after the target lift.

Fifth Embodiment

A fifth embodiment in the invention is an embodiment illustrating an example in which the fuel injection devices and the control methods described in the first to fourth embodiments are mounted in the engine.

Figure 32:
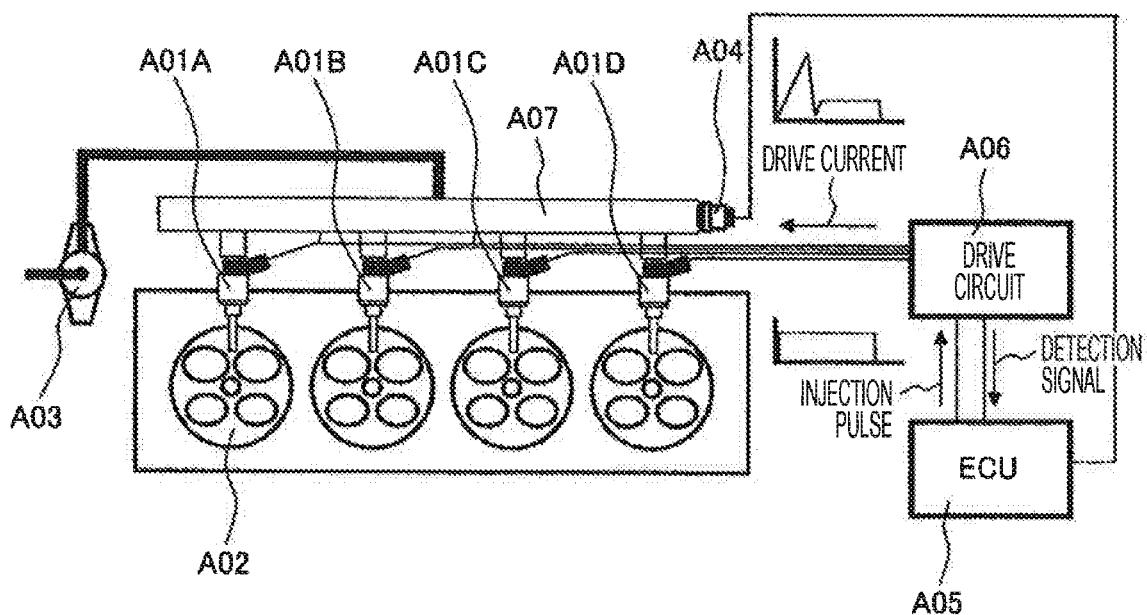
FIG. 32 is a diagram illustrating a configuration of a gasoline engine of a cylinder direct injection type in a fifth embodiment.

FIG. 32 is a diagram illustrating a configuration of a gasoline engine of a cylinder direct injection type, in which fuel injection devices A01A to A01D are provided to directly inject the fuel spray from the fuel injection hole to a combustion chamber A02. The fuel is increased in pressure by a fuel pump A03 and fed to a fuel pipe A07, and delivered to the fuel injection device A01. The fuel pressure varies according to a balance between the fuel amount discharged by the fuel pump A03 and the fuel amount injected into each combustion chamber by the fuel injection device provided in each cylinder of the engine, but the discharge amount from the fuel pump A03 is controlled to be a predetermined pressure as the target value based on the information of a pressure sensor A04.

The injection of the fuel is controlled according to the injection pulse width sent from an engine control unit (ECU) A05, the injection pulse is input to a drive circuit A06 of the fuel injection device, the drive circuit A06 determines a drive current waveform based on a command from the ECU A05, and the drive current waveform is supplied to the fuel injection device A01 by a time based on the injection pulse.

Further, the drive circuit A06 may be mounted as an integrated component with the ECU A05 or as a substrate.

The ECU A05 and the drive circuit A06 have a function of changing the drive current waveform according to the fuel pressure and the operation condition.

The description will be made about a method of suppressing a vibration in the engine by controlling the engine with ease, reducing the fuel consumption and the exhaust gas, or reducing the variation in the fuel pressure between the cylinders in a case where the ECU A05 has a function of detecting the opening and closing of the fuel injection device A01 as described in the first to seventh embodiments.

In the ECU A05 used in the engine illustrated in FIG. 32, the injection pulse width of the fuel injection device A01 is corrected such that the fuel amounts injected from the fuel injection devices A01A to A01D approach the value requested by the ECU A05. In other words, in a multicylinder engine, a drive pulse different in width corrected for each cylinder is given to each fuel injection device.

For example, the fuel injection device which injects much fuel when the same pulse width is commanded is driven by giving a short pulse width, and the fuel injection device which injects less fuel when the same pulse width is given is driven by a long pulse width. The variation in the fuel injection amount between cylinders can be suppressed by performing such a correction as an operation mode performed on each cylinder.

Furthermore, in the ECU A05 illustrated in FIG. 32, the drive current supplied to the fuel injection devices A01A to A01D of each cylinder is supplied as a waveform adjusted for each fuel injection device.

Each current waveform is set to attenuate a rebounding behavior of each of the fuel injection devices A01A to A01D at the time of the valve is opened. As a result, the pulse width can be set widely so that the relation between the injection pulse width and the injection amount approaches a linear relation.

For example, in order to attenuate the rebounding behavior at the time when the valve is opened, a time of supplying the boost voltage VH from the boosting voltage source to the solenoid 105 in the drive waveform or the peak current value Ipeak is adjusted in accordance with the valve open timing of the fuel injection device of each cylinder by controlling the energizing/de-energizing of the switching elements 805, 806, and 807, and the energizing from the boosting voltage source is stopped while the valve is opened so as to decelerate the valve. For example, the fuel injection device which is opened early at the time when a certain current waveform is given is configured such that a stopping timing of the energizing from the boosting voltage source is set to occur fast, and the fuel injection device 840 or the fuel injection device 2305 which is opened slowly is configured such that the stopping timing of the energizing from the boosting voltage source is set to be delayed. In this way, with the use of the drive waveform which is set to decelerate the valve opening operation by stopping the energizing from the boosting voltage source, the change in the injection amount can be set small with respect to the change in the injection pulse width Ti in the region of the minute injection amount, and the injection amount is also effectively corrected by the injection pulse width Ti.

In this way, the current waveform suitable to the fuel injection device of each cylinder can be given by giving the drive current waveform for decelerating the valve element 114 in accordance with the variation in the valve opened timing of the fuel injection device 840 or 2305 of the cylinder. It is possible to increase a range where the relation between the injection pulse and the injection amount is linear.

In addition, an energizing current value (the holding current value) for holding the valve opened state in the drive waveform may be adjusted according to a valve close timing of each fuel injection device. In a case where the valve close timing obtained when the fuel injection device is driven by a certain drive current waveform is delayed, the holding current value is set to be small. In a case where the valve close timing occurs fast, the holding current value is set to be relatively large. In this way, when the holding current value is set in accordance with the state of the fuel injection device in the drive current waveform, it is possible to prevent that an excessive current value is given. Since the excessive current value is not given, a response delay time of the valve closing operation at the time when the injection pulse width is small can be made small, and the range of the injection amount where the relation between the injection pulse width and the injection amount becomes linear can be expanded toward the small one.

In addition, since the individual variation in the injection amount of the fuel injection device 840 or the fuel injection device 2305 of each cylinder is suppressed in the intermediate lift operation, it is effective to use a method of controlling the boost voltage apply time Tp or the peak current value Ipeak such that the actual injection period (TB−Ta') is matched based on the information of the valve opening timing Ta' and the valve opened timing Tb detected by the drive device for each individual device. In this case, the minimum injection amount in the intermediate lift operation is determined by the kinetic energy accumulated in the movable element 102 or the movable element 1902 by the current supplied to the solenoid 105 at the boost voltage apply time Tp (that is, a time of energizing the switching elements 805 and 806). Thereafter, the voltage blocking time T2 for decelerating the movable element is provided, the voltage blocking time T2 and the holding current value lh are determined based on the information of the valve opened timing Ta and the valve closed timing Tb stored in the drive device, the valve closed timing Tb and the displacement amount of the valve element 114 or the valve element 1907 are controlled to be large as the injection pulse is increased until the valve element 114 or the valve element 1907 reaches the target lift. In addition, the speed of the valve element 114 or the valve element 1907 is decelerated at the time when the valve element 114 or the valve element 1907 reaches the target lift by adjusting the voltage blocking time T2 and the holding current value lh based on the detection information, so that the bounding of the movable element 102 or the movable element 1902 generated when the movable element 102 or the movable element 1902 comes into conflict with the fixed core 107 can be reduced. Therefore, the injection amount after the timing when the valve element reaches the target lift from the region of the intermediate lift becomes a positive correlation, and the injection amount can be continuously controlled by reducing the injection pulse width T.

In this way, in the engine in which the drive current waveform and the drive pulse width Ti are adjusted and given by the ECU with respect to each fuel injection device, there is a need to give the drive current waveform and the drive pulse according to the manufacturing variation and the state of each fuel injection device. Therefore, the ECU 05A reads the valve opening timing, the valve opened timing, and the valve closed timing as the state of each fuel injection device.

In a case where the valve opening timing, the valve opened timing, and the valve closed timing of the fuel injection device are read, it is better to operate each fuel injection device by the drive current waveform with which the valve closed timing is easily detected. However, in the drive current waveform with which the detection is easily performed, the linear relation between the injection pulse width and the injection amount may not be secured in wide range.

Therefore, it is better to provide the function of setting the drive current waveform for reading the state of the fuel injection device in the ECU 05A. For example, in a situation where the injection amount is not necessarily minimized in the middle of warming the air after the starting of the engine, the valve opening timing, the valve opened timing, and the valve closed timing of the fuel injection device of each connected cylinder are detected and stored in the memory in the ECU 05A using the drive current waveform for reading the behavior of the valve element 114. Alternatively, on a condition that the division injection is performed to dividedly inject the fuel in a stroke of intake/exhaust, it is effective to inject the fuel on a condition that the valve element 114 or the valve element 1907 is reached to the target lift and the intermediate lift operation is performed, and to acquire plural times the detection information of the valve opening timing and the valve closed timing required for correcting the individual variation in the injection amount of the fuel injection device of each cylinder in the intermediate lift operation.

The ECU 05A can control a very small amount of fuel to be injected by adjusting the drive current waveform and the drive pulse width given to each cylinder based on the information stored in the drive device.

In this way, the drive waveform for reading the state of the fuel injection device is set, and the state of the fuel injection device is stored in a specific operation state of the engine, so that the injection amount can be corrected, and the controllable minimum injection amount can be reduced. In addition, in such a learning method, the state of a secular degradation of the fuel injection device can also be monitored, so that even when the operation of the fuel injection device is changed due to the secular degradation, a minimum value of the controllable injection amount can be made small.

Further, as a specific operation state of the engine, a state in which the load can be adjusted by a command from the ECU 05A without an accelerating operation of a driver and the injection amount is not significantly small (such as an idling state, a state between processes of the engine starting, or several cycles of the stroke of intake/exhaust after an engine key-off state other than the warming of the air after the start of the engine) is specifically an available period.

In this way, even in a case where the valve opening timing, the valve opened timing, and the valve close timing of the fuel injection device are stored in the memory in the ECU and the correction of the injection pulse width Ti and the drive current waveform is performed for each fuel injection device of each cylinder, it is better to detect the timing of the valve operation at every injection again and to reflect the timing on a command value of the pulse width from the ECU. In particular, the valve closed timing can be detected without using a dedicated detection waveform. Therefore, in a case where the detection of the valve closed timing of the valve closing operation is performed by detecting the inter-terminal voltage of the solenoid 105 of the fuel injection device and the voltage difference between the terminal of the solenoid 105 on a side near the ground potential (GND) and the ground potential, the valve closed timing can be detected at every fuel injection. Since the detection result is fed back to the injection pulse width at the time of the next injection, the control accuracy of the fuel injection amount can be more improved, so that the change in the operation of the fuel injection device caused by the temperature or the vibration of the engine can be corrected.

In this way, the internal combustion engine can be used by controlling the injection amount at a smaller amount level. As a result, the fuel injection can be performed by controlling the injection amount at a smaller amount level. For example, it is possible to make combustion at the time of a low load such as a state of recovery from a fuel cut such as an idle stop, and the engine is operated efficiently and easily. In addition, since the A/F ratio approaches the target value, gases such as HC and NOX containing in the exhaust gas can be suppressed. Furthermore, since the fuel injection amount is made small, the fuel injected in one stroke of the engine can be dividedly injected plural times in a low load region. As a result, the penetrating force of the fuel spray is attenuated, and the control of forming the air-fuel mixture is easily performed, so that it is suppressed that the fuel is attached to the wall of the combustion chamber. Further, since the uniformity of the air-fuel mixture becomes even, a region where the fuel is dense can be reduced. Therefore, the discharge amount of tin which is a part of the PM (particulate matter) and the PN (the concentration of particles of the PM) can be reduced.

Sixth Embodiment

Next, a configuration and an operation of a fuel injection device in a sixth embodiment, and another method of detecting the valve opening timing as a factor of the individual variation in the injection amount will be described using FIGS. 33 and 34. Further, the same components as those in FIG. 1 will be denoted by the same symbols in FIG. 33.

First, the configuration and a basic operation of the fuel injection device in the sixth embodiment will be described using FIG. 33. FIG. 33 is a vertical cross-sectional view illustrating the configuration of the fuel injection device. The fuel injection device illustrated in FIG. 33 is a normally closed magnetic valve (a magnetic fuel injection device), and a valve element 3614 is biased toward the valve seat 118 by the spring 110 (a first spring), and tightly abuts on the valve seat 118 to form a sealed state when the solenoid 105 is not energized. In the valve closed state, a movable element 3602 is biased toward the fixed core 107 (the valve opening direction) by a zero-position spring 3612 (a second spring), and tightly abuts on a regulation member 3614a which is provided in the end portion on a side near the fixed core of the valve element 3614. In this state, there is generated a gap between the movable element 3602 and the fixed core 107. A rod guide 3613 which guides a rod portion 31614b of the valve element 3614 is fixed to a nozzle holder 3601 which forms the housing. The valve element 3614 and the movable element 3602 are configured to be relatively displaced, and are contained in the nozzle holder 3601. In addition, the rod guide 3613 is configured to form a spring seat of the zero-position spring 3612. The force of the spring 110 is adjusted at the time of assembly by a pushing amount of a spring retainer 3624 which is fixed into the internal diameter of the fixed core 107. Further, a biasing force of the zero-position spring 3612 is set to be smaller than that of the spring 110.

The fuel injection device includes the magnetic circuit which is configured by the fixed core 107, the movable element 3602, and a housing 3603, and has a void between the movable element 3602 and the fixed core 107. A magnetic throttling member 3611 is formed in a portion corresponding to a void between the movable element 3602 of the nozzle holder 3601 and a fixed core 3606. The solenoid 105 is provided on the outer peripheral side of the nozzle holder 101 while being wound on the bobbin 104.

The rod guide 115 is provided in the vicinity of the end portion on a side opposed to the regulation member 114a of the valve element 114 so as to be fixed to the nozzle holder 101. The rod guide 115 may be configured as an integrated component with the orifice cup 116. The valve element 114 is guided to move in the valve axis direction by two rod guides of the first rod guide 113 and the second rod guide 115.

The valve seat 118 and a fuel injection hole 119 are formed in the orifice cup 116 which is fixed to a tip of the nozzle holder 101, and the inner space (fuel passage) where the movable element 3602 and the valve element 3614 are provided is sealed from the outside.

The fuel is supplied from the upper portion of the fuel injection device, and sealed by a seal portion and the valve seat 118 formed in the end portion on a side opposed to the regulation member 3614a of the valve element 3614. At the time when the valve is closed, the valve element is pushed in the close direction by a force according to the internal diameter of the seat at the valve seat position caused by the fuel pressure.

When the current flows to the solenoid 105, the magnetic flux is generated between the movable element 3602 and the fixed core 107, and the magnetic attraction force is generated. When the magnetic attraction force operated on the movable element 3602 exceeds the sum of the load of the spring 110 and the force of the fuel pressure, the movable element 3602 moves upward. At this time, the movable element 3602 moves upward together with the valve element 3614 in a state of being engaged with the regulation member 3614a of the valve element 3614, and keeps on moving until the upper end surface of the movable element 3602 comes into conflict with the lower surface of the fixed core 107. At this time, when the current supply to the solenoid 105 is stopped before the valve element 3614 reaches the target lift after the valve element 3614 starts to be displaced, the intermediate lift operation is performed.

As a result, the valve element 3614 is separated from the valve seat 118, and the supplied fuel is injected from a plurality of fuel injection holes 119.

When the energizing to the solenoid 105 is stopped, the magnetic flux generated in the magnetic circuit disappears, and the magnetic attraction force also disappears. When the magnetic attraction force operated on the movable element 3602 disappears, the valve element 3614 is forced back to the close position so as to come in contact with the valve seat 118 by the load of the spring 110 and the force of the fuel pressure.

In a state where the valve element 3614 is stopped at the target lift position (that is, the valve opened state), a projection of a collision portion is provided in any one of the movable element 3602 and the fixed core 107 in the annular end surface between the movable element 3602 and the fixed core 107. In addition, in the valve opened state, with the configuration of the projection, a void is formed between the end surface between the movable element 3602 and the fixed core 107 except the projection, and one or more fuel passages are provided so that the fuel can flow in the outer diameter direction and the inner diameter direction of the projection in the valve opened state. In the operation of forcing the valve element 3614 back to the close position, the movable element 3602 moves together with the regulation member 114a of the valve element 114 in an engaged state.

In the fuel injection device of this embodiment, the valve element 114 and the movable element 3602 are relatively displaced in a very short time at the moment when the movable element 3602 comes into conflict with the fixed core 107 when the valve is opened, and at the moment when the valve element 3614 comes in conflict with the valve seat 118 when the valve is closed, so that the bounding with respect to the fixed core 107 of the movable element 3602 and the bounding with respect to the valve seat 118 of the valve element 114 are effectively suppressed.

Further, with the above configuration, the spring 110 biases the valve element 114 in a direction opposed to the drive force by the magnetic attraction force, and the zero-position spring 112 biases the movable element 3602 in a direction opposed to the biasing force of the spring 110.

Figure 33:
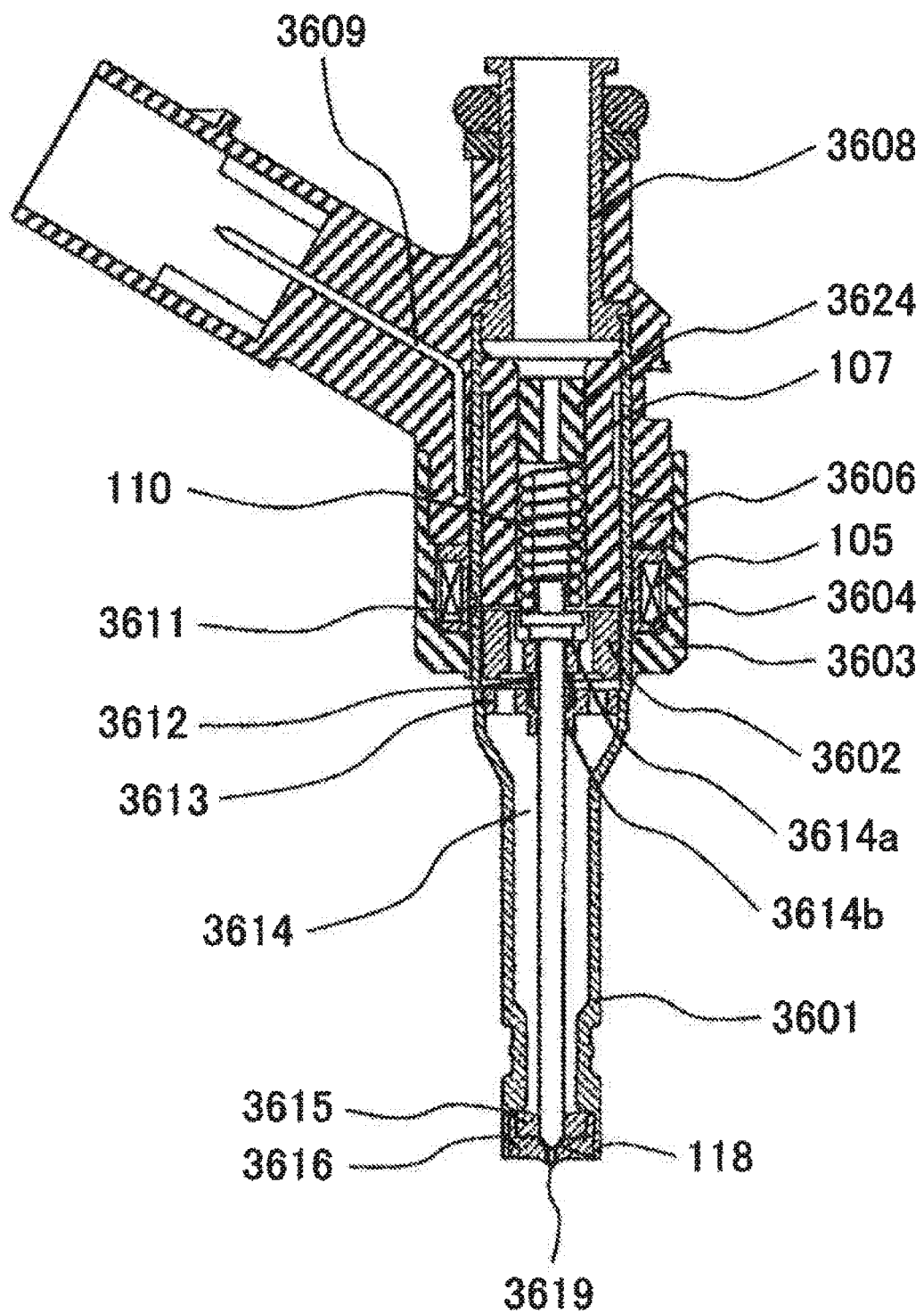
FIG. 33 is a vertical cross-sectional view illustrating a configuration of a fuel injection device of a sixth embodiment.
Figure 34:
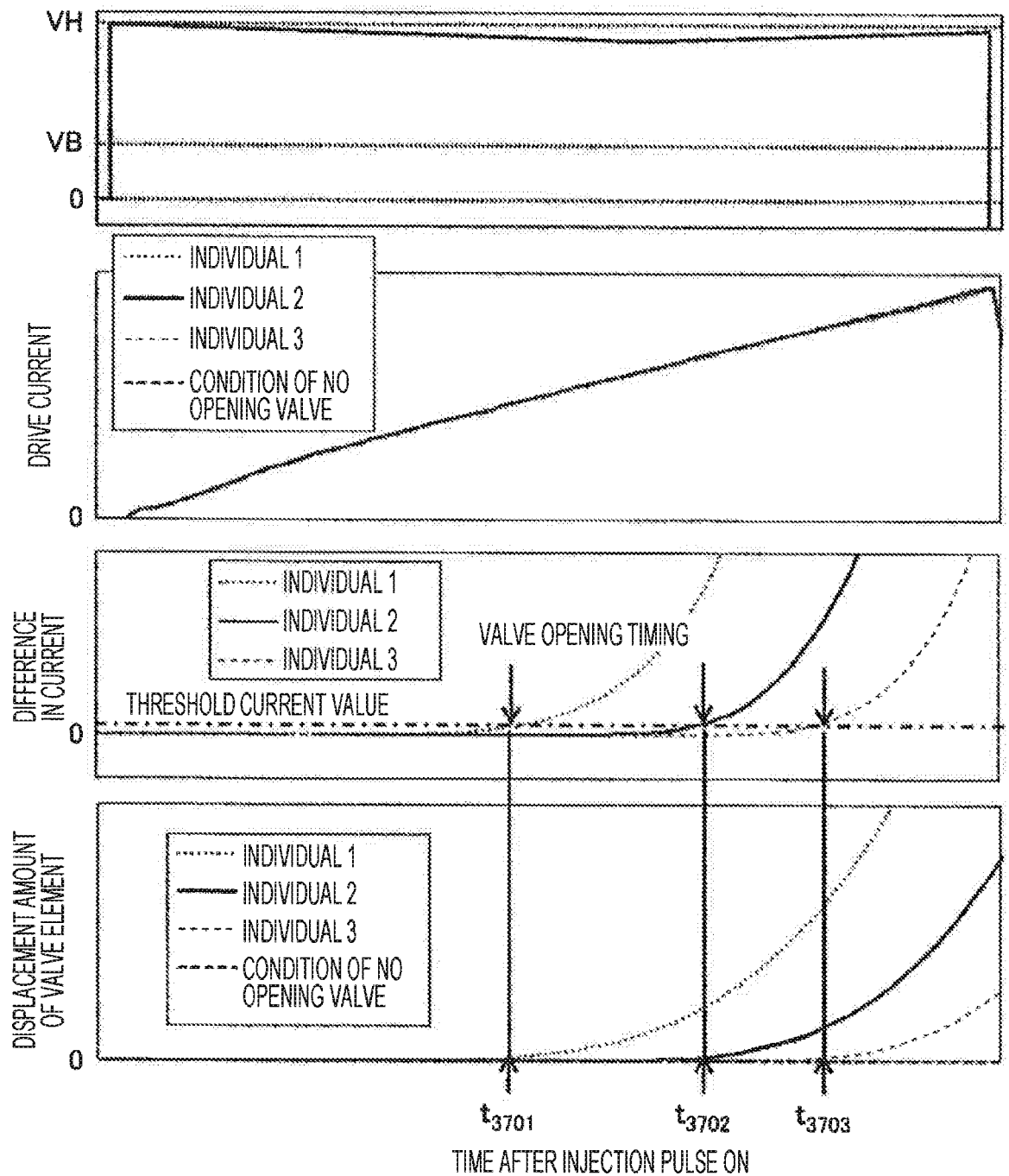
FIG. 34 is a graph illustrating a relation between the inter-terminal voltage of the solenoid, the drive current supplied to the solenoid, a difference between a current value on a condition that the valve element is not opened and a current value of the individual device, the displacement amount of the valve element, and time after the injection pulse is turned on in a case where the fuel injection device of the sixth embodiment is used.

Next, a method of detecting the valve opening timing in a case where the fuel injection device of FIG. 33 is used will be described using FIG. 34. FIG. 34 is a graph illustrating a relation between the inter-terminal voltage Vinj of the solenoid 105, the drive current supplied to the solenoid 105, a difference between a current value on a condition that the valve element is not opened and a current value of the individual device, the displacement amount of the valve element, and time after the injection pulse is turned on. Further, in the drawing of the drive current and the displacement amount of the valve element, the profiles of the individual devices 1, 2, and 3 different in the valve opening timing and the profile on a condition that the valve element does not start to be opened are illustrated. In FIGS. 33 and 34, since the magnetic flux of the attraction plane enters almost the saturated state on a condition that the boost voltage VH is applied and the valve element starts to be opened by the high current, the change in the induced electromotive force is small as the valve element 3614 starts to be opened. As a result, the change in the drive current is also small. In addition, in the fuel injection device of FIG. 33, since the valve element smoothly starts to be opened at a stage where the force in the valve opening direction is larger than the valve closing direction from the state where the movable element 3602 is stopped, the change in the acceleration at the valve opening timing is small. Therefore, even in a case where the valve opening timing is changed, the change in the drive current is small. In such a configuration of the fuel injection device, the drive current on a condition that a valve element 3714 does not start to be opened is stored in the CPU 801 or the IC 802, and a difference between the stored drive current and the drive current of the fuel injection device of each cylinder on a condition that the valve element 3714 starts to be opened is calculated or the two current components are compared, so that it is possible to detect a small change in the drive current as the valve element starts to be opened. At this time, since the change in the current difference as the valve element 3714 starts to be opened is also smoothly increased, a certain threshold is set to the current difference, and a timing of exceeding the threshold is detected as the valve opening timing, so that the valve-opening-start delay time until the valve opening timing after the injection pulse is turned on may be stored in the CPU 801 or the IC 802. Further, the drive current (hereinafter, a reference current) on a condition that the valve element 3714 does not start to be opened may be acquired on a condition that the fuel pressure supplied to the fuel injection device is high and the differential force operated on the valve element 3714 is large, and may be detected for each fuel injection device of each cylinder. The profile of the drive current flowing in the solenoid 105 is affected by the resistance value of the solenoid 105 and the individual variation such as inductance of the magnetic circuit. Therefore, since the drive current on a condition that the valve element does not start to be opened is stored for each fuel injection device of each cylinder, the valve opening timing can be detected with high accuracy based on a difference with respect to the drive current of each fuel injection device, and the correction accuracy of the injection amount can be increased. In addition, in a case where the capacity of the memory mounted in the CPU 801 and the IC 802 is small, the available memory area is restricted, so that the stored reference current and the stored drive current may be erased at a stage where the detection of the valve opening timing of a certain cylinder is ended in order to store the reference current and the drive current for detecting the valve opening timing of the fuel injection device of the next cylinder. Therefore, the memory capacity of the CPU 801 and the IC 802 can be reduced, and the sampling rate of a sequence of the stored data can be made finely, so that the detection accuracy of the valve opening timing can be increased. In addition, according to the method in the sixth embodiment, the valve element 3614 can be controlled to reach the target lift using a large drive current, so that it is effectively applied to a case where the fuel injection device is operated on a condition that the fuel pressure is high.

In addition, when the valve element 3614 is in the valve closed state where the valve element 3614 comes in contact with the valve seat 118, the differential force obtained by multiplying the seat area and the fuel pressure is operated on the valve element 3614. Therefore, since the differential force operated on the valve element 3614 is also increased when the fuel pressure is increased, the valve opening timing of the valve element 3614 is delayed. Since the differential force can be calculated by multiplying the seat area and the fuel pressure, the relation between the fuel pressure and the valve opening timing is almost in the linear relation. On a condition that the fuel pressure is different, two or more valve opening timings can be stored in the CPU 801 and the IC 802 and the relation between the fuel pressure and the valve opening timing is defined as a function, since the valve opening timing and the valve opening timing in a case where the fuel pressure is changed can be calculated for each fuel injection device of each cylinder by the ECU 120. The injection period where the valve element 3614 is displaced can be obtained on the condition of the intermediate lift based on the information of the valve opening timing or the valve-opening-start delay time and the information of the valve closed timing, and the injection amount in the intermediate lift can be controlled by controlling the drive current in order to match the injection period. Therefore, the minute injection amount can be controlled.

Seventh Embodiment

Figure 35:
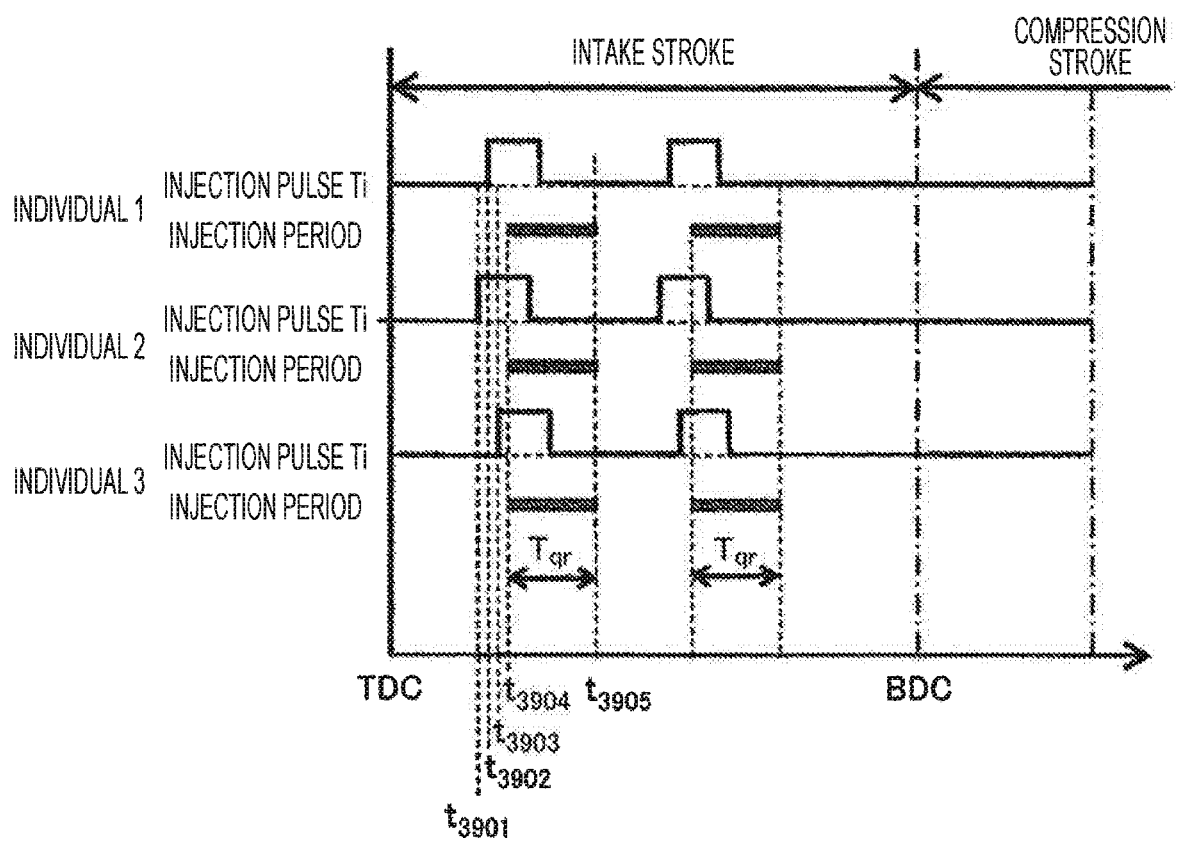
FIG. 35 is a diagram for describing a method of correcting a timing of the fuel injection.

Next, a method of correcting the injection timing of the fuel in a seventh embodiment will be described using FIG. 35. Further, the method of the seventh embodiment is a method of controlling the injection timing which can be combined to the methods of controlling the injection amount described in the first to fourth embodiments. Further, the vertical axis of FIG. 35 indicates timing from a top dead center (TDC) to a bottom dead center (BDC) of the piston of the engine during a period from an intake stroke to a compression stroke. In addition, FIG. 35 is a graph illustrating a relation between the injection pulse and an injection period Tqr when the fuel is injected in a case where the injection timing is controlled based on the information of the valve-opening-start delay time of each individual device detected by the ECU in a case where the division injection is performed two times in the individual devices 1, 2, and 3 in which the valve opening timing Ta' is different. In FIG. 35, the uniformity of the air-fuel mixture may be improved by making the injection fuel and the air flow smoothly, and the fuel may be injected in the intake stroke in a period shifting from the TDC to the BDC from the viewpoint of the reduction of the piston attachment. In the individual device in which the valve opening timing Ta' is different, when the injection pulse Ti is input to the drive circuit at the same timing with respect to the TDC, the timing of the injection start of the fuel varies for the individual device, the distribution of the uniformity of the air-fuel mixture varies, and an injection start timing is delayed. Therefore, the amount of the fuel attached to the piston is increased, thereby increasing the non-combusted particles containing tin. A variation factor until the air-fuel mixture is formed after the fuel is injected and mixed with the air is suppressed by matching the timing of injecting the fuel for each cylinder, so that it is possible to suppress the variation in the uniformity of the air-fuel mixture of each cylinder, and the exhaust performance and the fuel efficiency can be improved. The valve-opening-start delay time varies as the valve opening timing Ta' of each of the individual devices 1, 2, and 3 varies. However, the individual device 2 having a long valve-opening-start delay time outputs the injection pulse Ti at a timing t3901 with respect to the individual device 1 having a standard valve-opening-start delay time, and the individual device 2 having a short valve-opening-start delay time outputs the injection pulse Ti at a timing t3903, so that an injection start timing t3904 of the fuel can be matched for the individual device. In particular, in the division injection in which the fuel injection is performed plural times in a stroke of intake/exhaust, a time of driving the valve element 114 and the valve element 1907 after reaching the target lift position becomes short compared to the one-time injection. Therefore, a transitional behavior of the valve element 114 and the valve element 1907 in the intermediate lift becomes a dominant factor for determining the fuel injection amount. In addition, in the division injection, the deviation in the injection start timing for each cylinder occurs as many as the number of division injections, and the amount of the fuel attached to the wall is increased as the injection timing varies. Therefore, a region of the fuel rich in the air-fuel mixture occurs, the non-combusted particles containing tin are increased, and the exhaust performance may be degraded.

According to the method in this embodiment, the uniformity of the air-fuel mixture of each cylinder can be made to approach the same state by adjusting the injection start timing for supplying the injection pulse width Ti for each cylinder, and the non-combusted particles can be suppressed, so that the exhaust performance can be improved. Furthermore, since the setting of the drive current and the width of the injection pulse Ti are corrected for each cylinder using the control method of the first, third, and fourth embodiments, the injection period Tqr in the fuel injection can be matched. Through the method described above, the injection start timing and the injection end timing t3904 can be matched for the individual device (each cylinder), so that the variation in the air-fuel mixture of the cylinder can be suppressed, and the PN and the PM containing in the exhaust gas can be significantly suppressed.

Eighth Embodiment

Figure 36:
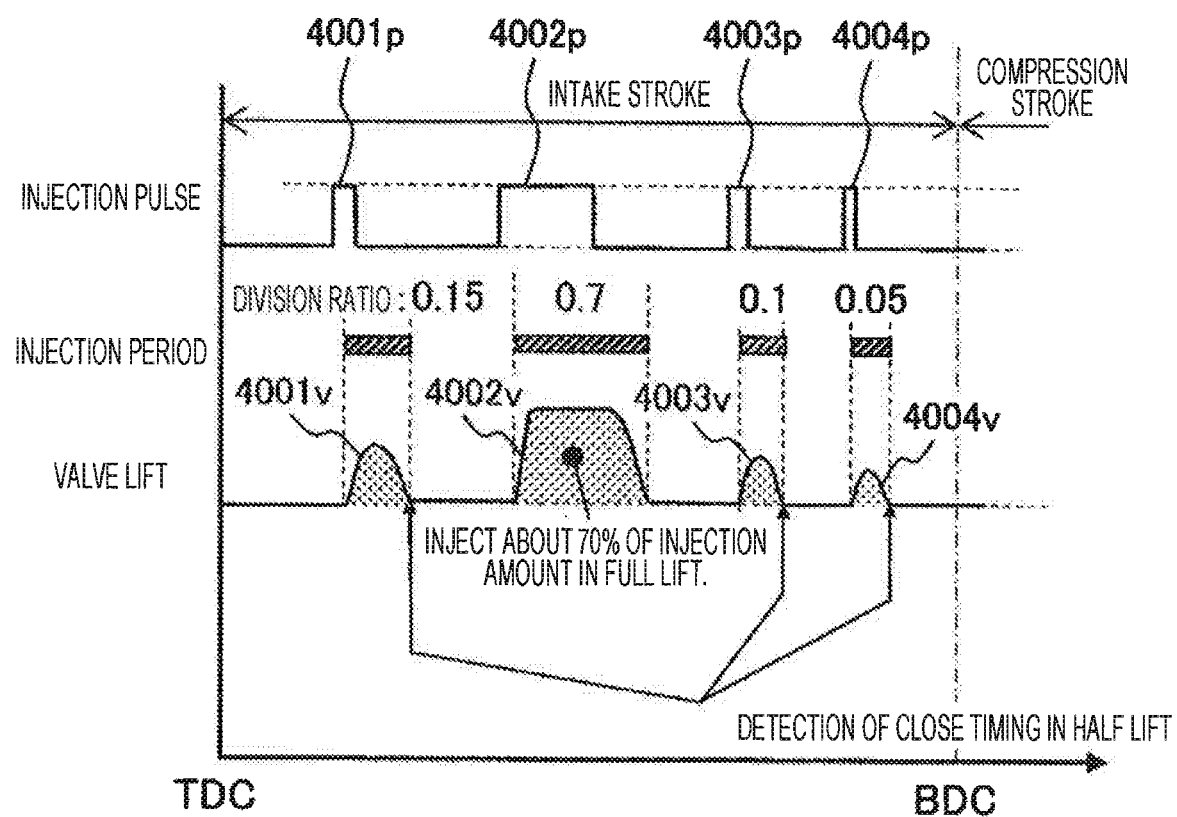
FIG. 36 is a graph illustrating a relation between the injection pulse, the injection period, and a valve lift in a case where the fuel is injected plural times in one combustion cycle.
Figure 37:
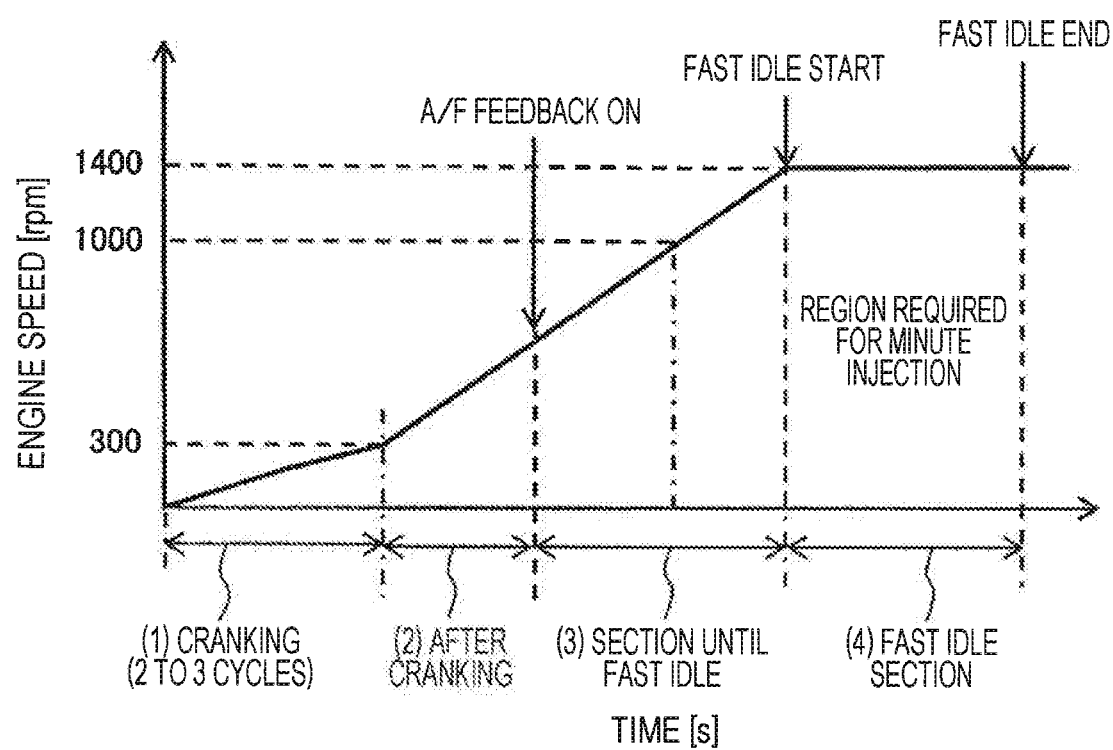
FIG. 37 is a graph illustrating a change in engine speed until a fast idle period after a cranking.

A case where the fuel injection is performed plural times in one combustion cycle in the first to seventh embodiments described above will be described with reference to FIGS. 36 and 37. FIG. 36 is a graph illustrating a relation between the injection pulse, the injection period, and a valve lift in a case where the fuel is injected plural times in one combustion cycle. FIG. 37 is a graph illustrating the change in the engine speed until to a fast idle period after a cranking.

As illustrated in FIG. 36, in this embodiment, the division injection in which the fuel is dividedly injected plural times in one combustion cycle is performed using the fuel injection devices 840 and 2305, the CPU 801, and the IC 802. In FIG. 36, in particular, the fuel is injected four times in the intake stroke of the piston from the top dead center (TDC) to the bottom dead center (BDC). When the piston passes through the bottom dead center (BDC), the procedure is shifted to the compression stroke. In four times of fuel injections, a valve lift 4001v based on an injection pulse 4001p, a valve lift 4002v based on an injection pulse 4002p, a valve lift 4003v based on an injection pulse 4003p, and a valve lift 4004v based on an injection pulse 4004p are contained.

In this embodiment, the fuel amount injected in the valve lift 4001v occupies 15% (division ratio: 0.15) of the total injected amount of the four times of fuel injections. The fuel amount injected in the valve lift 4002v is 70% (division ratio: 0.70) of the total amount. The fuel amount injected in the valve lift 4003v is 10% (division ratio: 0.10) of the total amount. The fuel amount injected in the valve lift 4004v is 5% (division ratio: 0.05) of the total amount. The injection pulse width is set such that the total fuel injected in the valve lifts 4001*v* to 4004*v* becomes 100% (division ratio: 1) with respect to the target injection amount required in one combustion cycle.

In the four times of fuel injections, the valve lift 4002*v* is the full lift, and the other valve lifts 4001*v*, 4003*v*, and 4004*v* are the half lift. Herein, the full lift is a state the valve element is displaced up to a state where the displacement of the valve element is restricted by the regulation member, and it means the valve opened state when the valve element reaches the regulation member. In this state, the fuel injection is performed in a state where the valve element reaches a position where the valve element is at a target opening level. In addition, the half lift means a valve opened state where the valve element is at an intermediate opening level at which the valve element does not reach the regulation member. In this state, the fuel injection is performed in a state where the valve element does not reach the lift position as the target opening level. In the plural times of fuel injections in one combustion cycle, the fuel injection in the half lift where the control accuracy in the injection amount is low and the fuel injection in the full lift where the high accuracy in the injection amount can be controlled are included. Therefore, the total amount of the fuel injected by a plurality of division injections can be appropriated to the target injection amount compared to a case where all of the fuel injections are performed in the half lift. With this configuration, it is possible to provide the drive device of the fuel injection device which can increase the injection accuracy of the fuel injection amount.

By the way, as described using FIGS. 4 and 5, in the fuel injection in the half lift, the fuel injection amount is not linearly changed with respect to the change in the injection pulse width, but non-linearly changed. The change corresponds to the conditions of Points 401 and 501 in FIGS. 4 and 5. In particular, as described in FIG. 5, the individual variation of the fuel injection device significantly influences the fuel injection amount on the condition of the half lift such as Point 501. The individual variation of the fuel injection device remarkably appears in the variation in the valve opening timing and the valve closed timing of the valve element. In addition, the valve opening timing of the valve element influences the valve closed timing, and the valve closed timing is delayed as fast as the valve opening timing. In other words, the fuel injection amount tends to be increased as fast as the valve opening timing.

As can be seen from the description of FIGS. 4 and 5, the pulse widths of the injection pulses 4001*p* to 4004*p* with respect to the valve lifts 4001*v* to 4004*v* described in FIG. 36 are not matched with the division ratios of the fuel injection amount in the valve lifts 4001*v* to 4004*v*. In other words, the pulse widths of the injection pulses 4001*p* to 4004*p* (the valve opening timing and the valve closed timing of the valve element) are necessarily corrected such that the fuel injection amounts in the valve lifts 4001*v* to 4004*v* become the division ratios illustrated in FIG. 36. This correction can be made by using the control method appropriate to the structure of the fuel injection device as described in each embodiment above.

In this embodiment, the fuel injection amount of the valve lift 4002*v* (the full lift) is described as 70%, but the fuel injection amount is not limited thereto. In addition, the number of divisions is also not limited to four times of this embodiment. In short, there is a need to divide the fuel injection into plural injections in one combustion cycle, and to perform at least one fuel injection in the full lift in the plural injections, and the total fuel injection amount of the divided injections becomes the target injection amount required in one combustion cycle. The division number and the fuel injection amount of each divided injection may be determined to meet the above condition.

In addition, in FIG. 36, all the division injections are performed during a period when the piston moves from the top dead center (TDC) to the bottom dead center (BDC) in the intake stroke, but the division injection may be performed in the compression stroke continuously to the intake stroke. It is desirable that the division injection in the compression stroke be performed at the intermediate opening level in the half lift. In the compression stroke, the piston moved down to the bottom dead center in the intake stroke moves toward the top dead center. Therefore, a space of injecting the fuel becomes narrow as the piston goes up toward the top dead center. In the fuel injection by the full lift, a traveling distance (a penetration) of the fuel spray injected in the fuel injection by the full lift tends to be lengthened. When the fuel injection by the full lift is performed in this situation, the piston goes approaching toward the injected fuel spray, and the fuel spray is easy to be directly attached to the piston. Such a situation of the fuel spray is not desirable for the combustion in the internal combustion engine.

Therefore, the energizing to the solenoid 105 for performing the fuel injection in the target opening level by the full lift may be performed during the intake stroke in one fuel cycle, and the energizing to the solenoid 105 for performing the fuel injection at the intermediate opening level by the half lift may be at a timing before and after the fuel injection is performed at the target opening level. In particular, the fuel injection at the target opening level by the full lift is desirably performed in a case where the piston is in the vicinity of the bottom dead center, and in a case where the piston falls down toward the bottom dead center in the vicinity of the bottom dead center.

In addition, it is desirable that a small amount of the fuel be injected in a fast time period of the intake stroke. In addition, in a case where the fuel injection is performed even in the compression stroke, and injected in a delayed time period of the compression stroke, it is desirable that a lesser amount of the fuel injection be injected. With this configuration, the traveling distance of the injected fuel spray is short even when the piston is at a position near the top dead center, so that the spray can be prevented from being attached to the piston, and a long time period for injecting the fuel can be secured. The reason why the fuel injection at the intermediate opening level has a short penetration compared to the fuel injection at the target opening level is that the injected fuel is inevitably reduced, the speed of an air flow formed by the injection is increased, and a relative speed is decreased, so that the injection fuel easily meets with the air resistance. With such an effect, the penetration can be arbitrarily controlled in the fuel injection at the intermediate opening level by changing the energizing time (the injection pulse width) to the solenoid and the actual injection period which is changed by the injection interval.

The fuel injection may be performed plural times in one combustion cycle at the intermediate opening level by the half lift, and the energizing time to the solenoid (that is, the injection pulse width) may be changed in these plural times of the fuel injections at the intermediate opening level. With this configuration, the data can be acquired with respect to a plurality of energizing time periods in one combustion cycle, so that the data acquisition and the learning can be made in a short time. The energizing time period to the solenoid may be determined by the high voltage apply time Tp and the peak current value.

The drive device of the fuel injection device may have a function of detecting any one or both of a valve closed time period in which the valve element comes in contact with the valve seat on the condition of the intermediate opening level and a valve opening time period in which the voltage is applied to the solenoid to separate the valve element from the valve seat using the change in the current of the solenoid or the voltage of the terminal when the above division injection is performed, and changing the energizing time of the solenoid for each fuel injection device of each cylinder. The variation in any one or both of the valve closed time period and the valve opening time period of the valve element can be corrected based on the individual variation of the fuel injection device by changing the energizing time of the solenoid, and a high accurate fuel injection can be realized by injecting an accurate fuel amount.

Alternatively, the drive device of the fuel injection device may have a function of detecting any one or both of the valve closed timing when the valve element comes in contact with the valve seat on the condition of the intermediate opening level and the valve opening timing when the voltage is applied to the solenoid to separate the valve element from the valve seat using the change in the current of the solenoid or the voltage of the terminal when the above division injection is performed, and changing the setting value of the current waveform supplied to the solenoid for each fuel injection device of each cylinder. The variation in any one or both of the valve closed timing of the valve element and the valve closed timing of the valve opening timing of the valve element can be corrected based on the individual variation of the fuel injection device by changing the setting value of the current waveform supplied to the solenoid, and a highly-accurate fuel injection can be realized by injecting an accurate fuel amount.

More specifically, the drive device of the fuel injection device may be provided with the booster circuit which boosts the battery voltage source and the battery voltage, a switch element which includes a first switch element for controlling the energizing/de-energizing from the booster circuit to the solenoid of the fuel injection device, a second switch element for controlling the energizing/de-energizing from the battery to the solenoid, and a third switch element for controlling the energizing/de-energizing between the terminal on a side near the ground potential of the solenoid and the ground potential, a first diode which is provided between the terminal on a side near the ground potential of the solenoid and the terminal on a side near the booster circuit of the first switch element and supplies the current toward the booster circuit, a second diode which is provided between the terminal on a side near the voltage source of the solenoid and the ground potential and supplies the current from the ground potential toward the voltage source, a unit which corrects the variation of the fuel injection device by changing the energizing time or the energizing current of the solenoid based on the valve opening time period, a valve opening time period detection unit which detects the valve opening time period when the valve element is separated from the valve seat, and a drive signal generation unit which generates a drive signal for driving the switch element. In addition, a target fuel injection device may be provided with the movable element which is driven by the magnetic attraction force from the solenoid and biases the valve element in the valve opening direction when coming in contact with the valve element, and a void which is provided between the contact surfaces of the valve element and the movable element and used for the movable element to come in contact with the valve element by the magnetic attraction force after the idle operation. Then, the valve opening time period detection unit may be configured to detect the valve opening time period such that the drive signal generation unit energizes the first switch element and the third switch element to drive the movable element in the valve opening direction at the time when the fuel injection is performed at the target opening level or the intermediate opening level, the movable element performs the idle operation in the void so as to come in contact with the valve element in a period of energizing the second switch element and the third switch element after the first switch element and the third switch element are de-energized to attenuate the energizing current of the solenoid, and the change in the speed or the acceleration of the movable element is detected by detecting the current value flowing in the solenoid.

At this time, the drive current supply to the solenoid may be stopped after the movable element accelerates according to the valve opening method or after the valve element is opened in a period when the valve element is driven at the intermediate opening level and the second switch element and the third switch element are energized. In a case where the valve element is operated at the intermediate opening level by the fuel injection device having a function of performing the idle operation in the movable element, the valve element is opened using the kinetic energy of the movable element. At this time, in a case where the target opening level for injecting the required injection amount is small, the valve element can perform the valve opening operation by the kinetic energy of the movable element even when the drive current supply to the solenoid is stopped even before the valve element starts to be opened. On the other hand, in the fuel injection device of which the movable element does not perform the idle operation, the drive current supply to the solenoid may be stopped after the valve element is opened.

There may be provided a detection unit which detects a valve opened time period when the valve element reaches the target opening level for each fuel injection device of each cylinder, in which the drive current is made to flow to the solenoid by energizing the first switch element and the third switch element so as to make the valve element start to be opened on a condition that the injection is performed at the target opening level in one combustion cycle, the third switch element is de-energized or the third switch element and the first switch element are de-energized to attenuate the drive current, the second switch element and the third switch element are energized to apply the battery voltage to the solenoid, the movable element or the valve element is made to reach the target opening level in a period when the battery voltage is applied, and the change in the acceleration of the movable element when the movable element reaches the target opening level is detected as the temporal change in the drive current. The start of opening the valve element is estimated by multiplying the correction coefficient and the valve opened time period. Even when the fuel injection device has a structure difficult to detect the valve opening timing using a sensor, the information of the valve opening timing can be obtained.

In addition, the following operations are desirably performed for an acquisition time period and a learning time period of the information on the valve closed time period and the valve opening time period. In other words, any one or both of the valve closed time period and the valve opening time period at the intermediate opening level of the fuel injection device of each cylinder are detected during operation and stored. Any one or both of the valve closed time period and the valve opening time period of the fuel injection device of each cylinder are detected in the next operation after the operation is ended in a period until the idle operation where the engine reaches a constant rotation speed after starting. Any one of both of the valve closed time period and the valve opening time period which are stored in advance are compared to any one or both of the detected valve closed time period and the detected valve opening time period. In a case where a deviation of the comparison result exceeds a threshold given to the drive device, any one or both of the detected valve closed time period and the detected valve opening time period are stored in the ECU. The energizing time or the current waveform of the fuel injection device of each cylinder may be changed before and after the idle operation. In this way, when any one or both of the valve closed time period and the valve opening time period at the time of the previous operation and the next operation are compared, the change caused by the change in the fuel injection device can be automatically detected by the ECU even when the fuel injection device is replaced at the time of maintenance of the engine. Therefore, it is possible to suppress that the correction is made based on the erroneous injection amount generated by using the valve closed time period or the valve opening time period at the time of the previous operation, and the robustness in compensation of the injection amount is increased.

Alternatively, any one or both of the valve closed time period and the valve opening time period of the fuel injection device of each cylinder may be detected in a period until the idle operation in which the engine reaches a constant rotation speed after starting, and any one or both of the energizing time and the current waveform of the fuel injection device of each cylinder may be changed after the idle operation.

As illustrated in FIG. 37, in a case where the internal combustion engine starts from a cold state (the case of starting in the cold air), there is a period in which the speed is increased until the engine speed reaches the fast idle period after the cranking so as to be a constant speed. In a case where the injected fuel is attached to the wall in the fast idle period, the fuel is hardly gasified and tends to increase the PM and the PN. Therefore, the penetration is necessarily suppressed in order to reduce that the fuel is attached to the piston and the wall of the cylinder in the fast idle period. Since it is necessary that the fuel is dividedly injected in order to suppress the penetration, a minute amount of the fuel is necessarily injected with accuracy. In the period when the speed is increased before the fast idle period, it is desirable to acquire the information of the valve closed time period and the valve opening time period and to perform the learning. With this configuration, a fast idle operation can be stably performed, and the fuel efficiency is also improved.

As a method of adjusting (correcting) the valve closed time period and an actual valve opening period after the valve is completely closed, the booster circuit is provided to boost the battery voltage, and a time of applying the high voltage from the booster circuit can be adjusted for each of a plurality of fuel injection devices in order to match the valve closed time period in each cylinder. In addition, the booster circuit is provided to boost the battery voltage, and a time of applying the high voltage from the booster circuit may be adjusted for each of the plurality of fuel injection devices in order to match the valve open period of the valve element obtained by subtracting the valve opening time period from the valve closed time period. In addition, there may be provided a function of controlling the energizing time of the battery voltage source after the high voltage is applied from the booster circuit so that the current value flowing in the solenoid falls within a predetermined range set in the drive device in order to control the fuel injection at the intermediate opening level. As a method of adjusting the valve opening time period, a timing of energizing the injection pulse may be adjusted for each cylinder based on the detection information of the valve opening time period acquired in each cylinder in order to match the valve opening time period in each cylinder.

Ninth Embodiment

Figure 38:
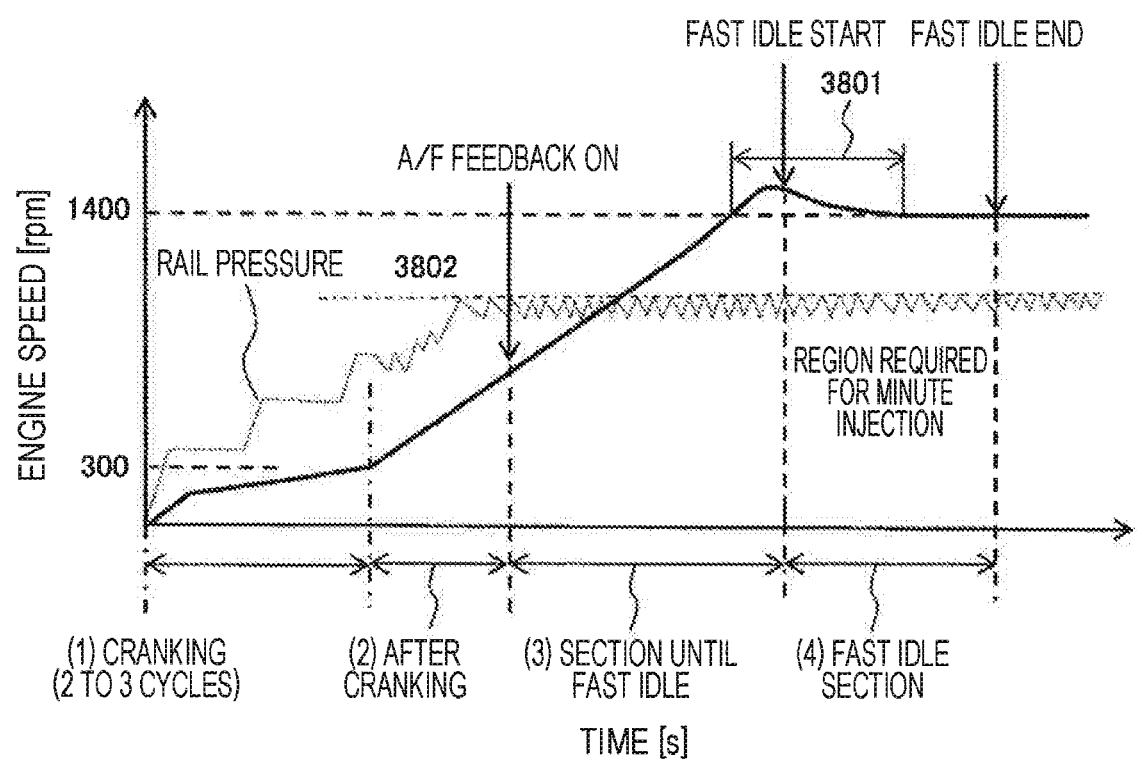
FIG. 38 is a graph illustrating a change in engine speed and a change in fuel pressure supplied to the fuel injection device until the fast idle period after the cranking in a ninth embodiment.

In the first to seventh embodiments described above, a timing of detecting the valve opening time period and the valve closing time period of the fuel injection device of each cylinder in a case where the fuel is injected plural times in one combustion cycle will be described with reference to FIG. 38. In FIG. 38, the change in the engine speed in a period until the fast idle period after the cranking in a ninth embodiment is depicted by the solid line, and the pressure of the fuel pipe on the upstream side of the fuel injection device (hereinafter, referred to as a rail pressure) is depicted by a broken line.

The ninth embodiment is different from the eighth embodiment in a processing method in a case where the operation state of the engine is changed. In this embodiment, the description will be made about a processing method in an operation state of a period 3801 where the engine speed overshoots the speed in the idle operation due to the increase of the engine speed by the engine blowing-up until the speed converges to a constant value after the state of the engine is shifted to a normal combustion from the first combustion by the cracking. The engine blowing-up is performed to increase the temperature of a catalyst attached to an exhaust pipe, and can reduce an amount of emission of the exhaust gas such as Nox and HC. In a case where the period 3801 is generated, the condition of a fast idle start condition is set in the period 3801 or after the period 3801. Since the fast idle starts after the engine speed is overshot and changed to be reduced, it is possible to suppress the stability in combustion as the speed is increased, and the engine can perform a stable combustion.

Until the speed reaches the fast idle condition after the first combustion, the pipe pressure on the upstream side of the fuel injection device of each cylinder is increased toward a target pressure 3802 which is arbitrarily set by the ECU. At this time, the fuel pressure (that is, the pipe pressure) of the rail pipe on the upstream side of the fuel apparatus can be detected by acquiring the output value of the pressure sensor provided in the fuel pipe on the upstream side of the fuel injection device using the ECU. In a high-pressure pump, a pressuring chamber is provided to apply pressure, a pressuring piston mounted on a camshaft of the engine performs compressing to pressure the fuel, and supplies the highly-pressured fuel to the rail pipe. In the high-pressure pump, the flow rate from a low-pressure pump (hereinafter, referred to as a feed pump) provided in a fuel tank into the pressuring chamber is controlled by a suction valve. For example, the suction valve is an electromagnetic valve which is configured by a coil, the magnetic circuit, and the movable element similarly to the fuel injection device, and controls the flow rate into the pressuring chamber by energizing and de-energizing the coil. When the engine starts its operation, the rail pressure is increased in synchronization with the operation of the pressuring piston or the operation of the suction valve while repeating an increase and a constant value. Since the valve opening time period and the valve closed time period and the valve opened time period of the fuel injection device are significantly influenced by the fuel pressure the fluid force operated on the valve element or the movable element is changed by the fuel pressure. In addition, the injection amount of the fuel is determined by the pressure of the fuel supplied to the fuel injection device and an actual valve opening period obtained by subtracting the valve opening time period from the valve closed time period of the fuel injection device of each cylinder. The valve opening time period or the valve closed time period may be detected in synchronization with the operation of the suction valve of the high-pressure pump. The information of the individual device of the fuel injection device of each cylinder can be detected on a condition that the variation in pressure is small by detecting the valve opening time period or the valve closed time period after a predetermined period of time passes since a command signal of the suction valve is issued, so that the correction accuracy of the injection amount is increased. Since the rail pressure is determined according to the pressure of the high-pressure pump and the pressure of the fuel injection of the fuel injection device of each cylinder, the valve opening time period or the valve closed time period of each cylinder may be detected on a condition of a certain target rail pressure by estimating the energizing timing of the suction valve and the pressure increase due to the pressuring operation of the high-pressure pump based on the current pressure sensor and the current engine speed. As a result, the pressure information of the next fuel injection in one combustion cycle can be accurately obtained even in a case where a period of inserting the output value of the pressure sensor to the ECU is long compared to the energizing time at the intermediated opening level, and the detection information of the valve opening time period or the valve closed time period can be accurately obtained on a condition of an arbitrary pressure calculated by the ECU.

In addition, any one or both of the valve closed time period and the valve opening time period for correcting the individual variation in the injection amount at the intermediate opening level of the fuel injection device of each cylinder are detected or learned in the time of the fast idle start condition. Therefore, after the fast idle start condition, the fuel injection in one combustion cycle is not restricted by a combination of the fuel injection at the target opening level and the fuel injection at the intermediate opening level, but all the fuel injections can be performed at the intermediate opening level. The fuel injection amount per one injection can be made small by performing the fuel injection in one combustion cycle at the intermediate opening level. Therefore, since the contact area with respect to the air is increased and the penetration of the injection fuel can be reduced, the fuel can be suppressed from being attached to the piston and the cylinder wall, and the exhaust gas containing the PM and the PN can be reduced. In addition, even when the injection interval at the intermediate opening level is reduced in order to reduce the injection amount per one injection, the air and the fuel is progressively mixed, the uniformity of the air-fuel mixture is effectively improved.

Herein, the energizing pulse widths of the first and final fuel injections may be made small to approximate the top dead center (TDC) of the piston of the engine. For example, the energizing pulse width in a case where all the fuel injections are performed at the intermediated opening level in one combustion cycle is set to be 0.15:0.2:0.2:0.2:0.15 in an order from the first fuel injection when the necessary energizing pulse width in one combustion cycle is set to 1. With such a setting, it is possible to suppress that the fuel is attached to the piston and the cylinder wall at the initial suction stroke and the later compression stroke, and the fuel and the air are progressively mixed at a timing when there is a lot of the amount of the inflow air so that the uniformity of the air-fuel mixture can be improved.

In addition, even after the fast idle is ended, the fuel injection at the intermediate opening level is performed, the valve opening time period and the valve closed time period of each cylinder at the intermediate opening level is detected again after a predetermined period of time or a time after a certain fuel injection is performed, and the learning value to be stored in the ECU may be updated. In this way, when the learning value is updated, the injection amount can be accurately corrected, and the variation in the injection amount of each cylinder can be suppressed even in a case where the injection amount of the fuel injection device is changed due to the secular degradation.

REFERENCE SIGNS LIST 101 nozzle holder
102a movable element
102b movable element
103 housing
104 bobbin
105 solenoid
107 fixed core
110 spring
111 magnetic throttling member
112 return spring
115 rod guide
114 valve element
114a regulation member
114b rod portion 114b
117 fixed core
116 orifice cup
118 valve seat
119 fuel injection hole
120 ECU
121 drive circuit
124 spring retainer
201 void
204 end surface
205 contact surface of valve element with respect to movable element 102a
206 sliding surface between movable element 102a and movable element 102b
207 end surface of movable element 102b on side near valve element 114
210 contact surface
840 fuel injection device
801 central processing unit (CPU)
802 IC
805, 806, 807, 831 switching element
809, 810, 811, 832, 835 diode
808, 812, 813 resistor for detecting current and voltage
814 booster circuit
830 coil
815 ground potential (GND)
620 operational amplifier
841 terminal of solenoid on side near ground potential (GND)
R81, R82, R83, R84 resistor
852, 853 resistor for detecting voltage VL1
C81, C82 capacitor
860 voltage
VL1 active low-pass filter for detection
861 voltage VL2 active low-pass filter for detection
1501 analog differential circuit
1901 gap
1902 second movable element
1903 first member
1904 bonding portion
1905 longitudinally bored fuel passage
1906 horizontally bored fuel passage
1907 second valve element
1908 second regulation member
1909 initial position spring
1910 first regulation member
2101 second gap
2201 third gap
ds seat diameter
T13 back pulse apply time
Ti injection pulse width (valve open signal time)
Ta' valve-opening-start delay time
Ta valve-opened delay time
Tb the valve-closed delay time
Tp boost voltage apply time
T2 drive voltage blocking time
VH boost voltage
VB battery voltage
Ipeak peak current value
Ih holding current value
Tn dead zone
4001$p$, 4002$p$, 4003$p$, 4004$p$ injection pulse
4001$v$, 4002$v$, 4003$v$, 4004$v$ valve lift

The invention claimed is:

1. A drive device for driving a fuel injection device that includes a movable element that is driven by a solenoid, a valve element that is operated in conjunction with the movable element, closed by abutting on a valve seat, and opened by being separated from the valve seat, and a regulation member that regulates a displacement amount of the movable element or the valve element, comprising:
 a switch element that controls energizing to the solenoid,
 wherein the drive device has a function of driving the fuel injection device to inject fuel plural times in one combustion cycle by switching an energizing state of the switch element, wherein
  the fuel injection device is driven such that the fuel injection at an intermediate opening level where the valve element does not reach the regulation member is included in plural injections performed in one combustion cycle,
  a valve opening timing detection unit detects a timing at which the valve element starts to be opened when the fuel injection at the intermediate opening level is performed,
  while a voltage is not applied to the solenoid, the movable element is separated from the valve body by a gap, and
  while a voltage is applied to the solenoid, the drive device detects the time at which the valve element starts to be opened based on a change in displacement of the movable element that occurs when, after traveling from the gap toward the valve body, the valve element comes into contact with the valve body,
  switching between energizing and de-energizing of the switching element is stopped during a period of time beginning after a timing when a constant voltage is supplied from a battery voltage source to the valve opening timing of the valve element, so that the electrical change in the drive current is cancelled to decrease the temporal change in the current, and
  a value of the constant voltage is greater than 0V.

2. The drive device of the fuel injection device according to claim 1,
 wherein the fuel injection device is driven such that the fuel injection at a target opening level where the valve element or the movable element reaches the regulation member is included in plural times of division injections performed in one combustion cycle.

3. The drive device of the fuel injection device according to claim 2,
 wherein the injection at the intermediate opening level is performed during a compression stroke in one combustion cycle.

4. The drive device of the fuel injection device according to claim 1,
 wherein the fuel injection at the intermediate opening level is performed plural times in one combustion cycle, and an energizing time to the solenoid at the intermediate opening level is changed in the plural times of fuel injections.

5. The drive device of the fuel injection device according to claim 1,
 wherein the drive device has a function of using a change in a current of the solenoid or a voltage of a terminal to detect any one or both of a time period during which the valve element comes in contact with the valve seat on a condition of the intermediate opening level and a valve opening time period when the valve element is separated from the valve seat by applying a voltage to the solenoid, and changing an energizing time of the solenoid for each fuel injection device of each cylinder.

6. The drive device of the fuel injection device according to claim 1,
 wherein the drive device has a function of using a change in a current of the solenoid and a voltage of a terminal to detect any one or both of a time when the valve element comes in contact with the valve seat on a condition of the intermediate opening level and a time when the valve element is separated from the valve seat by applying a voltage to the solenoid, and changing a setting value of a current waveform supplied to the solenoid of each fuel injection device of each cylinder.

7. The drive device of the fuel injection device according to claim 1, further comprising:
 a booster circuit that boosts a battery voltage source and a battery voltage;
 a first switch element, a second switch element, and a third switch element that are included in the switch element, in which the first switch element controls energizing/de-energizing from the booster circuit to the solenoid of the fuel injection device, the second switch element controls energizing/de-energizing from the battery to the solenoid, and the third switch element controls energizing/de-energizing between a ground potential and a terminal of the solenoid on a side near the ground potential;
 a first diode that is provided between a terminal of the solenoid on a side near the ground potential and a terminal of the first switch element on a side near the booster circuit to supply a current toward the booster circuit;
 a second diode that is provided between a terminal of the solenoid on a side near a voltage source and the ground potential to supply a current from a side near the ground potential to the voltage source;

a unit that corrects a variation in the fuel injection device by changing an energizing time or an energizing current of the solenoid based on a valve opening time period;

a valve opening timing detection unit that detects a timing at which the valve element is separated from the valve seat; and a drive signal generation unit that generates a drive signal to drive the switch element, wherein the fuel injection device is provided with a movable element that is driven by a magnetic attraction force from the solenoid and biases the valve element in a valve opening direction when coming in contact with the valve element, and wherein the valve opening time period detection unit detects the valve opening time period such that the drive signal generation unit energizes the first switch element to drive the valve element in the valve opening direction at the time when the fuel is injected at the target opening level or the intermediate opening level, the movable element performs the idle operation so as to come in contact with the valve element in a period of energizing the second switch element and the third switch element after the first switch element and the third switch element are de-energized to attenuate the energizing current of the solenoid, and a change in speed or acceleration of the movable element is detected based on a current value flowing in the solenoid.

8. The drive device of the fuel injection device according to claim 7, wherein the valve element is driven at the intermediate opening level, and a supply of a drive current to the solenoid is stopped after the valve element is opened in a period when the second switch element and the third switch element are energized.

9. The drive device of the fuel injection device according to claim 1, further comprising:

a unit that detects a valve opened time period for each fuel injection device of each cylinder and the valve opened time period when the valve element reaches the target opening level, in which the drive current is made to flow to the solenoid by energizing the first switch and the third switch so as to make the valve element start to be opened in a fuel injection at the target opening level, the third switch is de-energized or the third and first switches are de-energized to attenuate the drive current, the second and third switches are energized to apply a battery voltage to the solenoid, the movable element or the valve element is made to reach the target opening level in a period when the battery voltage is applied, and a change in acceleration of the movable element when the movable element reaches the target opening level is detected as a temporal change in the drive current, wherein the start of opening the valve element is estimated by multiplying a correction coefficient and the valve opened time period.

10. The drive device of the fuel injection device according to claim 1, wherein any one or both of a time period during which the valve element is closed and a time period during which the valve element is open at the intermediate opening level of the fuel injection device of each cylinder are detected during operation and stored, any one or both of the time period during which the valve element is closed and the time period during which the valve element is open are detected in the next operation after the operation is ended in a period until an idle operation where the engine reaches a constant rotation speed after starting, any one of both of the time period during which the valve element is closed and the time period during which the valve element is open which are stored in advance are compared to any one or both of the detected time period during which the valve element is open and the detected time period during which the valve element is open, any one or both of the detected time period during which the valve element is closed and the detected time period during which the valve element is open are stored in an ECU in a case where a deviation of the comparison result exceeds a threshold given to the drive device, and an energizing time or a current waveform of the fuel injection device of each cylinder is changed before and after the idle operation.

11. The drive device of the fuel injection device according to claim 1, wherein any one or both of a time period during which the valve element is closed and a time period during which the valve element is open of each cylinder are detected in a period until an idle operation in which the engine reaches a constant rotation speed after starting, and any one or both of an energizing time and a current waveform of the fuel injection device of each cylinder is changed after the idle operation.

12. The drive device of the fuel injection device according to claim 6, further comprising:

a booster circuit that boosts a battery voltage, wherein a time of applying a high voltage from the booster circuit is adjusted for each of a plurality of fuel injection devices to match the time period during which the valve element is closed in each cylinder.

13. The drive device of the fuel injection device according to claim 6, further comprising:

a booster circuit that boosts a battery voltage, wherein a time of applying a high voltage from the booster circuit or a time of energizing the solenoid is adjusted for each of a plurality of fuel injection devices to match a valve open period of the valve element obtained by subtracting the time period during which the valve element is open from the time period during which the valve element is closed.

14. The drive device of the fuel injection device according to claim 6, further comprising:

a booster circuit that boosts a battery voltage, wherein a time of applying a high voltage from the booster circuit is adjusted for each of a plurality of fuel injection devices to match the time period during which the valve element is closed in each cylinder, wherein the drive device has a function of controlling an energizing time of a battery voltage source such that a current value flowing in the solenoid falls within a predetermined range set in the drive device after the high voltage is applied from the booster circuit, and wherein a fuel injection amount at the intermediate opening level is controlled by controlling an energizing time of the battery voltage source to the solenoid.

15. The drive device of the fuel injection device according to claim 6, further comprising:

a battery voltage source; and a booster circuit that boosts a battery voltage, wherein a time of applying a high voltage from the booster circuit is adjusted for each of a plurality of fuel injection devices to match a valve open period of the valve element obtained by subtracting the valve opening time period from the time period during which the valve element is closed, wherein the drive device has a function of controlling an energizing time of a battery voltage source such that a current value flowing in the solenoid falls within a predetermined range set in the drive device after the high voltage is applied from the booster circuit, and wherein a fuel injection at the intermediate opening level is controlled by controlling an energizing time of the battery voltage source to the solenoid.

16. The drive device of the fuel injection device according to claim 1, wherein the drive device has a function of detecting a time when the valve element comes in contact with the valve seat on a condition of the intermediate opening level using an inter-terminal voltage of the solenoid or a change in voltage difference obtained by subtracting a voltage difference between a terminal of the solenoid on a side near a ground potential and the ground potential from a voltage difference between a terminal of the solenoid on a side near a power source and the ground potential and, and changing a setting value of a current waveform supplied to the solenoid for each fuel injection device of each cylinder using the detected time when the valve element comes in contact with the valve seat.

\* \* \* \* \*